United States Patent
Xia et al.

(10) Patent No.: US 9,973,298 B2
(45) Date of Patent: *May 15, 2018

(54) METHOD AND APPARATUS FOR NOTIFYING CHANNEL QUALITY INDICATOR AND MODULATION AND CODING SCHEME

(71) Applicant: Huawei Technologies Co., Ltd., Shenzhen (CN)

(72) Inventors: Liang Xia, Shenzhen (CN); Yuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

This patent is subject to a terminal disclaimer.

(21) Appl. No.: 14/961,597

(22) Filed: Dec. 7, 2015

(65) Prior Publication Data

US 2016/0087752 A1    Mar. 24, 2016

Related U.S. Application Data

(63) Continuation of application No. PCT/CN2014/071296, filed on Jan. 23, 2014.

(30) Foreign Application Priority Data

Jun. 8, 2013    (WO) ................ PCT/CN2013/077023

(51) Int. Cl.
*H04L 1/00* (2006.01)
*H04L 5/00* (2006.01)

(52) U.S. Cl.
CPC .......... *H04L 1/0016* (2013.01); *H04L 1/0003* (2013.01); *H04L 1/0009* (2013.01); *H04L 1/0026* (2013.01); *H04L 5/0057* (2013.01)

(58) Field of Classification Search
CPC ....... H04L 1/00; H04L 1/0003; H04L 1/0009; H04L 1/0016; H04L 1/0026; H04L 5/00; H04L 5/0057; H04W 28/24
See application file for complete search history.

(56) References Cited

U.S. PATENT DOCUMENTS

| 8,000,258 B2 | 8/2011 | Ko et al. |
| 8,040,912 B2 | 10/2011 | Imamura et al. |

(Continued)

FOREIGN PATENT DOCUMENTS

| CN | 101243625 A | 8/2008 |
| CN | 101448284 A | 3/2009 |

(Continued)

OTHER PUBLICATIONS

"Discussion on 256QAM for Downlink in Small Cell Deployments," 3GPP TSG-RAN WG1 Meeting 73, Fukuoka, Japan, R1-132138, 3rd Generation Partnership Project, Valbonne, France (May 20-24, 2013).

(Continued)

*Primary Examiner* — Tri H Phan
(74) *Attorney, Agent, or Firm* — Leydig, Voit & Mayer, Ltd.

(57) ABSTRACT

The method includes: learning, by a terminal, a first CQI index according to a first CQI table, and sending the first CQI index to a base station; receiving, by the base station, the first CQI index sent by the terminal device, determining a first MCS index according to the first CQI table, a first MCS table, and the received first CQI index, and sending the determined first MCS index to the terminal device; and receiving, by the terminal, the first MCS index sent by the base station, and determining a modulation order and a code block size according to the first MCS table and the received first MCS index, where the first CQI table includes an entry in which a modulation scheme is higher than 64 QAM, and (Continued)

the first MCS table includes an entry in which a modulation scheme is higher than 64 QAM.

10 Claims, 6 Drawing Sheets

(56) References Cited

U.S. PATENT DOCUMENTS

| | | | |
|---|---|---|---|
| 8,144,797 B2 | 3/2012 | Mujtaba et al. | |
| 8,472,548 B2* | 6/2013 | Taoka | H04L 5/0023 370/334 |
| 9,094,923 B2* | 7/2015 | Futagi | H04L 1/0004 |
| 9,220,112 B2* | 12/2015 | Gong | H04L 5/0023 |
| 9,432,168 B2* | 8/2016 | Kim | H04L 5/0057 |
| 9,479,287 B2* | 10/2016 | Yang | H04L 1/0016 |
| 9,698,960 B2* | 7/2017 | Kim | H04L 5/0092 |
| 2008/0107161 A1 | 5/2008 | Xu et al. | |
| 2009/0161613 A1* | 6/2009 | Kent | H04L 1/0016 370/329 |
| 2009/0245408 A1 | 10/2009 | Mujtaba et al. | |
| 2010/0014500 A1* | 1/2010 | Lee, II | H04L 1/0017 370/342 |
| 2010/0080176 A1 | 4/2010 | Maas et al. | |
| 2010/0103920 A1* | 4/2010 | Damnjanovic | H04L 1/0026 370/344 |
| 2012/0076227 A1 | 3/2012 | Taoka et al. | |
| 2012/0177137 A1 | 7/2012 | Cheng et al. | |
| 2012/0314613 A1* | 12/2012 | Zhang | H04B 7/0486 370/252 |
| 2013/0329575 A1* | 12/2013 | Yang | H04L 1/0026 370/252 |
| 2013/0343215 A1* | 12/2013 | Li | H04B 7/024 370/252 |
| 2014/0169300 A1* | 6/2014 | Kim | H04L 5/0057 370/329 |
| 2014/0192732 A1* | 7/2014 | Chen | H04L 1/0003 370/329 |
| 2014/0334433 A1 | 11/2014 | Blanz et al. | |
| 2015/0016553 A1* | 1/2015 | Yang | H04L 1/0016 375/261 |
| 2015/0163773 A1 | 6/2015 | Wang et al. | |
| 2015/0358111 A1* | 12/2015 | Marinier | H04L 1/0003 370/329 |
| 2016/0094310 A1* | 3/2016 | Xia | H04L 1/0003 370/329 |
| 2016/0226623 A1* | 8/2016 | Froberg Olsson | H04L 1/0023 |
| 2017/0012735 A1* | 1/2017 | Yang | H04L 1/0016 |
| 2017/0279586 A1* | 9/2017 | Zhang | H04L 1/0016 |

FOREIGN PATENT DOCUMENTS

| | | |
|---|---|---|
| CN | 101568145 A | 10/2009 |
| CN | 101689904 A | 3/2010 |
| CN | 102334357 A | 1/2012 |
| CN | 102624481 A | 8/2012 |
| CN | 102624501 A | 8/2012 |
| RU | 2417522 C2 | 4/2011 |
| RU | 2420878 C2 | 6/2011 |
| WO | WO 2009078795 A1 | 6/2009 |
| WO | 2009135574 A1 | 11/2009 |
| WO | 2012046143 A1 | 4/2012 |

OTHER PUBLICATIONS

Consideration on high order modulation for small cell, 3GPP TSG-RAN WG1 Meeting #72, R1-130136, pp. 1-6, St. Julian's, Malta, $3^{rd}$ Generation Partnership Project, Valbonne, France (Jan. 28-Feb. 1, 2013).

"Evaluation on 256QAM in small cell scenario," 3GPP TSG-RAN WG1 #73, R1-132266, pp. 1-5, Fukuoka, Japan, $3^{rd}$ Generation Partnership Project, Valbonne, France (May 20-24, 2013).

"$3^{rd}$ Generation Partnership Project; Technical Specification Group Radio Access Network; Evolved Universal Terrestrial Radio Access (E-UTRA); Multiplexing and channel coding (Release 11)," 3GPP TS 36.212, V11.2.0, pp. 1-82, $3^{rd}$ Generation Partnership Project, Valbonne, France (Feb. 2013).

"$3^{rd}$ Generation Partnership Project; Technical Specification Group Radio Access (E-UTRA); Physical layer procedures (Release 11)," 3GPP TS 36.213, V11.2.0, pp. 1-173, $3^{rd}$ Generation Partnership Project, Valbonne, France (Feb. 2013).

"$3^{rd}$ Generation Partnership Project; Technical Specification Group Radio Access Network; Evolved Universal Terrestrial Radio Access (E-UTRA); Use Equipment (UE) radio access capabilities (Release 11)," 3GPP TS 36.306, V11.3.0, pp. 1-27, $3^{rd}$ Generation Partnership Project, Valbonne, France (Mar. 2013).

"$3^{rd}$ Generation Partnership Project; Technical Specification Group Radio Access Network; Evolved Universal Terrestrial Radio Access (E-UTRA); User Equipment (UE) radio access capabilities (Release 11)," 3GPP TS 36.306, V11.4.0, pp. 1-27, $3^{rd}$ Generation Partnership Project, Valbonne, France (Sep. 2013).

"On Small Cell Enhancement for Improved Spectral Efficiency," 3GPP TSG RAN WG1 Meeting #72, St. Julian's, Malta, R1-130311, $3^{rd}$ Generation Partnership Project, Valbonne, France (Jan. 28-Feb. 1, 2013).

"Discussion in 256QAM for Downlink in Small Cell Deployments," 3GPP TSG-RAN WG1 Meeting 72bis, Chicago, Illinois, R1-131328, $3^{rd}$ Generation Partnership Project, Valbonne, France (Apr. 15-19, 2013).

"256 QAM for Small Cells SI," 3GPP TSG-RAN WG4 Meeting #66bis, Chicago, Illinois, R4-131742, $3^{rd}$ Generation Partnership Project, Valbonne, France (Apr. 15-19, 2013).

Classon et al., "Channel Coding and Link Adaptation," LTE—The UMTS Long Term Evolution: From Theory to Practice, pp. 207-241, John Wiley & Sons, Ltd. (2009).

U.S. Appl. No. 14/961,569, filed Dec. 7, 2015.

* cited by examiner

US 9,973,298 B2

METHOD AND APPARATUS FOR NOTIFYING CHANNEL QUALITY INDICATOR AND MODULATION AND CODING SCHEME

CROSS-REFERENCE TO RELATED APPLICATIONS

This application is a continuation of International Patent Application No. PCT/CN2014/071296, filed on Jan. 23, 2014, which claims priority to International Application No. PCT/CN2013/077023, filed on Jun. 8, 2013, both of which are hereby incorporated by reference in their entireties.

TECHNICAL FIELD

The present invention relates to the communications field, and in particular, to a method and apparatus for notifying channel quality indicator and modulation and coding scheme.

BACKGROUND

Currently, on a long term evolution (LTE) system, an adaptive modulation and coding of a physical downlink shared channel (PDSCH) follows the procedure: a terminal device estimates channel information that is used for measuring channel state information (CSI); the terminal device calculates a signal to interference plus noise ratio (SINR) by using the channel information and based on an optimal rank indication (RI) and/or an optimal precoding matrix indication (PMI); the terminal device obtains a corresponding channel quality indicator (CQI) according to the SINR and reports a value of the CQI to a base station; and the base station allocates a modulation and coding scheme (MCS) to the terminal device according to the channel quality indicator (CQI) CQI value reported by the terminal device and a network situation, where the MCS is used for indicating a modulation scheme and a coding scheme that are currently used on the PDSCH.

In a hotspot scenario, for example, in a scenario of relay (Relay) or LTE hotspot improvements (LTE-Hi), a terminal device needs a modulation scheme higher than 64 quadrature amplitude modulation (QAM); however, due to a limitation in the prior art, a greatest CQI value is 15 and a modulation scheme corresponding to the greatest CQI value is 64QAM, which means that the terminal device is unable to select a modulation scheme higher than 64QAM, and system performance is adversely affected. Similarly, the base station is unable to allocate a modulation scheme higher than 64QAM to the terminal device, either.

SUMMARY

Embodiments of the present invention provide a method and apparatus for notifying a channel quality indicator and a modulation and coding scheme, which enable a terminal device and a base station to select a modulation scheme higher than 64QAM, thereby improving system performance.

To achieve the foregoing objectives, the embodiments of the present invention use the following technical solutions:

According to a first aspect, a CQI notifying method is provided, including:

learning a first CQI index according to an acquired first CQI table; and sending the first CQI index to a base station, so that the base station determines a first modulation and coding scheme MCS index according to the first CQI index, where the first CQI table includes:

an entry in which a modulation scheme is higher than 64 quadrature amplitude modulation QAM; and at least one entry that is in a second CQI table and in which a modulation scheme is quadrature phase shift keying QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in entries in the second CQI table include only QPSK, 16QAM, and 64QAM.

With reference to the first aspect, in a first possible implementation, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the CQI table and in which a modulation scheme is QPSK.

With reference to the first aspect, in a second possible implementation, the at least one entry that is in the second CQI table and in which a modulation scheme is 16QAM includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

With reference to the first aspect or the foregoing two possible implementations, in a third possible implementation, the first CQI table further includes:

at least one entry that is in the second CQI table and in which a modulation scheme is 64QAM.

With reference to the third possible implementation, in a fourth possible implementation, the at least one entry in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

With reference to the first aspect, in a fifth possible implementation, a spectral efficiency in an entry in which a corresponding CQI index is smallest among entries that are in the first CQI table and in which a modulation scheme is higher than 64QAM is equal to a spectral efficiency in an entry in which a corresponding CQI index is greatest among all entries that are in the second CQI table and in which a modulation scheme is 64QAM; or spectral efficiencies in T entries in which corresponding CQI indexes are smallest ones among entries in which a modulation scheme is higher than 64QAM are equal to or approximately equal to spectral efficiencies in T entries in which corresponding CQI indexes are greatest ones among all entries that are in the second CQI table and in which a modulation scheme is 64QAM, where T is equal to any one natural number of 1-5.

With reference to the first aspect, in a sixth possible implementation, a spectral efficiency in an entry in which a corresponding CQI index is greatest among entries that are in the first CQI table and in which a modulation scheme is higher than 64QAM is:

4/3 times a spectral efficiency in an entry in which a corresponding CQI index is greatest among all entries that are in the second CQI table and in which a modulation scheme is 64QAM; or 8 times a maximum code rate of a terminal, where the maximum code rate is a positive real number less than 1; or 7.4063; or 7.432.

With reference to the first aspect, in a seventh possible implementation, spectral efficiencies in X entries that are in the first CQI table and in which CQI indexes are greatest ones are an arithmetic progression or an approximately arithmetic progression of spectral efficiencies arranged in ascending order; that spectral efficiencies in X entries that are in the first CQI table and in which CQI indexes are greatest ones are an arithmetic progression of spectral efficiencies arranged in ascending order refers to that, starting from the second entry in the X entries arranged in ascending order of the spectral efficiencies, a difference between a spectral efficiency in each entry and a spectral efficiency in a respective preceding entry is equal to a same constant; that spectral efficiencies in X entries that are in the first CQI table and in which CQI indexes are greatest ones are an approximately arithmetic progression of spectral efficiencies arranged in ascending order refers to that, starting from the second entry in the X entries arranged in ascending order of the spectral efficiencies, a difference between a spectral efficiency in each entry and a spectral efficiency in a respective preceding entry is within a range from a constant minus a preset value to the constant plus the preset value; and X is an integer greater than 2;

a spectral efficiency in an entry in which a corresponding CQI index is smallest among the X entries that are in the first CQI table and in which CQI indexes are greatest ones is equal to a spectral efficiency in an entry in which a corresponding CQI index is greatest among all entries that are in the second CQI table and in which a modulation scheme is 64QAM; and a spectral efficiency in an entry in which a corresponding CQI index is greatest among the X entries that are in the first CQI table and in which CQI indexes are greatest ones is:

4/3 times the spectral efficiency in the entry in which the corresponding CQI index is greatest among all the entries that are in the second CQI table and in which a modulation scheme is 64QAM; or 8 times a maximum code rate of a terminal, where the maximum code rate is a positive real number less than 1; or 7.4063; or 7.432.

With reference to the first aspect or any one of the first, second, sixth, and seventh possible implementations, in an eighth possible implementation, spectral efficiencies in the entries that are in the first CQI table and in which a modulation scheme is higher than 64QAM include at least one of the following groups of numerical values:

{5.5547 6.1805 6.8062 7.432},
{6.1805 6.8062 7.432},
{5.5547 6.1797 6.8047 7.4297},
{6.1797 6.8047 7.4297},
{5.5547 6.1719 6.7891 7.4063},
{6.1719 6.7891 7.4063},
{5.5547 6.4934 7.432},
{6.4934 7.432},
{5.5547 6.4922 7.4297},
{6.4922 7.4297},
{5.5547 6.4805 7.4063},
{6.4805 7.4063},
{5.5547 6.4844 7.4063},
{6.4844 7.4063},
{5.5547 6.0240 6.4934 6.9627 7.432},
{6.0234 6.4922 6.9609 7.4297},
{5.5547 6.0234 6.4922 6.9609 7.4297},
{6.0176 6.4805 6.9434 7.4063},
{5.5547 6.0176 6.4805 6.9434 7.4063},
{6.0176 6.4805 6.9434 7.4063},
{5.5547 6.0156 6.4844 6.9453 7.4063},
{6.0156 6.4844 6.9453 7.4063},
{5.5547 5.9302 6.3056 6.6811 7.0565 7.432},
{5.9302 6.3056 6.6811 7.0565 7.432},
{5.5547 5.9297 6.3047 6.6797 7.0547 7.4297},
{5.9297 6.3047 6.6797 7.0547 7.4297},
{5.5547 5.9250 6.2953 6.6656 7.0360 7.4063},
{5.9250 6.2953 6.6656 7.0360 7.4063},
{5.5547 5.9219 6.2969 6.6641 7.0391 7.4063}, and
{5.9219 6.2969 6.6641 7.0391 7.4063}.

With reference to the first aspect, in a ninth possible implementation, a value range of a CQI index in the first CQI table is the same as a value range of a CQI index in the second CQI table.

According to a second aspect, an MCS notifying method is provided, including:

receiving a first channel quality indicator CQI index sent by a terminal device, where the first CQI index is determined by the terminal device according to an acquired first CQI table;

determining a first MCS index according to the first CQI table, a first MCS table, and the received first CQI index; and sending the determined first MCS index to the terminal device, where the first CQI table includes:

an entry in which a modulation scheme is higher than 64QAM; and the first MCS table includes:

an entry in which a modulation scheme is higher than 64QAM; and at least one entry that is in a second MCS table and in which a modulation scheme is QPSK, where the at least one entry in which a modulation scheme is QPSK includes a combination, other than a second combination, formed by the at least one entry that is in the second MCS table and in which a modulation scheme is QPSK, the second combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table include only QPSK, 16QAM, and 64QAM.

With reference to the second aspect, in a first possible implementation, the first CQI table further includes:

at least one entry that is in a second CQI table and in which a modulation scheme is QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in the second CQI table include only QPSK, 16QAM, and 64QAM.

With reference to the second aspect or the first possible implementation, in a second possible implementation, the determining a first MCS index according to the acquired first CQI table, an acquired first MCS table and the received first CQI index includes:

determining a first TBS index and the first MCS index according to a first PRB quantity, the first CQI table, the first MCS table, and a first TBS table that are acquired, and the received first CQI index, where the first PRB quantity is a PRB quantity allocated to the terminal device by a base station; or the first PRB quantity is a greatest integer less than or equal to a product of the PRB quantity allocated to the terminal device and a specific coefficient; and the first TBS table includes at least one PRB quantity corresponding to each TBS index and a transmission block size corresponding to each PRB quantity; and the first TBS table is a TBS table corresponding to the first MCS table.

With reference to the second possible implementation, in a third possible implementation, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

With reference to the second aspect, in a fourth possible implementation, the determining a first TBS index according to the first CQI table, a first PRB quantity, a first TBS table, and the received first CQI index includes:

determining, according to the first CQI table and the received first CQI index, a first modulation scheme and a first spectral efficiency that are corresponding to the received first CQI index;

learning, according to the first PRB quantity and the first spectral efficiency, a first transmission block size transmitted to the terminal device; and obtaining, according to the first TBS table, the first TBS index that is in the first TBS table and corresponding to the first transmission block size and the first PRB quantity.

With reference to any one of the second, third, and fourth possible implementations, in a fifth possible implementation, the first TBS table includes a TBS index Y1, where for each PRB quantity, a transmission block size corresponding to the TBS index Y1 is greater than a transmission block size corresponding to a TBS index 25 in the second TBS table and smaller than a transmission block size corresponding to a TBS index 26 in the second TBS table; a value range of a TBS index in the second TBS table is 0-26, and the second TBS table includes at least one PRB quantity corresponding to each TBS index and a transmission block size corresponding to each PRB quantity.

With reference to any one of the second, third, and fourth possible implementations, in a sixth possible implementation, the first TBS table includes a TBS index Y2 and at least one entry corresponding to the TBS index Y2 in the following Table A, where any one entry includes one PRB quantity and one transmission block size corresponding to the PRB quantity:

TABLE A

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y2 | 648 | 1320 | 1992 | 2664 | 3368 | 4008 | 4584 | 5352 | 5992 | 6712 |
| TBS index | PRB quantity | | | | | | | | | |
| | 11 | 12 | 13 | 14 | 15 | 16 | 17 | 18 | 19 | 20 |
| Y2 | 7224 | 7992 | 8504 | 9144 | 9912 | 10680 | 11448 | 11832 | 12576 | 12960 |
| TBS index | PRB quantity | | | | | | | | | |
| | 21 | 22 | 23 | 24 | 25 | 26 | 27 | 28 | 29 | 30 |
| Y2 | 14112 | 14688 | 15264 | 15840 | 16416 | 16992 | 17568 | 18336 | 19080 | 19848 |

TABLE A-continued

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y2 | 20616 | 21384 | 22152 | 22920 | 22920 | 23688 | 24496 | 25456 | 25456 | 26416 |
| TBS index | PRB quantity | | | | | | | | | |
| | 41 | 42 | 43 | 44 | 45 | 46 | 47 | 48 | 49 | 50 |
| Y2 | 27376 | 27376 | 28336 | 29296 | 29296 | 30576 | 31704 | 31704 | 32856 | 32856 |
| TBS index | PRB quantity | | | | | | | | | |
| | 51 | 52 | 53 | 54 | 55 | 56 | 57 | 58 | 59 | 60 |
| Y2 | 34008 | 34008 | 35160 | 35160 | 36696 | 36696 | 37888 | 37888 | 39232 | 39232 |
| TBS index | PRB quantity | | | | | | | | | |
| | 61 | 62 | 63 | 64 | 65 | 66 | 67 | 68 | 69 | 70 |
| Y2 | 40576 | 40576 | 42368 | 42368 | 43816 | 43816 | 43816 | 45352 | 45352 | 46888 |
| TBS index | PRB quantity | | | | | | | | | |
| | 71 | 72 | 73 | 74 | 75 | 76 | 77 | 78 | 79 | 80 |
| Y2 | 46888 | 46888 | 48936 | 48936 | 48936 | 51024 | 51024 | 51024 | 52752 | 52752 |
| TBS index | PRB quantity | | | | | | | | | |
| | 81 | 82 | 83 | 84 | 85 | 86 | 87 | 88 | 89 | 90 |
| Y2 | 52752 | 55056 | 55056 | 55056 | 57336 | 57336 | 57336 | 59256 | 59256 | 59256 |
| TBS index | PRB quantity | | | | | | | | | |
| | 91 | 92 | 93 | 94 | 95 | 96 | 97 | 98 | 99 | 100 |
| Y2 | 59256 | 61664 | 61664 | 61664 | 63776 | 63776 | 63776 | 63776 | 66592 | 66592 |
| TBS index | PRB quantity | | | | | | | | | |
| | 101 | 102 | 103 | 104 | 105 | 106 | 107 | 108 | 109 | 110 |
| Y2 | 66592 | 66592 | 68808 | 68808 | 68808 | 71112 | 71112 | 71112 | 71112 | 73712 | and/or,
the first TBS table includes a TBS index Y3 and at least one entry corresponding to the TBS index Y3 in the following Table B1, B2, B3, or B4, where any one entry includes one PRB quantity and one transmission block size corresponding to the PRB quantity:

TABLE B1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 936 | 1928 | 2856 | 3880 | 4776 | 5736 | 6712 | 7736 | 8504 | 9528 |
| TBS index | PRB quantity | | | | | | | | | |
| | 11 | 12 | 13 | 14 | 15 | 16 | 17 | 18 | 19 | 20 |
| Y3 | 10680 | 11448 | 12576 | 13536 | 14112 | 15264 | 16416 | 16992 | 18336 | 19080 |
| TBS index | PRB quantity | | | | | | | | | |
| | 21 | 22 | 23 | 24 | 25 | 26 | 27 | 28 | 29 | 30 |
| Y3 | 19848 | 21384 | 22152 | 22920 | 23688 | 24496 | 25456 | 26416 | 27376 | 28336 |

TABLE B1-continued

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y3 | 29296 | 30576 | 31704 | 32856 | 34008 | 34008 | 35160 | 36696 | 37888 | 37888 |
| TBS index | PRB quantity | | | | | | | | | |
| | 41 | 42 | 43 | 44 | 45 | 46 | 47 | 48 | 49 | 50 |
| Y3 | 39232 | 40576 | 40576 | 42368 | 43816 | 43816 | 45352 | 45352 | 46888 | 46888 |
| TBS index | PRB quantity | | | | | | | | | |
| | 51 | 52 | 53 | 54 | 55 | 56 | 57 | 58 | 59 | 60 |
| Y3 | 48936 | 48936 | 51024 | 51024 | 52752 | 52752 | 55056 | 55056 | 57336 | 57336 |
| TBS index | PRB quantity | | | | | | | | | |
| | 61 | 62 | 63 | 64 | 65 | 66 | 67 | 68 | 69 | 70 |
| Y3 | 59256 | 59256 | 59256 | 61664 | 61664 | 63776 | 63776 | 63776 | 66592 | 66592 |
| TBS index | PRB quantity | | | | | | | | | |
| | 71 | 72 | 73 | 74 | 75 | 76 | 77 | 78 | 79 | 80 |
| Y3 | 68808 | 68808 | 71112 | 71112 | 71112 | 73712 | 73712 | 75376 | 76208 | 76208 |
| TBS index | PRB quantity | | | | | | | | | |
| | 81 | 82 | 83 | 84 | 85 | 86 | 87 | 88 | 89 | 90 |
| Y3 | 78704 | 78704 | 78704 | 81176 | 81176 | 81176 | 84760 | 84760 | 84760 | 84760 |
| TBS index | PRB quantity | | | | | | | | | |
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 101840 |
| TBS index | PRB quantity | | | | | | | | | |
| | 101 | 102 | 103 | 104 | 105 | 106 | 107 | 108 | 109 | 110 |
| Y3 | 101840 | 101840 | 101840 | 101840 | 101840 | 101840 | 101840 | 101840 | 101840 | 101840 |

TABLE B2

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 93800 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 101840 | 101840 | 101840 | 101840 | 105528 | 105528 |

TABLE B3

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 968 | 1992 | 2984 | 4008 | 4968 | 5992 | 6968 | 7992 | 8760 | 9912 |

TABLE B3-continued

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y3 | 10680 | 11832 | 12960 | 13536 | 14688 | 15840 | 16992 | 17568 | 19080 | 19848 |
| TBS index | PRB quantity | | | | | | | | | |
| | 21 | 22 | 23 | 24 | 25 | 26 | 27 | 28 | 29 | 30 |
| Y3 | 20616 | 21384 | 22920 | 23688 | 24496 | 25456 | 26416 | 27376 | 28336 | 29296 |
| TBS index | PRB quantity | | | | | | | | | |
| | 31 | 32 | 33 | 34 | 35 | 36 | 37 | 38 | 39 | 40 |
| Y3 | 30576 | 31704 | 32856 | 34008 | 35160 | 35160 | 36696 | 37888 | 37888 | 39232 |
| TBS index | PRB quantity | | | | | | | | | |
| | 41 | 42 | 43 | 44 | 45 | 46 | 47 | 48 | 49 | 50 |
| Y3 | 40576 | 40576 | 42368 | 43816 | 43816 | 45352 | 46888 | 46888 | 48936 | 48936 |
| TBS index | PRB quantity | | | | | | | | | |
| | 51 | 52 | 53 | 54 | 55 | 56 | 57 | 58 | 59 | 60 |
| Y3 | 51024 | 51024 | 52752 | 52752 | 55056 | 55056 | 55056 | 57336 | 57336 | 59256 |
| TBS index | PRB quantity | | | | | | | | | |
| | 61 | 62 | 63 | 64 | 65 | 66 | 67 | 68 | 69 | 70 |
| Y3 | 59256 | 61664 | 61664 | 63776 | 63776 | 63776 | 66592 | 66592 | 68808 | 68808 |
| TBS index | PRB quantity | | | | | | | | | |
| | 71 | 72 | 73 | 74 | 75 | 76 | 77 | 78 | 79 | 80 |
| Y3 | 71112 | 71112 | 71112 | 73712 | 75376 | 76208 | 76208 | 76208 | 78704 | 78704 |
| TBS index | PRB quantity | | | | | | | | | |
| | 81 | 82 | 83 | 84 | 85 | 86 | 87 | 88 | 89 | 90 |
| Y3 | 81176 | 81176 | 81176 | 81176 | 84760 | 84760 | 84760 | 87936 | 87936 | 87936 |
| TBS index | PRB quantity | | | | | | | | | |
| | 91 | 92 | 93 | 94 | 95 | 96 | 97 | 98 | 99 | 100 |
| Y3 | 90816 | 90816 | 90816 | 93800 | 93800 | 93800 | 93800 | 97896 | 97896 | 97896 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 97896 | 97896 | 97896 | 97896 | 97896 | 97896 |

TABLE B4

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 101840 | 101840 | 101840 | 105528 | 105528 | 105528 | 105528 | 105528 | 110136 | and/or, the first TBS table includes TBS indexes Y4_1 to Y4_5 and at least one entry corresponding to the TBS indexes Y4_1 to Y4_5 in the following Table C1 or C2, where any one entry includes one PRB quantity and five transmission block sizes corresponding to the PRB quantity:

TABLE C1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4136 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2280 | 3112 | 3880 | 4584 | 5352 | 6200 | 6968 | 7736 |
| Y4_4 | 776 | 1608 | 2408 | 3240 | 4008 | 4776 | 5736 | 6456 | 7224 | 7992 |
| Y4_5 | 840 | 1672 | 2536 | 3368 | 4264 | 5160 | 5992 | 6712 | 7480 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8248 | 9144 | 9912 | 10296 | 11064 | 11832 | 12576 | 13536 | 14112 |
| Y4_2 | 7992 | 8760 | 9528 | 10296 | 11064 | 11832 | 12576 | 12960 | 14112 | 14688 |
| Y4_3 | 8504 | 9144 | 9912 | 10680 | 11448 | 12216 | 12960 | 14112 | 14688 | 15264 |
| Y4_4 | 8760 | 9528 | 10680 | 11448 | 12216 | 12960 | 13536 | 14688 | 15264 | 16416 |
| Y4_5 | 9144 | 10296 | 11064 | 11832 | 12576 | 13536 | 14112 | 15264 | 15840 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 20616 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19080 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 27376 | 28336 | 29296 | 30576 | 30576 |
| Y4_4 | 25456 | 25456 | 26416 | 27376 | 28336 | 29296 | 30576 | 30576 | 31704 | 32856 |
| Y4_5 | 26416 | 27376 | 28336 | 28336 | 29296 | 30576 | 31704 | 31704 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 39232 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 46888 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 57336 | 59256 |
| Y4_3 | 55056 | 55056 | 57336 | 57336 | 57336 | 59256 | 59256 | 59256 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

TABLE C1-continued

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 59256 | 61664 | 61664 | 61664 | 63776 | 63776 | 63776 | 66592 | 66592 |
| Y4_3 | 61664 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 63776 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 76208 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 73712 | 75376 | 76208 | 76208 | 76208 | 78704 | 78704 | 78704 | 81176 | 81176 |
| Y4_3 | 78704 | 78704 | 78704 | 81176 | 81176 | 81176 | 81176 | 84760 | 84760 | 84760 |
| Y4_4 | 81176 | 81176 | 84760 | 84760 | 84760 | 84760 | 87936 | 87936 | 87936 | 87936 |
| Y4_5 | 84760 | 87936 | 87936 | 87936 | 87936 | 90816 | 90816 | 90816 | 93800 | 93800 |

TABLE C2

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4264 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2344 | 3112 | 3880 | 4584 | 5352 | 6200 | 6968 | 7736 |
| Y4_4 | 808 | 1608 | 2408 | 3240 | 4008 | 4968 | 5736 | 6456 | 7224 | 7992 |
| Y4_5 | 840 | 1672 | 2536 | 3368 | 4264 | 5160 | 5992 | 6712 | 7736 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8504 | 9144 | 9912 | 10680 | 11064 | 11832 | 12576 | 13536 | 14112 |
| Y4_2 | 7992 | 8760 | 9528 | 10296 | 11064 | 11832 | 12576 | 13536 | 14112 | 14688 |
| Y4_3 | 8504 | 9144 | 9912 | 10680 | 11448 | 12216 | 12960 | 14112 | 14688 | 15264 |
| Y4_4 | 8760 | 9912 | 10680 | 11448 | 12216 | 12960 | 13536 | 14688 | 15264 | 16416 |
| Y4_5 | 9144 | 10296 | 11064 | 11832 | 12576 | 13536 | 14688 | 15264 | 16416 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 21384 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 21384 | 22152 | 22152 | 22920 |
| Y4_4 | 16992 | 17568 | 18336 | 19848 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 28336 | 28336 | 29296 | 30576 | 30576 |
| Y4_4 | 25456 | 26416 | 26416 | 27376 | 28336 | 29296 | 30576 | 30576 | 31704 | 32856 |
| Y4_5 | 26416 | 27376 | 28336 | 29296 | 29296 | 30576 | 31704 | 32856 | 32856 | 34008 |

TABLE C2-continued

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 40576 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 48936 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 59256 | 59256 |
| Y4_3 | 55056 | 55056 | 57336 | 57336 | 57336 | 59256 | 59256 | 61664 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 61664 | 61664 | 61664 | 63776 | 63776 | 63776 | 66592 | 66592 | 66592 |
| Y4_3 | 63776 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 66592 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 78704 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 75376 | 75376 | 76208 | 76208 | 78704 | 78704 | 78704 | 78704 | 81176 | 81176 |
| Y4_3 | 78704 | 78704 | 78704 | 81176 | 81176 | 81176 | 84760 | 84760 | 84760 | 84760 |
| Y4_4 | 81176 | 81176 | 84760 | 84760 | 84760 | 84760 | 87936 | 87936 | 87936 | 90816 |
| Y4_5 | 84760 | 87936 | 87936 | 87936 | 87936 | 90816 | 90816 | 90816 | 93800 | 93800 |

With reference to any one of the first to sixth possible implementations, in a seventh possible implementation, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the CQI table and in which a modulation scheme is QPSK.

With reference to any one of the first to sixth possible implementations, in an eighth possible implementation, the at least one entry that is in the second CQI table and in which a modulation scheme is 16QAM includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

With reference to any one of the first to eighth possible implementations, in a ninth possible implementation, the first CQI table further includes:

at least one entry that is in the second CQI table and in which a modulation scheme is 64QAM.

With reference to the ninth possible implementation, in a tenth possible implementation, the at least one entry in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

With reference to any one of the first to tenth possible implementations, in an eleventh possible implementation, a spectral efficiency in an entry in which a corresponding CQI index is smallest among entries that are in the first CQI table and in which a modulation scheme is higher than 64QAM is equal to a spectral efficiency in an entry in which a corresponding CQI index is greatest among all entries that are in the second CQI table and in which a modulation scheme is 64QAM; or spectral efficiencies in T entries in which corresponding CQI indexes are smallest ones among entries in which a modulation scheme is higher than 64QAM are equal to or approximately equal to spectral efficiencies in T entries in which corresponding CQI indexes are greatest ones among all entries that are in the second CQI table and in which a modulation scheme is 64QAM, where T is equal to any one natural number of 1-5.

With reference to any one of the first to eleventh possible implementations, in a twelfth possible implementation, a value range of a CQI index in the first CQI table is the same as a value range of a CQI index in the second CQI table.

With reference to the second aspect or any one of the first to fourth possible implementations, in a thirteenth possible implementation, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

With reference to any one of the first to fourth possible implementations, in a fourteenth possible implementation, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

With reference to the second aspect or any one of the first to fourth, thirteenth, and fourteenth possible implementations, in a fifteenth possible implementation, the first MCS table further includes:

at least one entry that is in the second MCS table and in which a modulation scheme is 64QAM.

With reference to the fifteenth possible implementation, in a sixteenth possible implementation, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM; or part of entries that are in the second MCS table and in which a modulation scheme is 64QAM, where the part of entries is at least one entry other than an entry in which an MCS index is greatest among all entries that are in the second MCS table and in which a modulation scheme is 64QAM.

With reference to the fifteenth or sixteenth possible implementation, in a seventeenth possible implementation, a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM; or TBS indexes in R entries in which corresponding MCS indexes are smallest ones among entries that are in the first MCS table and in which a modulation scheme is higher than 64QAM are equal to TBS indexes in R entries in which MCS indexes are greatest ones among all entries that are in the second MCS table and in which a modulation scheme is 64QAM and MCS indexes are not greater than 27, where R is a natural number.

With reference to the second aspect or any one of the first to fourth, and thirteenth to seventeenth possible implementations, in an eighteenth possible implementation, a value range of an MCS index in the first MCS table is the same as a value range of an MCS index in the second MCS table.

With reference to the second aspect or any one of the first to fourth, sixth, and thirteenth to eighteenth possible implementations, in a nineteenth possible implementation, the first MCS table further includes at least one entry in the following Table D1, D2, D3, D4, or D5, and any one entry includes one MCS index, and a modulation order and a TBS index that are corresponding to the one MCS index:

TABLE D1

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |

TABLE D1-continued

| MCS index $I_{MCS}$ | Modulation order $Q_m$ | TBS index $I_{TBS}$ |
| --- | --- | --- |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D2

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 6 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D3

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | Y2 |
| 22 | 8 | Y4_1 |

TABLE D3-continued

| MCS index $I_{MCS}$ | Modulation order $Q_m$ | TBS index $I_{TBS}$ |
|---|---|---|
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D4

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D5

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |
| 8 | 4 | 15 |
| 9 | 6 | 15 |
| 10 | 6 | 16 |
| 11 | 6 | 17 |
| 12 | 6 | 18 |
| 13 | 6 | 19 |
| 14 | 6 | 20 |
| 15 | 6 | 21 |
| 16 | 6 | 22 |
| 17 | 6 | 23 |
| 18 | 6 | 24 |
| 19 | 6 | 25 |
| 20 | 8 | 25 |
| 21 | 8 | Y2 |

TABLE D5-continued

| MCS index $I_{MCS}$ | Modulation order $Q_m$ | TBS index $I_{TBS}$ |
|---|---|---|
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

According to a third aspect, an MCS notifying method is provided, including:

receiving a first MCS index sent by a base station, where the first MCS index is determined by the base station according to a first MCS table; and determining a modulation order and a code block size according to the first MCS table and the received first MCS index, where the first MCS table includes:

an entry in which a modulation scheme is higher than 64QAM; and at least one entry that in a second MCS table and in which a modulation scheme is QPSK, where the at least one entry in which a modulation scheme is QPSK includes a combination, other than a first combination, formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table include only QPSK, 16QAM, and 64QAM.

With reference to the third aspect, in a first possible implementation, the determining a modulation order and a code block size according to the first MCS table and the received first MCS index includes:

determining a first TBS index and the modulation order according to the first MCS table and the received first MCS index; and determining the code block size according to the first TBS index, a first PRB quantity, and a first TBS table, where the first PRB quantity is a PRB quantity allocated to the terminal device by the base station; or the first PRB quantity is a greatest integer less than or equal to a product of the PRB quantity allocated to the terminal device and a specific coefficient; and the first TBS table includes at least one PRB quantity corresponding to each TBS index and a transmission block size corresponding to each PRB quantity; and the first TBS table is a TBS table corresponding to the first MCS table.

With reference to the first possible implementation, in a second possible implementation, a value range of a TBS index in the first TBS table is 0-A, where A is a positive integer less than or equal to 26; or a value range of a TBS index in the first TBS table is 0 to B, where B is a positive integer greater than or equal to 26; and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

With reference to the first or second possible implementation, in a third possible implementation, the first TBS table includes a TBS index Y1, where for each PRB quantity, a transmission block size corresponding to the TBS index Y1 is greater than a transmission block size corresponding to a TBS index 25 in the second TBS table and smaller than a transmission block size corresponding to a TBS index 26 in the second TBS table; a value range of a TBS index in the second TBS table is 0-26, and the second TBS table includes at least one PRB quantity corresponding to each TBS index and a transmission block size corresponding to each PRB quantity.

With reference to the first or second possible implementation, in a fourth possible implementation, the first TBS table includes a TBS index Y2 and at least one entry corresponding to the TBS index Y2 in the following Table A, where any one entry includes one PRB quantity and one transmission block size corresponding to the PRB quantity:

TABLE A

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y2 | 648 | 1320 | 1992 | 2664 | 3368 | 4008 | 4584 | 5352 | 5992 | 6712 |
| TBS index | 11 | 12 | 13 | 14 | 15 | 16 | 17 | 18 | 19 | 20 |
| Y2 | 7224 | 7992 | 8504 | 9144 | 9912 | 10680 | 11448 | 11832 | 12576 | 12960 |
| TBS index | 21 | 22 | 23 | 24 | 25 | 26 | 27 | 28 | 29 | 30 |
| Y2 | 14112 | 14688 | 15264 | 15840 | 16416 | 16992 | 17568 | 18336 | 19080 | 19848 |
| TBS index | 31 | 32 | 33 | 34 | 35 | 36 | 37 | 38 | 39 | 40 |
| Y2 | 20616 | 21384 | 22152 | 22920 | 22920 | 23688 | 24496 | 25456 | 25456 | 26416 |
| TBS index | 41 | 42 | 43 | 44 | 45 | 46 | 47 | 48 | 49 | 50 |
| Y2 | 27376 | 27376 | 28336 | 29296 | 29296 | 30576 | 31704 | 31704 | 32856 | 32856 |
| TBS index | 51 | 52 | 53 | 54 | 55 | 56 | 57 | 58 | 59 | 60 |
| Y2 | 34008 | 34008 | 35160 | 35160 | 36696 | 36696 | 37888 | 37888 | 39232 | 39232 |
| TBS index | 61 | 62 | 63 | 64 | 65 | 66 | 67 | 68 | 69 | 70 |
| Y2 | 40576 | 40576 | 42368 | 42368 | 43816 | 43816 | 43816 | 45352 | 45352 | 46888 |
| TBS index | 71 | 72 | 73 | 74 | 75 | 76 | 77 | 78 | 79 | 80 |
| Y2 | 46888 | 46888 | 48936 | 48936 | 48936 | 51024 | 51024 | 51024 | 52752 | 52752 |
| TBS index | 81 | 82 | 83 | 84 | 85 | 86 | 87 | 88 | 89 | 90 |
| Y2 | 52752 | 55056 | 55056 | 55056 | 57336 | 57336 | 57336 | 59256 | 59256 | 59256 |
| TBS index | 91 | 92 | 93 | 94 | 95 | 96 | 97 | 98 | 99 | 100 |
| Y2 | 59256 | 61664 | 61664 | 61664 | 63776 | 63776 | 63776 | 63776 | 66592 | 66592 |
| TBS index | 101 | 102 | 103 | 104 | 105 | 106 | 107 | 108 | 109 | 110 |
| Y2 | 66592 | 66592 | 68808 | 68808 | 68808 | 71112 | 71112 | 71112 | 71112 | 73712 | and/or,
the first TBS table includes a TBS index Y3 and at least one entry corresponding to the TBS index Y3 in the following Table B1, B2, B3, or B4, where any one entry includes one PRB quantity and one transmission block size corresponding to the PRB quantity:

TABLE B1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 936 | 1928 | 2856 | 3880 | 4776 | 5736 | 6712 | 7736 | 8504 | 9528 |
| TBS index | PRB quantity | | | | | | | | | |
| | 11 | 12 | 13 | 14 | 15 | 16 | 17 | 18 | 19 | 20 |
| Y3 | 10680 | 11448 | 12576 | 13536 | 14112 | 15264 | 16416 | 16992 | 18336 | 19080 |
| TBS index | PRB quantity | | | | | | | | | |
| | 21 | 22 | 23 | 24 | 25 | 26 | 27 | 28 | 29 | 30 |
| Y3 | 19848 | 21384 | 22152 | 22920 | 23688 | 24496 | 25456 | 26416 | 27376 | 28336 |
| TBS index | PRB quantity | | | | | | | | | |
| | 31 | 32 | 33 | 34 | 35 | 36 | 37 | 38 | 39 | 40 |
| Y3 | 29296 | 30576 | 31704 | 32856 | 34008 | 34008 | 35160 | 36696 | 37888 | 37888 |
| TBS index | PRB quantity | | | | | | | | | |
| | 41 | 42 | 43 | 44 | 45 | 46 | 47 | 48 | 49 | 50 |
| Y3 | 39232 | 40576 | 40576 | 42368 | 43816 | 43816 | 45352 | 45352 | 46888 | 46888 |
| TBS index | PRB quantity | | | | | | | | | |
| | 51 | 52 | 53 | 54 | 55 | 56 | 57 | 58 | 59 | 60 |
| Y3 | 48936 | 48936 | 51024 | 51024 | 52752 | 52752 | 55056 | 55056 | 57336 | 57336 |
| TBS index | PRB quantity | | | | | | | | | |
| | 61 | 62 | 63 | 64 | 65 | 66 | 67 | 68 | 69 | 70 |
| Y3 | 59256 | 59256 | 59256 | 61664 | 61664 | 63776 | 63776 | 63776 | 66592 | 66592 |
| TBS index | PRB quantity | | | | | | | | | |
| | 71 | 72 | 73 | 74 | 75 | 76 | 77 | 78 | 79 | 80 |
| Y3 | 68808 | 68808 | 71112 | 71112 | 71112 | 73712 | 73712 | 75376 | 76208 | 76208 |
| TBS index | PRB quantity | | | | | | | | | |
| | 81 | 82 | 83 | 84 | 85 | 86 | 87 | 88 | 89 | 90 |
| Y3 | 78704 | 78704 | 78704 | 81176 | 81176 | 81176 | 84760 | 84760 | 84760 | 84760 |
| TBS index | PRB quantity | | | | | | | | | |
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 101840 |
| TBS index | PRB quantity | | | | | | | | | |
| | 101 | 102 | 103 | 104 | 105 | 106 | 107 | 108 | 109 | 110 |
| Y3 | 101840 | 101840 | 101840 | 101840 | 101840 | 101840 | 101840 | 101840 | 101840 | 101840 |

TABLE B2

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 93800 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 101840 | 101840 | 101840 | 101840 | 105528 | 105528 |

TABLE B3

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 968 | 1992 | 2984 | 4008 | 4968 | 5992 | 6968 | 7992 | 8760 | 9912 |
| TBS index | PRB quantity | | | | | | | | | |
| | 11 | 12 | 13 | 14 | 15 | 16 | 17 | 18 | 19 | 20 |
| Y3 | 10680 | 11832 | 12960 | 13536 | 14688 | 15840 | 16992 | 17568 | 19080 | 19848 |
| TBS index | PRB quantity | | | | | | | | | |
| | 21 | 22 | 23 | 24 | 25 | 26 | 27 | 28 | 29 | 30 |
| Y3 | 20616 | 21384 | 22920 | 23688 | 24496 | 25456 | 26416 | 27376 | 28336 | 29296 |
| TBS index | PRB quantity | | | | | | | | | |
| | 31 | 32 | 33 | 34 | 35 | 36 | 37 | 38 | 39 | 40 |
| Y3 | 30576 | 31704 | 32856 | 34008 | 35160 | 35160 | 36696 | 37888 | 37888 | 39232 |
| TBS index | PRB quantity | | | | | | | | | |
| | 41 | 42 | 43 | 44 | 45 | 46 | 47 | 48 | 49 | 50 |
| Y3 | 40576 | 40576 | 42368 | 43816 | 43816 | 45352 | 46888 | 46888 | 48936 | 48936 |
| TBS index | PRB quantity | | | | | | | | | |
| | 51 | 52 | 53 | 54 | 55 | 56 | 57 | 58 | 59 | 60 |
| Y3 | 51024 | 51024 | 52752 | 52752 | 55056 | 55056 | 55056 | 57336 | 57336 | 59256 |
| TBS index | PRB quantity | | | | | | | | | |
| | 61 | 62 | 63 | 64 | 65 | 66 | 67 | 68 | 69 | 70 |
| Y3 | 59256 | 61664 | 61664 | 63776 | 63776 | 63776 | 66592 | 66592 | 68808 | 68808 |
| TBS index | PRB quantity | | | | | | | | | |
| | 71 | 72 | 73 | 74 | 75 | 76 | 77 | 78 | 79 | 80 |
| Y3 | 71112 | 71112 | 71112 | 73712 | 75376 | 76208 | 76208 | 76208 | 78704 | 78704 |
| TBS index | PRB quantity | | | | | | | | | |
| | 81 | 82 | 83 | 84 | 85 | 86 | 87 | 88 | 89 | 90 |
| Y3 | 81176 | 81176 | 81176 | 81176 | 84760 | 84760 | 84760 | 87936 | 87936 | 87936 |
| TBS index | PRB quantity | | | | | | | | | |
| | 91 | 92 | 93 | 94 | 95 | 96 | 97 | 98 | 99 | 100 |
| Y3 | 90816 | 90816 | 90816 | 93800 | 93800 | 93800 | 93800 | 97896 | 97896 | 97896 |

TABLE B3-continued

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 97896 | 97896 | 97896 | 97896 | 97896 | 97896 | 97896 | 97896 | 97896 |

TABLE B4

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 101840 | 101840 | 101840 | 105528 | 105528 | 105528 | 105528 | 105528 | 110136 | and/or,
the first TBS table includes TBS indexes Y4_1 to Y4_5 and at least one entry corresponding to the TBS indexes Y4_1 to Y4_5 in the following Table C1 or C2, where any one entry includes one PRB quantity and five transmission block sizes corresponding to the PRB quantity:

TABLE C1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4136 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2280 | 3112 | 3880 | 4584 | 5352 | 6200 | 6968 | 7736 |
| Y4_4 | 776 | 1608 | 2408 | 3240 | 4008 | 4776 | 5736 | 6456 | 7224 | 7992 |
| Y4_5 | 840 | 1672 | 2536 | 3368 | 4264 | 5160 | 5992 | 6712 | 7480 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8248 | 9144 | 9912 | 10296 | 11064 | 11832 | 12576 | 13536 | 14112 |
| Y4_2 | 7992 | 8760 | 9528 | 10296 | 11064 | 11832 | 12576 | 12960 | 14112 | 14688 |
| Y4_3 | 8504 | 9144 | 9912 | 10680 | 11448 | 12216 | 12960 | 14112 | 14688 | 15264 |
| Y4_4 | 8760 | 9528 | 10680 | 11448 | 12216 | 12960 | 13536 | 14688 | 15264 | 16416 |
| Y4_5 | 9144 | 10296 | 11064 | 11832 | 12576 | 13536 | 14112 | 15264 | 15840 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 20616 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19080 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 27376 | 28336 | 29296 | 30576 | 30576 |
| Y4_4 | 25456 | 25456 | 26416 | 27376 | 28336 | 29296 | 30576 | 30576 | 31704 | 32856 |
| Y4_5 | 26416 | 27376 | 28336 | 28336 | 29296 | 30576 | 31704 | 31704 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 39232 | 40576 | 42368 | 42368 |

TABLE C1-continued

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 46888 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 51024 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 57336 | 59256 |
| Y4_3 | 55056 | 55056 | 57336 | 57336 | 57336 | 59256 | 59256 | 59256 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 59256 | 61664 | 61664 | 61664 | 63776 | 63776 | 63776 | 66592 | 66592 |
| Y4_3 | 61664 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 63776 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 76208 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 73712 | 75376 | 76208 | 76208 | 76208 | 78704 | 78704 | 78704 | 81176 | 81176 |
| Y4_3 | 78704 | 78704 | 78704 | 81176 | 81176 | 81176 | 81176 | 84760 | 84760 | 84760 |
| Y4_4 | 81176 | 81176 | 84760 | 84760 | 84760 | 84760 | 87936 | 87936 | 87936 | 87936 |
| Y4_5 | 84760 | 87936 | 87936 | 87936 | 87936 | 90816 | 90816 | 90816 | 93800 | 93800 |

TABLE C2

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4264 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2344 | 3112 | 3880 | 4584 | 5352 | 6200 | 6968 | 7736 |
| Y4_4 | 808 | 1608 | 2408 | 3240 | 4008 | 4968 | 5736 | 6456 | 7224 | 7992 |
| Y4_5 | 840 | 1672 | 2536 | 3368 | 4264 | 5160 | 5992 | 6712 | 7736 | 8504 |

TABLE C2-continued

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8504 | 9144 | 9912 | 10680 | 11064 | 11832 | 12576 | 13536 | 14112 |
| Y4_2 | 7992 | 8760 | 9528 | 10296 | 11064 | 11832 | 12576 | 13536 | 14112 | 14688 |
| Y4_3 | 8504 | 9144 | 9912 | 10680 | 11448 | 12216 | 12960 | 14112 | 14688 | 15264 |
| Y4_4 | 8760 | 9912 | 10680 | 11448 | 12216 | 12960 | 13536 | 14688 | 15264 | 16416 |
| Y4_5 | 9144 | 10296 | 11064 | 11832 | 12576 | 13536 | 14688 | 15264 | 16416 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 21384 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19848 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 28336 | 28336 | 29296 | 30576 | 30576 |
| Y4_4 | 25456 | 26416 | 26416 | 27376 | 28336 | 29296 | 30576 | 30576 | 31704 | 32856 |
| Y4_5 | 26416 | 27376 | 28336 | 29296 | 29296 | 30576 | 31704 | 32856 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 40576 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37368 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 48936 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 59256 | 59256 |
| Y4_3 | 55056 | 55056 | 57336 | 57336 | 57336 | 59256 | 59256 | 61664 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 61664 | 61664 | 61664 | 63776 | 63776 | 63776 | 63776 | 66592 | 66592 |
| Y4_3 | 63776 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

TABLE C2-continued

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 66592 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 78704 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 75376 | 75376 | 76208 | 76208 | 78704 | 78704 | 78704 | 78704 | 81176 | 81176 |
| Y4_3 | 78704 | 78704 | 78704 | 81176 | 81176 | 81176 | 84760 | 84760 | 84760 | 84760 |
| Y4_4 | 81176 | 81176 | 84760 | 84760 | 84760 | 84760 | 87936 | 87936 | 87936 | 90816 |
| Y4_5 | 84760 | 87936 | 87936 | 87936 | 87936 | 90816 | 90816 | 90816 | 93800 | 93800 |

With reference to the third aspect or any one of the first to second possible implementations, in a fifth possible implementation, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is the QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

With reference to the third aspect or any one of the first to second possible implementations, in a sixth possible implementation, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

With reference to the third aspect or any one of the foregoing six possible implementations, in a seventh possible implementation, the first MCS table further includes:

at least one entry that is in the second MCS table and in which a modulation scheme is 64QAM.

With reference to the seventh possible implementation, in an eighth possible implementation, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM; or part of entries that are in the second MCS table and in which a modulation scheme is 64QAM, where the part of entries is at least one entry other than an entry in which an MCS index is greatest among all entries that are in the second MCS table and in which a modulation scheme is 64QAM.

With reference to the seventh or eighth possible implementation, in a ninth possible implementation, the at least one entry in which the modulation scheme is 64QAM and which is in the second MCS table includes:

a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM; or TBS indexes in R entries in which corresponding MCS indexes are smallest ones among entries that are in the first MCS table and in which a modulation scheme is higher than 64QAM may be equal to TBS indexes in R entries in which MCS indexes are greatest ones among all entries that are in the second MCS table and in which a modulation scheme is 64QAM and MCS indexes are not greater than 27, where R is a natural number.

With reference to the third aspect or any one of the foregoing nine possible implementations, in a tenth possible implementation, a value range of an MCS index in the first MCS table is the same as a value range of an MCS index in the second MCS table.

With reference to the third aspect or any one of the foregoing ten possible implementations, in an eleventh possible implementation, the first MCS table further includes at least one entry in the following Table D1, Table D2, Table D3, Table D4, or Table D5, and any one entry includes one MCS index, and a modulation order and a TBS index that are corresponding to the one MCS index:

TABLE D1

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D2

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 6 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D3

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D4

| MCS index $I_{MCS}$ | Modulation order $Q_m$ | TBS index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |

TABLE D4-continued

| MCS index $I_{MCS}$ | Modulation order $Q_m$ | TBS index $I_{TBS}$ |
|---|---|---|
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D5

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |
| 8 | 4 | 15 |
| 9 | 6 | 15 |
| 10 | 6 | 16 |
| 11 | 6 | 17 |
| 12 | 6 | 18 |
| 13 | 6 | 19 |
| 14 | 6 | 20 |
| 15 | 6 | 21 |
| 16 | 6 | 22 |
| 17 | 6 | 23 |
| 18 | 6 | 24 |
| 19 | 6 | 25 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

According to a fourth aspect, a CQI notifying apparatus is provided, including:

an acquiring module, configured to acquire a first CQI table;

a first acquiring module, configured to learn a first CQI index according to the first CQI table acquired by the acquiring module; and a sending module, configured to send the first CQI index acquired by the first acquiring module to a base station, so that the base station determines a first modulation and coding scheme MCS index according to the first CQI index, where the first CQI table acquired by the acquiring module includes:

an entry in which a modulation scheme is higher than 64 quadrature amplitude modulation QAM; and at least one entry that is in a second CQI table and in which a modulation scheme is quadrature phase shift keying QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in entries in the second CQI table include only QPSK, 16QAM, and 64QAM.

With reference to the fourth aspect, in a first possible implementation, the at least one entry, in which a modulation scheme is QPSK, in the first CQI table acquired by the acquiring module includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the second CQI table and in which a modulation scheme is QPSK.

With reference to the fourth aspect, in a second possible implementation, the at least one entry, in which a modulation scheme is 16QAM, in the first CQI table acquired by the acquiring module includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

With reference to the fourth aspect or any one of the foregoing two possible implementations, in a third possible implementation, the first CQI table acquired by the acquiring module further includes:

at least one entry that is in the second CQI table and in which a modulation scheme is 64QAM.

With reference to the third possible implementation, in a fourth possible implementation, the at least one entry in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

With reference to the fourth aspect, in a fifth possible implementation, a spectral efficiency in an entry in which a corresponding CQI index is smallest among entries that are in the first CQI table acquired by the acquiring module and in which a modulation scheme is higher than 64QAM is equal to a spectral efficiency in an entry in which a corresponding CQI index is greatest among all entries that are in the second CQI table and in which a modulation scheme is 64QAM; or spectral efficiencies in T entries in which corresponding CQI indexes are smallest ones among entries that are in the first CQI table and in which a modulation scheme is higher than 64QAM are equal to or approximately equal to spectral efficiencies in T entries in which corresponding CQI indexes are greatest ones among all entries that are in the second CQI table and in which a modulation scheme is 64QAM, where T is equal to any one natural number of 1-5.

With reference to the fourth aspect, in a sixth possible implementation, a spectral efficiency in an entry in which a corresponding CQI index is greatest among entries that are in the first CQI table and in which a modulation scheme is higher than 64QAM is:

4/3 times a spectral efficiency in an entry in which a corresponding CQI index is greatest among all entries that are in the second CQI table and in which a modulation scheme is 64QAM;

8 times a maximum code rate of a terminal, where the maximum code rate is a positive real number less than 1; or 7.4063; or 7.432.

With reference to the fourth aspect, in a seventh possible implementation, spectral efficiencies in X entries that are in the first CQI table and in which CQI indexes are greatest ones are an arithmetic progression or an approximately arithmetic progression of spectral efficiencies arranged in ascending order; that spectral efficiencies in X entries that are in the first CQI table and in which CQI indexes are greatest ones are an arithmetic progression of spectral efficiencies arranged in ascending order refers to that, starting from the second entry in the X entries arranged in ascending order of the spectral efficiencies, a difference between a spectral efficiency in each entry and a spectral efficiency in a respective preceding entry is equal to a same constant; that spectral efficiencies in X entries that are in the first CQI table and in which CQI indexes are greatest ones are an approximately arithmetic progression of spectral efficiencies arranged in ascending order refers to that, starting from the second entry in the X entries arranged in ascending order of the spectral efficiencies, a difference between a spectral efficiency in each entry and a spectral efficiency in a respective preceding entry is within a range from a constant minus a preset value to the constant plus the preset value; and X is an integer greater than 2;

a spectral efficiency in an entry in which a corresponding CQI index is smallest among the X entries that are in the first CQI table and in which the CQI indexes are greatest ones is equal to a spectral efficiency in an entry in which a corresponding CQI index is greatest among all entries that are in the second CQI table and in which a modulation scheme is 64QAM; and a spectral efficiency in an entry in which a corresponding CQI index is greatest among the X entries that are in the first CQI table and in which the CQI indexes are greatest ones is:

4/3 times the spectral efficiency in the entry in which the corresponding CQI index is greatest among all the entries that are in the second CQI table and in which a modulation scheme is 64QAM; or 8 times a maximum code rate of a terminal, where the maximum code rate is a positive real number less than 1; or 7.4063; or 7.432.

With reference to the fourth aspect or any one of the first to second, sixth, and seventh possible implementations, in an eighth possible implementation, spectral efficiencies in the entries that are in the first CQI table and in which a modulation scheme is higher than 64QAM include at least one of the following groups of numerical values:

{5.5547 6.1805 6.8062 7.432},
{6.1805 6.8062 7.432},
{5.5547 6.1797 6.8047 7.4297},
{6.1797 6.8047 7.4297},
{5.5547 6.1719 6.7891 7.4063},
{6.1719 6.7891 7.4063},
{5.5547 6.4934 7.432},
{6.4934 7.432},
{5.5547 6.4922 7.4297},
{6.4922 7.4297},
{5.5547 6.4805 7.4063},
{6.4805 7.4063},
{5.5547 6.4844 7.4063},
{6.4844 7.4063},
{5.5547 6.0240 6.4934 6.9627 7.432},
{6.0234 6.4922 6.9609 7.4297},
{5.5547 6.0234 6.4922 6.9609 7.4297},
{6.0176 6.4805 6.9434 7.4063},
{5.5547 6.0176 6.4805 6.9434 7.4063},
{6.0176 6.4805 6.9434 7.4063},
{5.5547 6.0156 6.4844 6.9453 7.4063},
{6.0156 6.4844 6.9453 7.4063},
{5.5547 5.9302 6.3056 6.6811 7.0565 7.432},
{5.9302 6.3056 6.6811 7.0565 7.432},
{5.5547 5.9297 6.3047 6.6797 7.0547 7.4297},
{5.9297 6.3047 6.6797 7.0547 7.4297},
{5.5547 5.9250 6.2953 6.6656 7.0360 7.4063},
{5.9250 6.2953 6.6656 7.0360 7.4063},
{5.5547 5.9219 6.2969 6.6641 7.0391 7.4063}, and
{5.9219 6.2969 6.6641 7.0391 7.4063}.

With reference to the fourth aspect, in a ninth possible implementation, a value range of a CQI index in the first CQI table acquired by the acquiring module is the same as a value range of a CQI index in the second CQI table.

According to a fifth aspect, an MCS notifying apparatus is provided, including:

an acquiring module, configured to acquire a first CQI table and a first MCS table;

a receiving module, configured to receive a first channel quality indicator CQI index sent by a terminal device, where the first CQI index is determined by the terminal device according to the first CQI table;

a determining module, configured to determine a first MCS index according to the first CQI table acquired by the acquiring module, the first MCS table acquired by the acquiring module, and the first CQI index received by the receiving module; and a sending module, configured to send the determined first MCS index to the terminal device, where the first CQI table acquired by the acquiring module includes:

an entry in which a modulation scheme is higher than 64QAM; and the first MCS table acquired by the acquiring module includes:

an entry in which a modulation scheme is higher than 64QAM; and at least one entry that is in a second MCS table and in which a modulation scheme is QPSK, where the at least one entry in which a modulation scheme is QPSK includes a combination, other than a second combination, formed by the at least one entry that is in the second MCS table and in which a modulation scheme is QPSK, the second combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table include only QPSK, 16QAM, and 64QAM.

With reference to the fifth aspect, in a first possible implementation, the first CQI table further includes:

at least one entry that is in a second CQI table and in which a modulation scheme is QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in the second CQI table include only QPSK, 16QAM, and 64QAM.

With reference to the fifth aspect or the first possible implementation, in a second possible implementation, the determining module is specifically configured to:

determine a first TBS index and the first MCS index according to an acquired first PRB quantity, the first CQI table acquired by the acquiring module, the first MCS table acquired by the acquiring module, a first TBS table, and the received first CQI index, where the first PRB quantity is a PRB quantity allocated to the terminal device by a base station; or the first PRB quantity is a greatest integer less than or equal to a product of the PRB quantity allocated to the terminal device and a specific coefficient; and the first TBS table includes at least one PRB quantity corresponding to each TBS index and a transmission block size corresponding to each PRB quantity; and the first TBS table is a TBS table corresponding to the first MCS table.

With reference to the second possible implementation, in a third possible implementation, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

With reference to the second possible implementation, in a fourth possible implementation, the determining module includes:

a first determining submodule, configured to determine, according to the first CQI table acquired by the acquiring module and the received first CQI index, a first modulation scheme and a first spectral efficiency that are corresponding to the received first CQI index;

a second determining submodule, configured to learn, according to the acquired first PRB quantity and the first spectral efficiency determined by the first determining submodule, a first transmission block size transmitted to the terminal device; and obtain, according to the first TBS table, the first TBS index that is in the first TBS table and corresponding to the first transmission block size and the first PRB quantity.

With reference to any one of the second to fourth possible implementations, in a fifth possible implementation, the first TBS table includes a TBS index Y1, where for each PRB quantity, a transmission block size corresponding to the TBS index Y1 is greater than a transmission block size corresponding to a TBS index 25 in the second TBS table and smaller than a transmission block size corresponding to a TBS index 26 in the second TBS table; a value range of a TBS index in the second TBS table is 0-26, and the second TBS table includes at least one PRB quantity corresponding to each TBS index and a transmission block size corresponding to each PRB quantity.

With reference to any one of the second to fourth possible implementations, in a sixth possible implementation, the first TBS table includes a TBS index Y2 and at least one entry corresponding to the TBS index Y2 in the following Table A, where any one entry includes one PRB quantity and one transmission block size corresponding to the PRB quantity:

TABLE A

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y2 | 648 | 1320 | 1992 | 2664 | 3368 | 4008 | 4584 | 5352 | 5992 | 6712 |
| TBS index | PRB quantity | | | | | | | | | |
| | 11 | 12 | 13 | 14 | 15 | 16 | 17 | 18 | 19 | 20 |
| Y2 | 7224 | 7992 | 8504 | 9144 | 9912 | 10680 | 11448 | 11832 | 12576 | 12960 |
| TBS index | PRB quantity | | | | | | | | | |
| | 21 | 22 | 23 | 24 | 25 | 26 | 27 | 28 | 29 | 30 |
| Y2 | 14112 | 14688 | 15264 | 15840 | 16416 | 16992 | 17568 | 18336 | 19080 | 19848 |

TABLE A-continued

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y2 | 20616 | 21384 | 22152 | 22920 | 22920 | 23688 | 24496 | 25456 | 25456 | 26416 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y2 | 27376 | 27376 | 28336 | 29296 | 29296 | 30576 | 31704 | 31704 | 32856 | 32856 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y2 | 40576 | 40576 | 42368 | 42368 | 43816 | 43816 | 43816 | 45352 | 45352 | 46888 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y2 | 46888 | 46888 | 48936 | 48936 | 48936 | 51024 | 51024 | 51024 | 52752 | 52752 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y2 | 52752 | 55056 | 55056 | 55056 | 57336 | 57336 | 57336 | 59256 | 59256 | 59256 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y2 | 59256 | 61664 | 61664 | 61664 | 63776 | 63776 | 63776 | 63776 | 66592 | 66592 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y2 | 66592 | 66592 | 68808 | 68808 | 68808 | 71112 | 71112 | 71112 | 71112 | 73712 | and/or,
the first TBS table includes a TBS index Y3 and at least one entry corresponding to the TBS index Y3 in the following Table B1, B2, B3, or B4, where any one entry includes one PRB quantity and one transmission block size corresponding to the PRB quantity:

TABLE B1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 936 | 1928 | 2856 | 3880 | 4776 | 5736 | 6712 | 7736 | 8504 | 9528 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y3 | 10680 | 11448 | 12576 | 13536 | 14112 | 15264 | 16416 | 16992 | 18336 | 19080 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y3 | 19848 | 21384 | 22152 | 22920 | 23688 | 24496 | 25456 | 26416 | 27376 | 28336 |

TABLE B1-continued

| TBS index | PRB quantity |||||||||| 
|---|---|---|---|---|---|---|---|---|---|
| | 31 | 32 | 33 | 34 | 35 | 36 | 37 | 38 | 39 | 40 |
| Y3 | 29296 | 30576 | 31704 | 32856 | 34008 | 34008 | 35160 | 36696 | 37888 | 37888 |

| TBS index | PRB quantity |||||||||| 
|---|---|---|---|---|---|---|---|---|---|
| | 41 | 42 | 43 | 44 | 45 | 46 | 47 | 48 | 49 | 50 |
| Y3 | 39232 | 40576 | 40576 | 42368 | 43816 | 43816 | 45352 | 45352 | 46888 | 46888 |

| TBS index | PRB quantity |||||||||| 
|---|---|---|---|---|---|---|---|---|---|
| | 51 | 52 | 53 | 54 | 55 | 56 | 57 | 58 | 59 | 60 |
| Y3 | 48936 | 48936 | 51024 | 51024 | 52752 | 52752 | 55056 | 55056 | 57336 | 57336 |

| TBS index | PRB quantity |||||||||| 
|---|---|---|---|---|---|---|---|---|---|
| | 61 | 62 | 63 | 64 | 65 | 66 | 67 | 68 | 69 | 70 |
| Y3 | 59256 | 59256 | 59256 | 61664 | 61664 | 63776 | 63776 | 63776 | 66592 | 66592 |

| TBS index | PRB quantity |||||||||| 
|---|---|---|---|---|---|---|---|---|---|
| | 71 | 72 | 73 | 74 | 75 | 76 | 77 | 78 | 79 | 80 |
| Y3 | 68808 | 68808 | 71112 | 71112 | 71112 | 73712 | 73712 | 75376 | 76208 | 76208 |

| TBS index | PRB quantity |||||||||| 
|---|---|---|---|---|---|---|---|---|---|
| | 81 | 82 | 83 | 84 | 85 | 86 | 87 | 88 | 89 | 90 |
| Y3 | 78704 | 78704 | 78704 | 81176 | 81176 | 81176 | 84760 | 84760 | 84760 | 84760 |

| TBS index | PRB quantity |||||||||| 
|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 101840 |

| TBS index | PRB quantity |||||||||| 
|---|---|---|---|---|---|---|---|---|---|
| | 101 | 102 | 103 | 104 | 105 | 106 | 107 | 108 | 109 | 110 |
| Y3 | 101840 | 101840 | 101840 | 101840 | 101840 | 101840 | 101840 | 101840 | 101840 | 101840 |

TABLE B2

| TBS index | PRB quantity |||||||||| 
|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 93800 |

| TBS index | PRB quantity |||||||||| 
|---|---|---|---|---|---|---|---|---|---|
| | 101 | 102 | 103 | 104 | 105 | 106 | 107 | 108 | 109 | 110 |
| Y3 | 97896 | 97896 | 97896 | 97896 | 101840 | 101840 | 101840 | 101840 | 105528 | 105528 |

TABLE B3

| TBS index | PRB quantity |||||||||| 
|---|---|---|---|---|---|---|---|---|---|
| | 1 | 2 | 3 | 4 | 5 | 6 | 7 | 8 | 9 | 10 |
| Y3 | 968 | 1992 | 2984 | 4008 | 4968 | 5992 | 6968 | 7992 | 8760 | 9912 |

TABLE B3-continued

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y3 | 10680 | 11832 | 12960 | 13536 | 14688 | 15840 | 16992 | 17568 | 19080 | 19848 |
| TBS index | PRB quantity | | | | | | | | | |
| | 21 | 22 | 23 | 24 | 25 | 26 | 27 | 28 | 29 | 30 |
| Y3 | 20616 | 21384 | 22920 | 23688 | 24496 | 25456 | 26416 | 27376 | 28336 | 29296 |
| TBS index | PRB quantity | | | | | | | | | |
| | 31 | 32 | 33 | 34 | 35 | 36 | 37 | 38 | 39 | 40 |
| Y3 | 30576 | 31704 | 32856 | 34008 | 35160 | 35160 | 36696 | 37888 | 37888 | 39232 |
| TBS index | PRB quantity | | | | | | | | | |
| | 41 | 42 | 43 | 44 | 45 | 46 | 47 | 48 | 49 | 50 |
| Y3 | 40576 | 40576 | 42368 | 43816 | 43816 | 45352 | 46888 | 46888 | 48936 | 48936 |
| TBS index | PRB quantity | | | | | | | | | |
| | 51 | 52 | 53 | 54 | 55 | 56 | 57 | 58 | 59 | 60 |
| Y3 | 51024 | 51024 | 52752 | 52752 | 55056 | 55056 | 55056 | 57336 | 57336 | 59256 |
| TBS index | PRB quantity | | | | | | | | | |
| | 61 | 62 | 63 | 64 | 65 | 66 | 67 | 68 | 69 | 70 |
| Y3 | 59256 | 61664 | 61664 | 63776 | 63776 | 63776 | 66592 | 66592 | 68808 | 68808 |
| TBS index | PRB quantity | | | | | | | | | |
| | 71 | 72 | 73 | 74 | 75 | 76 | 77 | 78 | 79 | 80 |
| Y3 | 71112 | 71112 | 71112 | 73712 | 75376 | 76208 | 76208 | 76208 | 78704 | 78704 |
| TBS index | PRB quantity | | | | | | | | | |
| | 81 | 82 | 83 | 84 | 85 | 86 | 87 | 88 | 89 | 90 |
| Y3 | 81176 | 81176 | 81176 | 81176 | 84760 | 84760 | 84760 | 87936 | 87936 | 87936 |
| TBS index | PRB quantity | | | | | | | | | |
| | 91 | 92 | 93 | 94 | 95 | 96 | 97 | 98 | 99 | 100 |
| Y3 | 90816 | 90816 | 90816 | 93800 | 93800 | 93800 | 93800 | 97896 | 97896 | 97896 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 97896 | 97896 | 97896 | 97896 | 97896 | 97896 |

TABLE B4

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 101840 | 101840 | 101840 | 105528 | 105528 | 105528 | 105528 | 105528 | 110136 | and/or, the first TBS table includes TBS indexes Y4_1 to Y4_5 and at least one entry corresponding to the TBS indexes Y4_1 to Y4_5 in the following Table C1 or C2, where any one entry includes one PRB quantity and five transmission block sizes corresponding to the PRB quantity:

TABLE C1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4136 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2280 | 3112 | 3880 | 4584 | 5352 | 6200 | 6968 | 7736 |
| Y4_4 | 776 | 1608 | 2408 | 3240 | 4008 | 4776 | 5736 | 6456 | 7224 | 7992 |
| Y4_5 | 840 | 1672 | 2536 | 3368 | 4264 | 5160 | 5992 | 6712 | 7480 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8248 | 9144 | 9912 | 10296 | 11064 | 11832 | 12576 | 13536 | 14112 |
| Y4_2 | 7992 | 8760 | 9528 | 10296 | 11064 | 11832 | 12576 | 12960 | 14112 | 14688 |
| Y4_3 | 8504 | 9144 | 9912 | 10680 | 11448 | 12216 | 12960 | 14112 | 14688 | 15264 |
| Y4_4 | 8760 | 9528 | 10680 | 11448 | 12216 | 12960 | 13536 | 14688 | 15264 | 16416 |
| Y4_5 | 9144 | 10296 | 11064 | 11832 | 12576 | 13536 | 14112 | 15264 | 15840 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 20616 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19080 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 27376 | 28336 | 29296 | 30576 | 30576 |
| Y4_4 | 25456 | 25456 | 26416 | 27376 | 28336 | 29296 | 30576 | 30576 | 31704 | 32856 |
| Y4_5 | 26416 | 27376 | 28336 | 28336 | 29296 | 30576 | 31704 | 31704 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 39232 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 46888 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 57336 | 59256 |
| Y4_3 | 55056 | 55056 | 57336 | 57336 | 57336 | 59256 | 59256 | 59256 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

TABLE C1-continued

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 59256 | 61664 | 61664 | 61664 | 63776 | 63776 | 63776 | 66592 | 66592 |
| Y4_3 | 61664 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 63776 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 76208 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 73712 | 75376 | 76208 | 76208 | 76208 | 78704 | 78704 | 78704 | 81176 | 81176 |
| Y4_3 | 78704 | 78704 | 78704 | 81176 | 81176 | 81176 | 81176 | 84760 | 84760 | 84760 |
| Y4_4 | 81176 | 81176 | 84760 | 84760 | 84760 | 84760 | 87936 | 87936 | 87936 | 87936 |
| Y4_5 | 84760 | 87936 | 87936 | 87936 | 87936 | 90816 | 90816 | 90816 | 93800 | 93800 |

TABLE C2

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4264 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2344 | 3112 | 3880 | 4584 | 5352 | 6200 | 6968 | 7736 |
| Y4_4 | 808 | 1608 | 2408 | 3240 | 4008 | 4968 | 5736 | 6456 | 7224 | 7992 |
| Y4_5 | 840 | 1672 | 2536 | 3368 | 4264 | 5160 | 5992 | 6712 | 7736 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8504 | 9144 | 9912 | 10680 | 11064 | 11832 | 12576 | 13536 | 14112 |
| Y4_2 | 7992 | 8760 | 9528 | 10296 | 11064 | 11832 | 12576 | 13536 | 14112 | 14688 |
| Y4_3 | 8504 | 9144 | 9912 | 10680 | 11448 | 12216 | 12960 | 14112 | 14688 | 15264 |
| Y4_4 | 8760 | 9912 | 10680 | 11448 | 12216 | 12960 | 13536 | 14688 | 15264 | 16416 |
| Y4_5 | 9144 | 10296 | 11064 | 11832 | 12576 | 13536 | 14688 | 15264 | 16416 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 21384 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 21384 | 22152 | 22152 | 22920 |
| Y4_4 | 16992 | 17568 | 18336 | 19848 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 28336 | 28336 | 29296 | 30576 | 30576 |
| Y4_4 | 25456 | 26416 | 26416 | 27376 | 28336 | 29296 | 30576 | 30576 | 31704 | 32856 |
| Y4_5 | 26416 | 27376 | 28336 | 29296 | 29296 | 30576 | 31704 | 32856 | 32856 | 34008 |

TABLE C2-continued

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 40576 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 48936 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 59256 | 59256 |
| Y4_3 | 55056 | 55056 | 57336 | 57336 | 57336 | 59256 | 59256 | 61664 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 61664 | 61664 | 61664 | 63776 | 63776 | 63776 | 66592 | 66592 | 66592 |
| Y4_3 | 63776 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 66592 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 78704 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 75376 | 75376 | 76208 | 76208 | 78704 | 78704 | 78704 | 78704 | 81176 | 81176 |
| Y4_3 | 78704 | 78704 | 78704 | 81176 | 81176 | 81176 | 84760 | 84760 | 84760 | 84760 |
| Y4_4 | 81176 | 81176 | 84760 | 84760 | 84760 | 84760 | 87936 | 87936 | 87936 | 90816 |
| Y4_5 | 84760 | 87936 | 87936 | 87936 | 87936 | 90816 | 90816 | 90816 | 93800 | 93800 |

With reference to any one of the foregoing six possible implementations, in a seventh possible implementation, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the CQI table and in which a modulation scheme is QPSK.

With reference to any one of the foregoing six possible implementations, in an eighth possible implementation, the at least one entry, in which a modulation scheme is 16QAM and which is in the second CQI table, in the first CQI table acquired by the acquiring module includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

With reference to any one of the foregoing eight possible implementations, in a ninth possible implementation, the first CQI table acquired by the acquiring module further includes:

at least one entry that is in the second CQI table and in which a modulation scheme is 64QAM.

With reference to the ninth possible implementation, in a tenth possible implementation, the at least one entry in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

With reference to any one of the foregoing ten possible implementations, in an eleventh possible implementation, a spectral efficiency in an entry in which a corresponding CQI index is smallest among entries that are in the first CQI table acquired by the acquiring module and in which a modulation scheme is higher than 64QAM is equal to a spectral efficiency in an entry in which a corresponding CQI index is greatest among all entries that are in the second CQI table and in which a modulation scheme is 64QAM; or spectral efficiencies in T entries in which corresponding CQI indexes are smallest ones among entries that are in the first CQI table and in which a modulation scheme is higher than 64QAM are equal to or approximately equal to spectral efficiencies in T entries in which corresponding CQI indexes are greatest ones among all entries that are in the second CQI table and in which a modulation scheme is 64QAM, where T is equal to any one natural number of 1-5.

With reference to any one of the foregoing eleven possible implementations, in a twelfth possible implementation, a value range of a CQI index in the first CQI table acquired by the acquiring module is the same as a value range of a CQI index in the second CQI table.

With reference to the fifth aspect or any one of the foregoing four possible implementations, in a thirteenth possible implementation, the at least one entry, in which a modulation scheme is QPSK and which is in the second MCS table, in the first MCS table acquired by the acquiring module includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

With reference to the fifth aspect or any one of the foregoing four possible implementations, in a fourteenth possible implementation, the at least one entry, in which a modulation scheme is 16QAM and which is in the second MCS table, in the first CQI table acquired by the acquiring module includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

With reference to the fifth aspect or any one of the first to fourth, thirteenth, and fourteenth possible implementations, in a fifteenth possible implementation, the first MCS table acquired by the acquiring module further includes:

at least one entry that is in the second MCS table and in which a modulation scheme is 64QAM.

With reference to the fifteenth possible implementation, in a sixteenth possible implementation, the at least one entry, in which a modulation scheme is 64QAM and which is in the second MCS table, in the first CQI table acquired by the acquiring module includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM; or part of entries that are in the second MCS table and in which a modulation scheme is 64QAM, where the part of entries is at least one entry other than an entry in which an MCS index is greatest among all entries that are in the second MCS table and in which a modulation scheme is 64QAM.

With reference to the fifteenth or sixteenth possible implementation, in a seventeenth possible implementation, a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM; or TBS indexes in R entries in which corresponding MCS indexes are smallest ones among entries that are in the first MCS table and in which a modulation scheme is higher than 64QAM may be equal to TBS indexes in R entries in which MCS indexes are greatest ones among all entries that are in the second MCS table and in which a modulation scheme is 64QAM and MCS indexes are not greater than 27, where R is a natural number.

With reference to the fifth aspect or any one of the foregoing four possible implementations and the thirteenth to seventeenth possible implementations, in an eighteenth possible implementation, a value range of an MCS index in the first MCS table acquired by the acquiring module is the same as a value range of an MCS index in the second MCS table.

With reference to the fifth aspect or any one of the foregoing four possible implementations, and the sixth, and the thirteenth to eighteenth possible implementations, in a nineteenth possible implementation, the first MCS table further includes at least one entry in the following Table D1, D2, D3, D4, or D5, and any one entry includes one MCS index, and a modulation order and a TBS index that are corresponding to the one MCS index:

TABLE D1

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |

TABLE D1-continued

| MCS index $I_{MCS}$ | Modulation order $Q_m$ | TBS index $I_{TBS}$ |
|---|---|---|
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D2

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 6 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D3

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |

TABLE D3-continued

| MCS index $I_{MCS}$ | Modulation order $Q_m$ | TBS index $I_{TBS}$ |
|---|---|---|
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D4

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D5

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |
| 8 | 4 | 15 |
| 9 | 6 | 15 |
| 10 | 6 | 16 |
| 11 | 6 | 17 |

TABLE D5-continued

| MCS index $I_{MCS}$ | Modulation order $Q_m$ | TBS index $I_{TBS}$ |
|---|---|---|
| 12 | 6 | 18 |
| 13 | 6 | 19 |
| 14 | 6 | 20 |
| 15 | 6 | 21 |
| 16 | 6 | 22 |
| 17 | 6 | 23 |
| 18 | 6 | 24 |
| 19 | 6 | 25 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

According to a sixth aspect, an MCS notifying apparatus is provided, including:

an acquiring module, configured to acquire a first MCS table;

a receiving module, configured to receive a first MCS index sent by a base station, where the first MCS index is determined by the base station according to the first MCS table acquired by the acquiring module; and a determining module, configured to determine a modulation order and a code block size according to the first MCS table acquired by the acquiring module and the first MCS index received by the receiving module, where the first MCS table acquired by the acquiring module includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination, formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table include only QPSK, 16QAM, and 64QAM.

With reference to the sixth aspect, in a first possible implementation, the determining module includes:

a first determining submodule, configured to determine a first TBS index and a modulation order according to the first MCS table acquired by the acquiring module and the received first MCS index; and a second determining submodule, configured to determine the code block size according to the first TBS index, a first PRB quantity, and a first TBS table, where the first PRB quantity is a PRB quantity allocated to the terminal device by the base station; or the first PRB quantity is a greatest integer less than or equal to a product of the PRB quantity allocated to the terminal device and a specific coefficient; and the first TBS table includes at least one PRB quantity corresponding to each TBS index and a transmission block size corresponding to each PRB quantity; and the first TBS table is a TBS table corresponding to the first MCS table.

With reference to the first possible implementation, in a second possible implementation, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

With reference to the first or second possible implementation, in a third possible implementation, the first TBS table includes a TBS index Y1, where for each PRB quantity, a transmission block size corresponding to the TBS index Y1 is greater than a transmission block size corresponding to a TBS index 25 in the second TBS table and smaller than a transmission block size corresponding to a TBS index 26 in the second TBS table; a value range of a TBS index in the second TBS table is 0-26, and the second TBS table includes at least one PRB quantity corresponding to each TBS index and a transmission block size corresponding to each PRB quantity.

With reference to the first or second possible implementation, in a fourth possible implementation, the first TBS table includes a TBS index Y2 and at least one entry corresponding to the TBS index Y2 in the following Table A, where any one entry includes one PRB quantity and one transmission block size corresponding to the PRB quantity:

TABLE A

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y2 | 648 | 1320 | 1992 | 2664 | 3368 | 4008 | 4584 | 5352 | 5992 | 6712 |
| TBS index | 11 | 12 | 13 | 14 | 15 | 16 | 17 | 18 | 19 | 20 |
| Y2 | 7224 | 7992 | 8504 | 9144 | 9912 | 10680 | 11448 | 11832 | 12576 | 12960 |
| TBS index | 21 | 22 | 23 | 24 | 25 | 26 | 27 | 28 | 29 | 30 |
| Y2 | 14112 | 14688 | 15264 | 15840 | 16416 | 16992 | 17568 | 18336 | 19080 | 19848 |
| TBS index | 31 | 32 | 33 | 34 | 35 | 36 | 37 | 38 | 39 | 40 |
| Y2 | 20616 | 21384 | 22152 | 22920 | 22920 | 23688 | 24496 | 25456 | 25456 | 26416 |
| TBS index | 41 | 42 | 43 | 44 | 45 | 46 | 47 | 48 | 49 | 50 |
| Y2 | 27376 | 27376 | 28336 | 29296 | 29296 | 30576 | 31704 | 31704 | 32856 | 32856 |
| TBS index | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| TBS index | 61 | 62 | 63 | 64 | 65 | 66 | 67 | 68 | 69 | 70 |
| Y2 | 40576 | 40576 | 42368 | 42368 | 43816 | 43816 | 43816 | 45352 | 45352 | 46888 |
| TBS index | 71 | 72 | 73 | 74 | 75 | 76 | 77 | 78 | 79 | 80 |
| Y2 | 46888 | 46888 | 48936 | 48936 | 48936 | 51024 | 51024 | 51024 | 52752 | 52752 |
| TBS index | 81 | 82 | 83 | 84 | 85 | 86 | 87 | 88 | 89 | 90 |
| Y2 | 52752 | 55056 | 55056 | 55056 | 57336 | 57336 | 57336 | 59256 | 59256 | 59256 |

TABLE A-continued

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y2 | 59256 | 61664 | 61664 | 61664 | 63776 | 63776 | 63776 | 63776 | 66592 | 66592 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y2 | 66592 | 66592 | 68808 | 68808 | 68808 | 71112 | 71112 | 71112 | 71112 | 73712 | and/or, the first TBS table includes a TBS index Y3 and at least one entry corresponding to the TBS index Y3 in the following Table B1, B2, B3, or B4, where any one entry includes one PRB quantity and one transmission block size corresponding to the PRB quantity:

TABLE B1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 936 | 1928 | 2856 | 3880 | 4776 | 5736 | 6712 | 7736 | 8504 | 9528 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y3 | 10680 | 11448 | 12576 | 13536 | 14112 | 15264 | 16416 | 16992 | 18336 | 19080 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y3 | 19848 | 21384 | 22152 | 22920 | 23688 | 24496 | 25456 | 26416 | 27376 | 28336 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y3 | 29296 | 30576 | 31704 | 32856 | 34008 | 34008 | 35160 | 36696 | 37888 | 37888 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y3 | 39232 | 40576 | 40576 | 42368 | 43816 | 43816 | 45352 | 45352 | 46888 | 46888 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y3 | 48936 | 48936 | 51024 | 51024 | 52752 | 52752 | 55056 | 55056 | 57336 | 57336 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y3 | 59256 | 59256 | 59256 | 61664 | 61664 | 63776 | 63776 | 63776 | 66592 | 66592 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y3 | 68808 | 68808 | 71112 | 71112 | 71112 | 73712 | 73712 | 75376 | 76208 | 76208 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y3 | 78704 | 78704 | 78704 | 81176 | 81176 | 81176 | 84760 | 84760 | 84760 | 84760 |

TABLE B1-continued

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 101840 |
| TBS index | PRB quantity | | | | | | | | | |
| | 101 | 102 | 103 | 104 | 105 | 106 | 107 | 108 | 109 | 110 |
| Y3 | 101840 | 101840 | 101840 | 101840 | 101840 | 101840 | 101840 | 101840 | 101840 | 101840 |

TABLE B2

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 93800 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 101840 | 101840 | 101840 | 101840 | 105528 | 105528 |

TABLE B3

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 968 | 1992 | 2984 | 4008 | 4968 | 5992 | 6968 | 7992 | 8760 | 9912 |
| TBS index | PRB quantity | | | | | | | | | |
| | 11 | 12 | 13 | 14 | 15 | 16 | 17 | 18 | 19 | 20 |
| Y3 | 10680 | 11832 | 12960 | 13536 | 14688 | 15840 | 16992 | 17568 | 19080 | 19848 |
| TBS index | PRB quantity | | | | | | | | | |
| | 21 | 22 | 23 | 24 | 25 | 26 | 27 | 28 | 29 | 30 |
| Y3 | 20616 | 21384 | 22920 | 23688 | 24496 | 25456 | 26416 | 27376 | 28336 | 29296 |
| TBS index | PRB quantity | | | | | | | | | |
| | 31 | 32 | 33 | 34 | 35 | 36 | 37 | 38 | 39 | 40 |
| Y3 | 30576 | 31704 | 32856 | 34008 | 35160 | 35160 | 36696 | 37888 | 37888 | 39232 |
| TBS index | PRB quantity | | | | | | | | | |
| | 41 | 42 | 43 | 44 | 45 | 46 | 47 | 48 | 49 | 50 |
| Y3 | 40576 | 40576 | 42368 | 43816 | 43816 | 45352 | 46888 | 46888 | 48936 | 48936 |
| TBS index | PRB quantity | | | | | | | | | |
| | 51 | 52 | 53 | 54 | 55 | 56 | 57 | 58 | 59 | 60 |
| Y3 | 51024 | 51024 | 52752 | 52752 | 55056 | 55056 | 55056 | 57336 | 57336 | 59256 |
| TBS index | PRB quantity | | | | | | | | | |
| | 61 | 62 | 63 | 64 | 65 | 66 | 67 | 68 | 69 | 70 |
| Y3 | 59256 | 61664 | 61664 | 63776 | 63776 | 63776 | 66592 | 66592 | 68808 | 68808 |

TABLE B3-continued

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y3 | 71112 | 71112 | 71112 | 73712 | 75376 | 76208 | 76208 | 76208 | 78704 | 78704 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y3 | 81176 | 81176 | 81176 | 81176 | 84760 | 84760 | 84760 | 87936 | 87936 | 87936 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y3 | 90816 | 90816 | 90816 | 93800 | 93800 | 93800 | 93800 | 97896 | 97896 | 97896 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 97896 | 97896 | 97896 | 97896 | 97896 | 97896 | 97896 | 97896 | 97896 |

TABLE B4

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 101840 | 101840 | 101840 | 105528 | 105528 | 105528 | 105528 | 105528 | 110136 | and/or, the first TBS table includes TBS indexes Y4_1 to Y4_5 and at least one entry corresponding to the TBS indexes Y4_1 to Y4_5 in the following Table C1 or C2, where any one entry includes one PRB quantity and five transmission block sizes corresponding to the PRB quantity:

TABLE C1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4136 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2280 | 3112 | 3880 | 4584 | 5352 | 6200 | 6968 | 7736 |
| Y4_4 | 776 | 1608 | 2408 | 3240 | 4008 | 4776 | 5736 | 6456 | 7224 | 7992 |
| Y4_5 | 840 | 1672 | 2536 | 3368 | 4264 | 5160 | 5992 | 6712 | 7480 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8248 | 9144 | 9912 | 10296 | 11064 | 11832 | 12576 | 13536 | 14112 |
| Y4_2 | 7992 | 8760 | 9528 | 10296 | 11064 | 11832 | 12576 | 12960 | 14112 | 14688 |
| Y4_3 | 8504 | 9144 | 9912 | 10680 | 11448 | 12216 | 12960 | 14112 | 14688 | 15264 |
| Y4_4 | 8760 | 9528 | 10680 | 11448 | 12216 | 12960 | 13536 | 14688 | 15264 | 16416 |
| Y4_5 | 9144 | 10296 | 11064 | 11832 | 12576 | 13536 | 14112 | 15264 | 15840 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 20616 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19080 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

TABLE C1-continued

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 27376 | 28336 | 29296 | 30576 | 30576 |
| Y4_4 | 25456 | 25456 | 26416 | 27376 | 28336 | 29296 | 30576 | 30576 | 31704 | 32856 |
| Y4_5 | 26416 | 27376 | 28336 | 28336 | 29296 | 30576 | 31704 | 31704 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 39232 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 46888 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 51024 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 57336 | 59256 |
| Y4_3 | 55056 | 55056 | 57336 | 57336 | 57336 | 59256 | 59256 | 59256 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 59256 | 61664 | 61664 | 61664 | 63776 | 63776 | 63776 | 66592 | 66592 |
| Y4_3 | 61664 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 63776 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 76208 | 76208 | 76208 | 76208 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 73712 | 75376 | 76208 | 76208 | 76208 | 78704 | 78704 | 78704 | 81176 | 81176 |
| Y4_3 | 78704 | 78704 | 78704 | 81176 | 81176 | 81176 | 81176 | 84760 | 84760 | 84760 |
| Y4_4 | 81176 | 81176 | 84760 | 84760 | 84760 | 84760 | 87936 | 87936 | 87936 | 87936 |
| Y4_5 | 84760 | 87936 | 87936 | 87936 | 87936 | 90816 | 90816 | 90816 | 93800 | 93800 |

TABLE C2

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4264 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2344 | 3112 | 3880 | 4584 | 5352 | 6200 | 6968 | 7736 |
| Y4_4 | 808 | 1608 | 2408 | 3240 | 4008 | 4968 | 5736 | 6456 | 7224 | 7992 |
| Y4_5 | 840 | 1672 | 2536 | 3368 | 4264 | 5160 | 5992 | 6712 | 7736 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8504 | 9144 | 9912 | 10680 | 11064 | 11832 | 12576 | 13536 | 14112 |
| Y4_2 | 7992 | 8760 | 9528 | 10296 | 11064 | 11832 | 12576 | 13536 | 14112 | 14688 |
| Y4_3 | 8504 | 9144 | 9912 | 10680 | 11448 | 12216 | 12960 | 14112 | 14688 | 15264 |
| Y4_4 | 8760 | 9912 | 10680 | 11448 | 12216 | 12960 | 13536 | 14688 | 15264 | 16416 |
| Y4_5 | 9144 | 10296 | 11064 | 11832 | 12576 | 13536 | 14688 | 15264 | 16416 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 21384 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19848 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 28336 | 28336 | 29296 | 30576 | 30576 |
| Y4_4 | 25456 | 26416 | 26416 | 27376 | 28336 | 29296 | 30576 | 30576 | 31704 | 32856 |
| Y4_5 | 26416 | 27376 | 28336 | 29296 | 29296 | 30576 | 31704 | 32856 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 40576 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 48936 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 59256 | 59256 |
| Y4_3 | 55056 | 55056 | 57336 | 57336 | 57336 | 59256 | 59256 | 61664 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

TABLE C2-continued

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 61664 | 61664 | 61664 | 63776 | 63776 | 63776 | 63776 | 66592 | 66592 |
| Y4_3 | 63776 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 66592 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 78704 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 75376 | 75376 | 76208 | 76208 | 78704 | 78704 | 78704 | 78704 | 81176 | 81176 |
| Y4_3 | 78704 | 78704 | 78704 | 81176 | 81176 | 81176 | 84760 | 84760 | 84760 | 84760 |
| Y4_4 | 81176 | 81176 | 84760 | 84760 | 84760 | 84760 | 87936 | 87936 | 87936 | 90816 |
| Y4_5 | 84760 | 87936 | 87936 | 87936 | 87936 | 90816 | 90816 | 90816 | 93800 | 93800 |

With reference to the sixth aspect or any one of the foregoing two possible implementations, in a fifth possible implementation, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are no the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

With reference to the sixth aspect or any one of the foregoing two possible implementations, in a sixth possible implementation, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

With reference to the sixth aspect or any one of the foregoing six possible implementations, in a seventh possible implementation, the first MCS table acquired by the acquiring module further includes:

at least one entry that is in the second MCS table and in which a modulation scheme is 64QAM.

With reference to the seventh possible implementation, in an eighth possible implementation, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM; or part of entries that are in the second MCS table and in which a modulation scheme is 64QAM, where the part of entries is at least one entry other than an entry in which an MCS index is greatest among all entries that are in the second MCS table and in which a modulation scheme is 64QAM.

With reference to the seventh or eighth possible implementation, in a ninth possible implementation, a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM; or TBS indexes in R entries in which corresponding MCS indexes are smallest ones among entries that are in the first MCS table and in which a modulation scheme is higher than 64QAM may be equal to TBS indexes in R entries in which MCS indexes are greatest ones among all entries that are in the second MCS table and in which a modulation scheme is 64QAM and MCS indexes are not greater than 27, where R is a natural number.

With reference to the sixth aspect or any one of the foregoing nine possible implementations, in a tenth possible implementation, a value range of an MCS index in the first MCS table acquired by the acquiring module is the same as a value range of an MCS index in the second MCS table.

With reference to the sixth aspect or any one of the foregoing ten possible implementations, in an eleventh possible implementation, the first MCS table further includes at least one entry in the following Table D1, D2, D3, D4, or D5, and any one entry includes one MCS index, and a modulation order and a TBS index that are corresponding to the one MCS index:

TABLE D1

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D2

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 6 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D3

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |

TABLE D3-continued

| MCS index $I_{MCS}$ | Modulation order $Q_m$ | TBS index $I_{TBS}$ |
|---|---|---|
| 28 | 2 | Reserved |
| 29 | 4 | |
| 30 | 6 | |
| 31 | 8 | |

TABLE D4

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D5

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |
| 8 | 4 | 15 |
| 9 | 6 | 15 |
| 10 | 6 | 16 |
| 11 | 6 | 17 |
| 12 | 6 | 18 |
| 13 | 6 | 19 |
| 14 | 6 | 20 |
| 15 | 6 | 21 |
| 16 | 6 | 22 |
| 17 | 6 | 23 |
| 18 | 6 | 24 |
| 19 | 6 | 25 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

According to a seventh aspect, a channel quality indicator CQI notifying apparatus is provided, including:
a memory and a processor connected to the memory; and further including a transmitter, where
the memory stores a group of program code, and the processor is configured to call the program code stored in the memory, so as to execute the method according to the first aspect; and
the transmitter is configured to send the program code that is stored in the memory and that is called by the processor, so as to execute the method according to the first aspect or any one possible implementation of the first aspect to obtain a first CQI index.

According to an eighth aspect, a modulation and coding scheme MCS notifying apparatus is provided, including:
a memory and a processor connected to the memory; and further including a transmitter and a receiver, where
the memory stores a group of program code, and the processor is configured to call the program code stored in the memory, so as to execute the method according to the second aspect of the summary or any one possible implementation of the second aspect; and
the receiver is configured to receive a first CQI index sent by a terminal device, and the transmitter is configured to send the program code that is stored in the memory and that is called by the processor, so as to execute the method according to the second aspect of claims or any one possible implementation of the second aspect to obtain a first MCS index.

According to a ninth aspect, a modulation and coding scheme MCS notifying apparatus is provided, including: a memory and a processor connected to the memory; and further including a receiver, where
the memory stores a group of program code, and the processor is configured to call the program code stored in the memory, so as to execute the method according to the third aspect or any one possible implementation of the third aspect; and
the receiver is configured to receive a first MCS index sent by a base station.

The present invention provides a method and apparatus for notifying a channel quality indicator and a modulation and coding scheme, which enables a terminal device to select a modulation scheme higher than 64QAM and to notify a base station by using a method for sending a CQI index, and also enables the base station to select a modulation scheme higher than 64QAM and to notify the terminal device by using a method for sending an MCS index, thereby improving system performance.

The embodiments of the present invention provide a method and apparatus for notifying a channel quality indicator and a modulation and coding scheme, which can further enable a terminal device to select a relatively low spectral efficiency and to notify a base station by using a method for sending a CQI index, and also enable the base station to select a relatively small transmission block size and to notify the terminal device by using a method for sending an MCS index, thereby ensuring that a terminal device may also be adapted to a sudden low signal to noise ratio scenario when using a high-order modulation scheme, that is to say, ensuring that the terminal device can be adapted to a drastic change of a signal to noise ratio.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A adaptive modulation and coding of a physical downlink shared channel (PDSCH, Physical Downlink Shared Channel) follows the procedure:

first, a user equipment (terminal device, User Equipment) estimates channel information that is used for measuring channel state information (CSI, Channel State Information); then, the terminal device calculates a signal to interference plus noise ratio (SINR, Signal to Interference plus Noise Ratio) by using the channel information and based on an optimal rank indication (RI, Rank Indication) and/or an optimal precoding matrix indication (PMI, Precoding Matrix Indication); and finally, the terminal device obtains a corresponding channel quality indicator (CQI, Channel Quality Indicator) according to the SINR and reports a value of the CQI to a base station.

In addition, a modulation order in the present invention is corresponding to a modulation scheme. For example, if a modulation scheme is quadrature phase shift keying (QPSK, Quadrature Phase Shift Keying), a modulation order is 2; if a modulation scheme is 16QAM, a modulation order is 4; if a modulation scheme is 64QAM, a modulation order is 6; and if a modulation scheme is 256QAM, a modulation order is 8.

With reference to an accompanying drawing, the following describes in detail a CQI notifying method according to an embodiment of the present invention.

Figure 1:
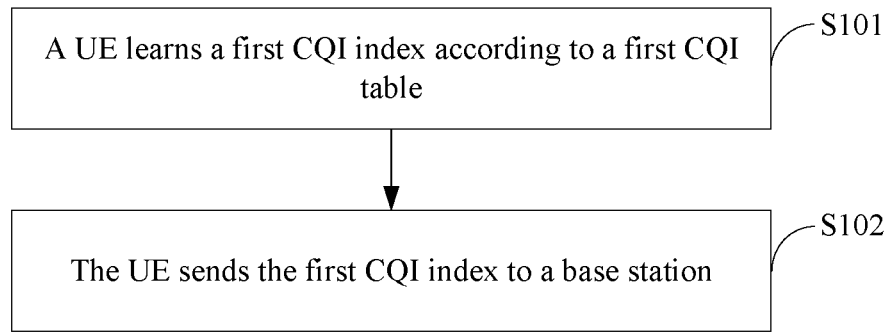
FIG. 1 is a schematic diagram of a CQI notifying method according to an embodiment of the present invention.

As shown in FIG. 1, steps of the CQI notifying method are as follows:

S101: A terminal device learns a first CQI index according to an acquired first CQI table.

The first CQI table may be predefined in a protocol, preset by the terminal device in compliance with a protocol, or prestored by the terminal device; or is selected by the terminal device from at least two predefined tables according to a downlink channel state; or may be notified by a base station to the terminal device. Specifically, a method for notifying the terminal device by the base station may be: selecting, by the base station, one table from at least two predefined tables according to an uplink channel state or a downlink channel state, and notifying the terminal device of the selected table. A CQI table is used for describing a mapping relationship between CQI indexes and entries. The mapping relationship in the CQI table in this embodiment of the present invention is only used as an example for ease of understanding the present invention, and a representation format of the CQI table in the present invention is not meant to be limited to the format described herein, that is to say, the CQI table may have various combinations, provided that it is able to present a mapping relationship between CQI indexes and entries. All of the combinations shall fall within the protection scope of the present invention.

Specifically, the terminal device determines a first spectral efficiency according to a measured first SINR, and then, acquires, according to the first spectral efficiency and the first CQI table, the first CQI index corresponding to the first spectral efficiency. The first CQI table is prestored by the terminal device.

The first CQI table may include:

an entry in which a modulation scheme is higher than 64QAM; and at least one entry that is in a second CQI table and in which a modulation scheme is QPSK, where the at least one entry in which a modulation scheme is QPSK may include a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in entries in the second CQI table may only include QPSK, 16QAM, and 64QAM.

That is to say, the first CQI table includes an entry in which a modulation scheme is higher than 64QAM; and the first CQI table may further include at least one entry that is in the second CQI table and in which a modulation scheme is QPSK, where entries that are in the first CQI table and in which a modulation scheme is QPSK cannot merely be N entries that are in the second CQI table and in which a modulation scheme is QPSK and corresponding CQI indexes are continuous and greatest ones, and N may be equal to 3, or N may be a positive integer less than 4, or N may be a positive integer; and/or the first CQI table further includes at least one entry that is in the second CQI table and in which a modulation scheme is 16QAM.

Further, the values of N in the present invention are only a few examples, and are not meant to limit the present invention.

Modulation schemes in the entries in the second CQI table merely include QPSK, 16QAM, and 64QAM; an entry in the first CQI table may refer to one modulation scheme, one code rate, and one spectral efficiency that are corresponding to a CQI index in the first CQI table; and an entry in the second CQI table refers to one modulation scheme, one code rate, and one spectral efficiency that are corresponding to a CQI index in the second CQI table. Apparently, an entry in the present invention may be set according to uplink state information or downlink state information, and the foregoing entries in the first CQI table and the second CQI table in the present invention are only examples, and are not meant to limit the present invention.

In addition, the combination may be a combination formed by the at least one entry that is in the second CQI table and in which a modulation scheme is QPSK. In an example of the second CQI table shown in Table 1, there are $2^6-1=63$ combinations formed by the at least one entry that is in the second CQI table and in which a modulation scheme is QPSK. For example, the combination may be a combination formed by an entry, is in the second CQI table, that is corresponding to CQI index 6, or may be a combination formed by entries, in the second CQI table, that are respectively corresponding to CQI indexes 4, 5, and 6, or may be a combination formed by entries, in the second CQI table, that are respectively corresponding to CQI indexes 3, 5, and 6, or the like.

Specifically, there may exist the following three types of first CQI tables:

a first type of first CQI table: merely includes an entry in which a modulation scheme is QPSK and an entry in which a modulation scheme is higher than 64QAM;

a second type of first CQI table: merely includes an entry in which a modulation scheme is 16QAM and an entry in which a modulation scheme is higher than 64QAM; and a third type of first CQI table: merely includes an entry in which a modulation scheme is QPSK, an entry in which a modulation scheme is 16QAM, and an entry in which a modulation scheme is higher than 64QAM.

There may be various types of first CQI tables in the present invention, and the foregoing three types of first CQI tables are only examples for ease of understanding the present invention, and are not meant to limit the present invention.

For ease of understanding, the following CQI table (namely, the second CQI table) is used as an example for description:

TABLE 1

| CQI index | Modulation scheme | Code rate × 1024 | Spectral efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The first CQI table includes an entry in which a modulation scheme is higher than 64QAM. For example, one entry or a plurality of entries in which a modulation scheme is higher than 64QAM may be included.

For example, a modulation scheme that is higher than 64QAM and included in the first CQI table may be 128QAM, 256QAM, and/or the like. If the first CQI table merely includes one modulation scheme, the modulation scheme may be any of 128QAM, 256QAM, and other higher modulation schemes; and if the first CQI table includes a plurality of modulation schemes, the plurality of modulation schemes included in the first CQI table may be any one or more of 128QAM, 256QAM, and other higher modulation schemes.

For example, as shown in the following table, the first CQI table may include entries in which modulation schemes are higher than 64QAM:

TABLE 2

| CQI index | Modulation scheme | Code rate × 1024 | Spectral efficiency |
|---|---|---|---|
| 13 | 128QAM | 778 | 6.0800 |
| 14 | 128QAM | 860 | 6.7200 |
| 15 | 256QAM | 942 | 7.3600 |

It should be noted that, to minimize changes to the prior art during a specific implementation process, preferably, a value range of CQI index in the first CQI table and a value range of CQI index in the second CQI table may be the same, and specifically, may be 0-15. Apparently, a value range of CQI index in the first CQI table may also be greater than a value range of CQI index in the second CQI table, for example, a value range of CQI index in the first CQI table may also be 0-20. The value range of CQI index in this embodiment of the present invention is only an example for ease of understanding the present invention, and is not meant to limit the present invention.

First type of first CQI table: the first type of first CQI table merely includes an entry in which a modulation scheme is QPSK and an entry in which a modulation scheme is higher than 64QAM.

The first CQI table may include one entry or a plurality of entries in which a modulation scheme is higher than 64QAM, and each entry in which a modulation scheme is higher than 64QAM includes a modulation scheme, a code rate, and a spectral efficiency, and has a corresponding CQI index.

The first CQI table may further include part of entries that are in the second CQI table and in which a modulation scheme is QPSK, to be specific, part of six entries, in the second CQI table (namely, Table 1), that are respectively corresponding to CQI indexes 1-6 and in which a modulation scheme is QPSK; and the entries that are in the first CQI table and in which a modulation scheme is QPSK are not N entries that are in the second CQI table and in which a modulation scheme is QPSK and corresponding CQI indexes are continuous and greatest ones, where N is equal to 3. In other words, entries that are in the first CQI table and in which a modulation scheme is QPSK cannot merely be entries, in the second CQI table, that are respectively corresponding to CQI indexes 4, 5, and 6.

Alternatively, the first CQI table may further include part of entries that are in the second CQI table and in which a modulation scheme is QPSK, to be specific, part of six entries, in the second CQI table, that are respectively corresponding to CQI indexes 1-6 and in which a modulation scheme is QPSK; and entries that are in the first CQI table and in which a modulation scheme is QPSK are not N entries that are in the second CQI table and in which a modulation scheme is QPSK and corresponding CQI indexes are continuous and greatest ones, where N is a positive integer and N is less than 4, which means that N may be equal to 1, 2, or 3;

if N is equal to 1, an entry that is in the first CQI table and in which a modulation scheme is QPSK cannot merely be an entry that is in the second CQI table and corresponding to CQI index 6; or if N is equal to 2, entries that are in the first CQI table and in which a modulation scheme is QPSK cannot merely be entries that are in the second CQI table and are respectively corresponding to CQI indexes 5 and 6; or if N is equal to 3, entries that are in the first CQI table and in which a modulation scheme is QPSK cannot merely be entries that are in the second CQI table and are respectively corresponding to CQI indexes 4, 5, and 6.

Alternatively, the first CQI table further includes part of entries that are in the second CQI table and in which a modulation scheme is QPSK, to be specific, part of six entries, in the second CQI table, that are respectively corresponding to CQI indexes 1-6 and in which a modulation scheme is QPSK; and entries that are in the first CQI table and in which a modulation scheme is QPSK are not N entries that are in the second CQI table and in which a modulation scheme is QPSK and corresponding CQI indexes are continuous and greatest ones, where N is a positive integer, which means that a value range of N may be 1-5;

If N is equal to 1, an entry that is in the first CQI table and in which a modulation scheme is QPSK cannot merely be an entry that is in the second CQI table and is corresponding to a CQI index 6; or if N is equal to 2, entries that are in the first CQI table and in which a modulation scheme is QPSK cannot merely be entries, in the second CQI table, that are respectively corresponding to CQI indexes 5 and 6; or if N is equal to 3, entries that are in the first CQI table and in which a modulation scheme is QPSK cannot merely be entries, in the second CQI table, that are respectively corresponding to CQI indexes 4, 5, and 6; or if N is equal to 4, entries that are in the first CQI table and in which a modulation scheme is QPSK cannot merely be entries, in the second CQI table, that are respectively corresponding to CQI indexes 3, 4, 5, and 6; or if N is equal to 5, entries that are in the first CQI table and in which a modulation scheme is QPSK cannot merely be entries, in the second CQI table, that are respectively corresponding to CQI indexes 2, 3, 4, 5, and 6.

Further, the values of N in the present invention are only a few examples, and are not meant to limit the present invention.

Alternatively, entries that are in the first CQI table and in which a modulation scheme is QPSK include part of entries that are in the second CQI table and in which a modulation scheme is QPSK, and a difference between successive CQI indexes corresponding to the part of entries are the same.

For example, if entries that are in the first CQI table and in which a modulation scheme is QPSK include three of entries that are in the second CQI table and in which a modulation scheme is QPSK, the entries that are in the first CQI table and in which a modulation scheme is QPSK may include entries, in the second CQI table, that are respectively corresponding to CQI indexes 1, 3, and 5, or the entries that are in the first CQI table and in which a modulation scheme is QPSK may include entries, in the second CQI table, that are respectively corresponding to CQI indexes 2, 4, and 6.

Still alternatively, entries that are in the first CQI table and in which a modulation scheme is QPSK include part of entries that are in the second CQI table and in which a modulation scheme is QPSK, and a difference between successive CQI indexes corresponding to the part of entries are not the same.

For example, if entries that are in the first CQI table and in which a modulation scheme is QPSK include three of entries that are in the second CQI table and in which a modulation scheme is QPSK, the entries that are in the first CQI table and in which a modulation scheme is QPSK may include entries, in the second CQI table, that are respectively corresponding to CQI indexes 1, 4, and 6, or the entries that are in the first CQI table and in which a modulation scheme is QPSK may include entries, in the second CQI table, that are respectively corresponding to CQI indexes 2, 5, and 6;

alternatively, if entries that are in the first CQI table and in which a modulation scheme is QPSK include four of entries that are in the second CQI table and in which a modulation scheme is QPSK, the entries that are in the first CQI table and in which a modulation scheme is QPSK may include entries, in the second CQI table, that are respectively corresponding to CQI indexes 1, 3, 4, and 6, or the entries that are in the first CQI table and in which a modulation scheme is QPSK may include entries, in the second CQI table, that are respectively corresponding to CQI indexes 1, 2, 4, and 6;

alternatively, if entries that are in the first CQI table and in which a modulation scheme is QPSK include five of entries that are in the second CQI table and in which a modulation scheme is QPSK, the entries that are in the first CQI table and in which a modulation scheme is QPSK may include entries, in the second CQI table, that are respectively corresponding to CQI indexes 1, 2, 3, 4, and 6.

Alternatively, entries that are in the first CQI table and in which a modulation scheme is QPSK include part of entries that are in the second CQI table and in which a modulation scheme is QPSK, where CQI indexes corresponding to the part of entries are discontinuous, and the part of entries is at least one entry other than an entry in which a corresponding CQI index is greatest among all the entries that are in the second CQI table and in which a modulation scheme is QPSK.

For example, entries that are in the first CQI table and in which a modulation scheme is QPSK may include entries, in the second CQI table, that are respectively corresponding to CQI indexes 1 and 3, or entries that are in the first CQI table and in which a modulation scheme is QPSK may include entries, in the second CQI table, that are respectively corresponding to CQI indexes 2, 4, and 5.

Still alternatively, entries that are in the first CQI table and in which a modulation scheme is QPSK include part of entries that are in the second CQI table in which a modulation scheme is QPSK, where CQI indexes corresponding to the part of entries are continuous, and the part of entries is at least one entry other than an entry in which a corresponding CQI index is greatest among all the entries that are in the CQI table and in which a modulation scheme is QPSK.

For example, entries that are in the first CQI table and in which a modulation scheme is QPSK may include entries, in the second CQI table, that are respectively corresponding to CQI indexes 2, 3, and 4, or entries that are in the first CQI table and in which a modulation scheme is QPSK may include entries, in the second CQI table, that are respectively corresponding to CQI indexes 2, 3, 4, and 5.

Second type of first CQI table: the first type of first CQI table merely includes an entry in which a modulation scheme is 16QAM and an entry in which a modulation scheme is higher than 64QAM.

The first CQI table may include one entry or a plurality of entries in which a modulation scheme is higher than 64QAM, and each entry in which a modulation scheme is higher than 64QAM includes a modulation scheme, a code rate, and a spectral efficiency, and has a corresponding CQI index.

The first CQI table further includes all entries that are in the second CQI table and in which a modulation scheme is 16QAM.

Exemplarily, the first CQI table further includes three entries, in the second CQI table, that are respectively corresponding to CQI indexes 7-9 and in which a corresponding modulation scheme is 16QAM.

Alternatively, specifically, the first CQI table further includes part of entries that are in the second CQI table and in which a modulation scheme is 16QAM, where the part of entries is at least one entry other than an entry in which a corresponding CQI index is smallest among all entries that are in the second CQI table and in which a modulation scheme is 16QAM.

Exemplarily, entries that are in the first CQI table and in which a modulation scheme is 16QAM may further include entries, in the second CQI table, that are respectively corresponding to CQI indexes 8 and 9, or entries that are in the first CQI table and in which a modulation scheme is 16QAM may further include an entry, in a second CQI table, that is corresponding to CQI index 8 or 9.

Third type of first CQI table: an entry in which a modulation scheme is 16QAM is added to the first type of first CQI table to obtain the third type of first CQI table. The third type of first CQI table merely includes an entry in which a modulation scheme is QPSK, an entry in which a modulation scheme is 16QAM, and an entry in which a modulation scheme is higher than 64QAM. An entry that is included in the third type of first CQI table and in which a modulation scheme is 16QAM may be the same as an entry that is included in the second type of first CQI table and in which a modulation scheme is 16QAM.

Specifically, the first CQI table further includes all entries that are in the second CQI table and in which a modulation scheme is 16QAM.

Alternatively, specifically, the first CQI table further includes part of entries that are in the second CQI table and in which a modulation scheme is 16QAM, where the part of entries is at least one entry other than an entry in which a corresponding CQI index is smallest among all entries that are in the second CQI table and in which a modulation scheme is 16QAM.

Further, the first CQI table further includes at least one entry that is in the second CQI table and in which a modulation scheme is 64QAM.

That is to say, an entry in which a modulation scheme is 64QAM is added to the first type of first CQI table to obtain a fourth type of first CQI table; in this case, the fourth type of first CQI table includes an entry in which a modulation scheme is QPSK, an entry in which a modulation scheme is higher than 64QAM, and an entry in which a modulation scheme is 64QAM;

alternatively, an entry in which a modulation scheme is 64QAM is added to the second type of first CQI table to obtain a fifth type of first CQI table; in this case, the fifth type of first CQI table includes an entry in which a modulation scheme is higher than 64QAM, an entry in which a modulation scheme is 16QAM, and an entry in which a modulation scheme is 64QAM;

still alternatively, an entry in which a modulation scheme is 64QAM is added to the third type of first CQI table to obtain a sixth type of first CQI table; in this case, the sixth type of first CQI table includes an entry in which a modulation scheme is higher than 64QAM, an entry in which a modulation scheme is QPSK, an entry in which a modulation scheme is 16QAM, and an entry in which a modulation scheme is 64QAM.

In the fourth, fifth or sixth type of first CQI table, an entry in which a modulation scheme is 64QAM is as follows:

specifically, the first CQI table further includes all entries that are in the second CQI table and in which a modulation scheme is 64QAM.

Exemplarily, six entries, in the second CQI table, that are respectively corresponding to CQI indexes 10-15 and in which a corresponding modulation scheme is 64QAM are included.

Alternatively, specifically, the first CQI table further includes part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

Exemplarily, entries that are in the first CQI table and in which a modulation scheme is 64QAM may further include entries, in the second CQI table, that are respectively corresponding to CQI indexes 10-M, where M may be 11, 12, 13, or 14; entries that are in the first CQI table and in which a modulation scheme is 64QAM may further include entries, in the second CQI table, that are respectively corresponding to CQI indexes 10, 12, and 14; and entries that are in the first CQI table and in which a modulation scheme is 64QAM may further include entries, in the second CQI table, that are respectively corresponding to CQI indexes 10 and 13, or entries that are in the first CQI table and in which a modulation scheme is 64QAM may further include entries, in the second CQI table, that are corresponding to CQI indexes 10, 13, and 14.

Further, in the foregoing six types of first CQI tables, a spectral efficiency in an entry in which a corresponding CQI index is smallest among entries in which a modulation scheme is higher than 64QAM may be equal to a spectral efficiency in an entry in which a corresponding CQI index is greatest among all entries that are in the second CQI table and in which a modulation scheme is 64QAM.

Further, in the foregoing six types of first CQI tables, spectral efficiencies $\{S_1, \ldots, S_i, \ldots, S_T\}$ (which are arranged in ascending order) in T entries in which corresponding CQI indexes are smallest ones among entries in which a modulation scheme is higher than 64QAM may be equal to or approximately equal to spectral efficiencies $\{P_1, \ldots, P_i, \ldots, P_T\}$ (which are arranged in ascending order) in T entries in which corresponding CQI indexes are greatest ones among all entries that are in the second CQI table and in which a modulation scheme is 64QAM. T is equal to any natural number of 1-5, and $1 \leq i \leq T$. Being approximately equal means that $\{S_1, \ldots, S_i, \ldots, S_T\}$ are not completely the same as $\{P_1, \ldots, P_i, \ldots, P_T\}$, and a difference between $S_i$ and $P_i$ is less than a preset value a.

Exemplarily, spectral efficiencies in T entries in which corresponding CQI indexes are smallest ones among entries that are in the first CQI table and in which a modulation scheme is higher than 64QAM include any one or more (more than two) of the following numerical values: {3.3223, 3.9023, 4.5234, 5.1152, 5.5547} or include any one or more of the following numerical values: {3.3203, 3.8984, 4.5234, 5.1172, 5.5547}. The foregoing spectral efficiencies are respectively equal to or approximately equal to spectral efficiencies in five entries in which corresponding CQI indexes are greatest ones among all entries that are in the second CQI table and in which a modulation scheme is 64QAM.

In an example of T=2, T entries which corresponding CQI indexes are smallest ones among entries that are in the first CQI table and in which a modulation scheme is higher than 64QAM are shown in Table 3.

TABLE 3

| CQI index | Modulation scheme | Code rate × 1024 | Spectral efficiency |
|---|---|---|---|
| 11 | 256QAM | 655 | 5.1172 |
| 12 | 256QAM | 711 | 5.5547 |

Exemplarily, it is assumed that: in the first CQI table, there are three entries in which a modulation scheme is QPSK, and corresponding CQI indexes are 1-3; there are three entries in which a modulation scheme is 16QAM, and corresponding CQI indexes are 4-6; there are five entries in which a modulation scheme is 64QAM, and corresponding CQI indexes are 7-11; and since a value range of CQI index in the first CQI table is 0-15, in the first CQI table, there are four entries in which a modulation scheme is higher than 64QAM, and corresponding CQI indexes are 12-15, where a smallest CQI index among the entries is 12. Specifically, as shown in Table 1, the entry that is in the first CQI table and is corresponding to the CQI index 12 is the entry that is in the second CQI table and is corresponding to the CQI index 15.

It may be known according to Table 4 that, an entry in the first CQI table and an entry in the second CQI table that are corresponding to a same CQI index may be the same, for example, when a CQI index is 1; an entry in the first CQI table and an entry in the second CQI table that are corresponding to a same CQI index may be different, for example, when CQI indexes are 5, 9 and 10.

TABLE 4

| CQI index in a first CQI table | CQI index in a second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 3 | QPSK | 193 | 0.3770 |
| 3 | 5 | QPSK | 449 | 0.8770 |
| 4 | 7 | 16QAM | 378 | 1.4766 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 256QAM | 711 | 5.5547 |
| 13 | — | 256QAM | 778 | 6.0800 |
| 14 | — | 256QAM | 860 | 6.7200 |
| 15 | — | 256QAM | 942 | 7.3600 |

It may be seen that, each of the foregoing six types of first CQI tables includes an entry in which a modulation scheme is higher than 64QAM, so that the terminal device is supported to select a modulation scheme higher than 64QAM, and to notify a base station by using a method for sending a CQI index, thereby improving system performance. In addition, the sixth type of first CQI table includes an entry in which a modulation scheme is QPSK, an entry in which a modulation scheme is 16QAM, an entry in which a modulation scheme is 64QAM, and an entry in which a modulation scheme is higher than 64QAM, and is a preferable first CQI table.

Further optionally, in any one of the foregoing first CQI tables, a spectral efficiency in an entry in which a corresponding CQI index is greatest among entries in which a modulation scheme is higher than 64QAM may be:

4/3 times a spectral efficiency in an entry in which a corresponding CQI index is greatest among all entries that are in the second CQI table and in which a modulation scheme is 64QAM; or 8 times a maximum code rate of a terminal device, where the maximum code rate is a positive real number less than 1; or 7.4063; or 7.432.

It should be noted that, a maximum code rate of a terminal refers to a maximum code rate at which a transmission block may be received by the terminal. If a code rate of a transmission block is greater than the maximum code rate of the terminal, the terminal may not receive the transmission block. A maximum code rate of a terminal is not a code rate in a CQI table. Generally, a maximum code rate of a terminal may be 0.93 or 0.929.

Optionally, in any one of the foregoing first CQI tables, spectral efficiencies in X entries in which CQI indexes are greatest ones are an arithmetic progression or an approximately arithmetic progression when the spectral efficiencies are arranged in ascending order; when it is mentioned that spectral efficiencies in X entries that are in the first CQI table and in which CQI indexes are greatest ones are an arithmetic progression of spectral efficiencies arranged in ascending order, it means that starting from the second entry in the X entries arranged in ascending order of the spectral efficiencies, a difference between a spectral efficiency in each entry and a spectral efficiency in a respective preceding entry is equal to a same constant; or when it is mentioned that spectral efficiencies in X entries that are in the first CQI table and in which CQI indexes are greatest ones are an approximately arithmetic progression of spectral efficiencies arranged in ascending order, it means that starting from the second entry in the X entries arranged in ascending order of the spectral efficiencies, a difference between a spectral efficiency in each entry and a spectral efficiency in a respective preceding entry is within a range from a constant minus a preset value to the constant plus the preset value; and X is an integer greater than 2.

Specifically, it is assumed that: spectral efficiencies in X entries that are in the first CQI table and in which CQI indexes are greatest ones are respectively $(m_1, m_2, \ldots, m_X)$; starting from the second entry in the X entries, a difference between a spectral efficiency in each entry and a spectral efficiency in a respective preceding entry is calculated and recorded as $t_i$, where $1 \le i \le X-1$, that is, $(t_1, t_2, \ldots, t_{X-1})$, and $t_i = m_{i+1} - m_i$.

If all numerical values in the $(t_1, t_2, \ldots, t_{X-1})$ are equal (which are a constant), spectral efficiencies in X entries that are in the first CQI table and in which CQI indexes are greatest ones are an arithmetic progression of spectral efficiencies arranged in ascending order, where the constant is referred to as a common difference in the arithmetic progression.

If an absolute value of difference between each the numerical value in the $(t_1, t_2, \ldots, t_{X-1})$ and a constant is within a preset value range, spectral efficiencies in X entries that are in the first CQI table and in which CQI indexes are greatest ones are an approximately arithmetic progression of spectral efficiencies arranged in ascending order. It may also be understood as that: if an absolute value of a difference between any two adjacent numerical values in the $(t_1, t_2, \ldots, t_{X-1})$ is less than a preset value, all the numerical values in the $(t_1, t_2, \ldots, t_{X-1})$ are approximately equal, and therefore the spectral efficiencies in X entries that are in the first CQI table and in which CQI indexes are greatest ones are an approximately arithmetic progression of spectral efficiencies arranged in ascending order, where the constant is referred to as a common difference in the approximately arithmetic progression.

Exemplarily, in an example of X=3, three entries that are in the first CQI table and in which CQI indexes are greatest ones are shown in Table 5-1.

TABLE 5-1

| CQI index | Modulation scheme | Code rate × 1024 | Spectral efficiency |
| --- | --- | --- | --- |
| 13 | 256QAM | 790 | 6.1719 |
| 14 | 256QAM | 869 | 6.7891 |
| 15 | 256QAM | 948 | 7.4063 |

As shown in Table 5-1, spectral efficiencies corresponding to entries in which respective CQI indexes are 13-15 are respectively 6.1719, 6.7891, and 7.4063; starting from the second entry (namely, an entry in which a CQI index is 14), a difference between a spectral efficiency in each entry and a spectral efficiency in a respective preceding entry is equal to 0.6172, the spectral efficiencies in the three entries that are in the first CQI table and in which CQI indexes are greatest ones form an arithmetic progression in ascending order of the spectral efficiencies.

Exemplarily, in an example of X=3, three entries that are in the first CQI table and in which CQI indexes are greatest ones are shown in Table 5-2.

TABLE 5-2

| CQI index | Modulation scheme | Code rate × 1024 | Spectral efficiency |
| --- | --- | --- | --- |
| 13 | 256QAM | 791 | 6.1797 |
| 14 | 256QAM | 871 | 6.8047 |
| 15 | 256QAM | 951 | 7.4297 |

As shown in Table 5-2, spectral efficiencies corresponding to entries in which respective CQI indexes are 13-15 are 6.1797, 6.8047, and 7.4297, respectively; starting from the second entry (namely, an entry in which a CQI index is 14), a difference between a spectral efficiency in each entry and a spectral efficiency in a respective preceding entry is equal to 0.625, the spectral efficiencies in the three entries that are in the first CQI table and in which CQI indexes are greatest ones form an arithmetic progression in ascending order of the spectral efficiencies; or as shown in Table 5-2, spectral efficiencies corresponding to entries in which respective CQI indexes are 13-15 are 6.1805, 6.8062, and 7.432, respectively; if a preset value is 0.001, and starting from the second entry (namely, an entry in which a CQI index is 14), a difference between a spectral efficiency in each entry and a spectral efficiency in a respective preceding entry is within a range from 0.625 minus 0.001 to 0.625 plus 0.001, the spectral efficiencies in the three entries that are in the first CQI table and in which CQI indexes are greatest ones form an approximately arithmetic progression in ascending order of the spectral efficiencies.

In addition, optionally, a spectral efficiency in an entry in which a corresponding CQI index is smallest among X entries that are in the first CQI table and in which CQI indexes are greatest ones may be equal to a spectral efficiency in an entry in which a corresponding CQI index is greatest among all entries that are in the second CQI table and in which a modulation scheme is 64QAM.

Optionally, a spectral efficiency in an entry in which a corresponding CQI index is greatest among X entries that are in the first CQI table and in which CQI indexes are greatest ones may be:

4/3 times a spectral efficiency in an entry in which a corresponding CQI index is greatest among all entries that are in the second CQI table and in which a modulation scheme is 64QAM; or 8 times a maximum code rate of a terminal, where the maximum code rate is a positive real number less than 1; or 7.4063; or 7.432.

Further optionally, in any one of the foregoing first CQI tables, spectral efficiencies in entries in which a modulation scheme is higher than 64QAM include at least one of the following groups of numerical values:

{5.5547 6.1805 6.8062 7.432},
{6.1805 6.8062 7.432},
{5.5547 6.1797 6.8047 7.4297},
{6.1797 6.8047 7.4297},
{5.5547 6.1719 6.7891 7.4063},
{6.1719 6.7891 7.4063},
{5.5547 6.4934 7.432},
{6.4934 7.432},
{5.5547 6.4922 7.4297},
{6.4922 7.4297},
{5.5547 6.4805 7.4063},
{6.4805 7.4063},
{5.5547 6.4844 7.4063},

{6.4844 7.4063},
{5.5547 6.0240 6.4934 6.9627 7.432},
{6.0234 6.4922 6.9609 7.4297},
{5.5547 6.0234 6.4922 6.9609 7.4297},
{6.0176 6.4805 6.9434 7.4063},
{5.5547 6.0176 6.4805 6.9434 7.4063},
{6.0176 6.4805 6.9434 7.4063},
{5.5547 6.0156 6.4844 6.9453 7.4063},
{6.0156 6.4844 6.9453 7.4063},
{5.5547 5.9302 6.3056 6.6811 7.0565 7.432},
{5.9302 6.3056 6.6811 7.0565 7.432},
{5.5547 5.9297 6.3047 6.6797 7.0547 7.4297},
{5.9297 6.3047 6.6797 7.0547 7.4297},
{5.5547 5.9250 6.2953 6.6656 7.0360 7.4063},
{5.9250 6.2953 6.6656 7.0360 7.4063},
{5.5547 5.9219 6.2969 6.6641 7.0391 7.4063}, and
{5.9219 6.2969 6.6641 7.0391 7.4063}.

As an example, each of spectral efficiencies in entries that are in the first CQI table and in which a modulation scheme is higher than 64QAM includes one of the following groups of numerical values:

{5.5547 6.1797 6.8047 7.4297}; or
{6.1797 6.8047 7.4297}; or
{5.5547 6.1719 6.7891 7.4063}; or
{6.1719 6.7891 7.4063}.

Four types of first CQI tables are listed as follows:

TABLE 6-1

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 3 | QPSK | 193 | 0.3770 |
| 3 | 5 | QPSK | 449 | 0.8770 |
| 4 | 7 | 16QAM | 378 | 1.4766 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 256QAM | 711 | 5.5547 |
| 13 | — | 256QAM | 791 | 6.1797 |
| 14 | — | 256QAM | 871 | 6.8047 |
| 15 | — | 256QAM | 951 | 7.4297 |

TABLE 6-2

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 3 | QPSK | 193 | 0.3770 |
| 3 | 5 | QPSK | 449 | 0.8770 |
| 4 | 7 | 16QAM | 378 | 1.4766 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 64QAM | 948 | 5.5547 |
| 13 | — | 256QAM | 791 | 6.1797 |
| 14 | — | 256QAM | 871 | 6.8047 |
| 15 | — | 256QAM | 951 | 7.4297 |

TABLE 6-3

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 3 | QPSK | 193 | 0.3770 |
| 3 | 5 | QPSK | 449 | 0.8770 |
| 4 | 7 | 16QAM | 378 | 1.4766 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 256QAM | 711 | 5.5547 |
| 13 | — | 256QAM | 790 | 6.1719 |
| 14 | — | 256QAM | 869 | 6.7891 |
| 15 | — | 256QAM | 948 | 7.4063 |

TABLE 6-4

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 3 | QPSK | 193 | 0.3770 |
| 3 | 5 | QPSK | 449 | 0.8770 |
| 4 | 7 | 16QAM | 378 | 1.4766 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 64QAM | 948 | 5.5547 |
| 13 | — | 256QAM | 790 | 6.1719 |
| 14 | — | 256QAM | 869 | 6.7891 |
| 15 | — | 256QAM | 948 | 7.4063 |

Another four types of first CQI tables are listed as follows:

TABLE 6-5

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 2 | QPSK | 120 | 0.2344 |
| 3 | 4 | QPSK | 308 | 0.6016 |
| 4 | 6 | QPSK | 602 | 1.1758 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 256QAM | 655 | 5.1172 |
| 12 | 15 | 256QAM | 711 | 5.5547 |
| 13 | — | 256QAM | 791 | 6.1797 |
| 14 | — | 256QAM | 871 | 6.8047 |
| 15 | — | 256QAM | 951 | 7.4297 |

TABLE 6-6

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 2 | QPSK | 120 | 0.2344 |
| 3 | 4 | QPSK | 308 | 0.6016 |
| 4 | 6 | QPSK | 602 | 1.1758 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 256QAM | 711 | 5.5547 |
| 13 | — | 256QAM | 791 | 6.1797 |
| 14 | — | 256QAM | 871 | 6.8047 |
| 15 | — | 256QAM | 951 | 7.4297 |

TABLE 6-7

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 2 | QPSK | 120 | 0.2344 |
| 3 | 4 | QPSK | 308 | 0.6016 |
| 4 | 6 | QPSK | 602 | 1.1758 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 256QAM | 655 | 5.1172 |
| 12 | 15 | 256QAM | 711 | 5.5547 |
| 13 | — | 256QAM | 790 | 6.1719 |
| 14 | — | 256QAM | 869 | 6.7891 |
| 15 | — | 256QAM | 948 | 7.4063 |

TABLE 6-8

| CQI index in the first CQI table | CQI index in the second CQI table | Modulation scheme | Code rate × 1024 | Spectral efficiency |
|---|---|---|---|---|
| 0 | 0 | | out of range | |
| 1 | 1 | QPSK | 78 | 0.1523 |
| 2 | 2 | QPSK | 120 | 0.2344 |
| 3 | 4 | QPSK | 308 | 0.6016 |
| 4 | 6 | QPSK | 602 | 1.1758 |
| 5 | 8 | 16QAM | 490 | 1.9141 |
| 6 | 9 | 16QAM | 616 | 2.4063 |
| 7 | 10 | 64QAM | 466 | 2.7305 |
| 8 | 11 | 64QAM | 567 | 3.3223 |
| 9 | 12 | 64QAM | 666 | 3.9023 |
| 10 | 13 | 64QAM | 772 | 4.5234 |
| 11 | 14 | 64QAM | 873 | 5.1152 |
| 12 | 15 | 256QAM | 711 | 5.5547 |
| 13 | — | 256QAM | 790 | 6.1719 |
| 14 | — | 256QAM | 869 | 6.7891 |
| 15 | — | 256QAM | 948 | 7.4063 |

It should be noted that the foregoing first CQI tables may not include the column "CQI index in the second CQI table", where the column is added to indicate a relationship between the first CQI table and the second CQI table.

Further, it should be noted that, the foregoing first CQI tables are used for describing a mapping relationship between CQI indexes and entries, and a mapping relationship in the first CQI table in this embodiment of the present invention is only used as an example for ease of understanding the present invention, and a representation format of the first CQI table in the present invention is not meant to be limited to the format described herein, to be specific, the first CQI table may have various combinations, provided that it is able to present a mapping relationship between first CQI indexes and entries. All of the combinations shall fall within the protection scope of the present invention.

S102: The terminal device sends the first CQI index to a base station.

The present invention provides a method and apparatus for notifying a channel quality indicator and a modulation and coding scheme, which enables a terminal device to select a modulation scheme higher than 64QAM and to notify a base station by using a method for sending a CQI index, and also enables the base station to select a modulation scheme higher than 64QAM and to notify the terminal device by using a method for sending an MCS index, thereby improving system performance.

With reference to an accompanying drawing, the following describes in detail an MCS notifying method according to an embodiment of the present invention.

Figure 2:
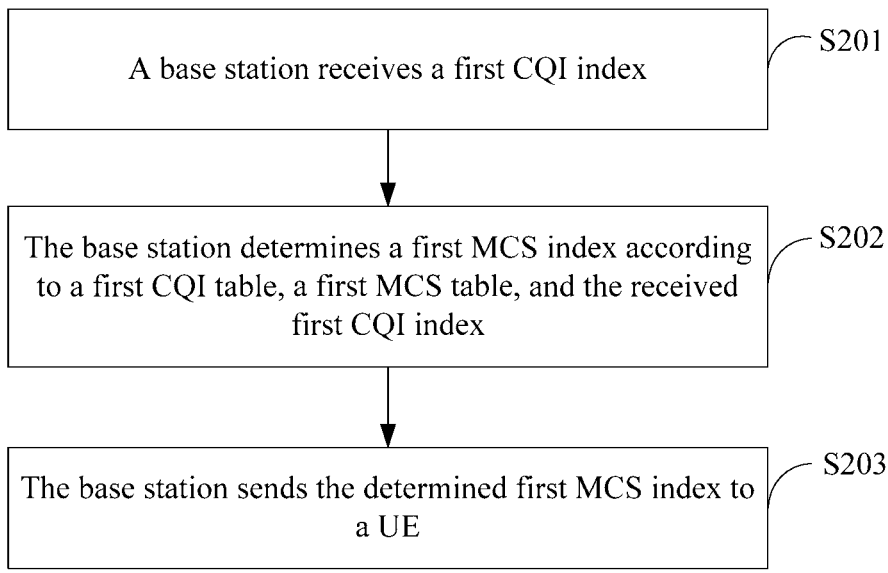
FIG. 2 is a schematic diagram of an MCS notifying method according to an embodiment of the present invention.

As shown in FIG. 2, steps of the MCS notifying method are as follows:

S201: A base station receives a first CQI index.

The first CQI index is determined by a terminal device according to an acquired first CQI table.

S202: The base station determines a first MCS index according to a first CQI table, a first MCS table, and the received first CQI index.

The first CQI table may be predefined in a protocol, preset by the terminal device in compliance with a protocol, or prestored by the terminal device; or is selected by the terminal device from at least two predefined tables according to a downlink channel state; or may be notified by the base station to the terminal device. Specifically, a method for notifying the terminal device by the base station may be: selecting, by the base station, one table from at least two predefined tables according to an uplink channel state or a downlink channel state, and notifying the terminal device of the selected table. A CQI table is used for describing a mapping relationship between CQI indexes and entries. The mapping relationship in the CQI table in this embodiment of the present invention is only used as an example for ease of understanding the present invention, and a representation format of the CQI table in the present invention is not meant to be limited to the format described herein, that is to say, the CQI table may have various combinations, provided that it is able to present a mapping relationship between CQI indexes and entries. All of the combinations shall fall within the protection scope of the present invention.

The first MCS table may be predefined in a protocol, preset by the terminal device in compliance with a protocol, or prestored by the terminal device; or is selected by the terminal device from at least two predefined tables according to a downlink channel state; or may be notified by the base station to the terminal device, and specifically, a method for notifying the terminal device by the base station may be: selecting, by the base station, one table from at least two predefined tables according to an uplink channel state or a downlink channel state, and notifying the terminal device of the selected table. The MCS table is used for describing a mapping relationship between MCS indexes and entries. A mapping relationship in the MCS table in this embodiment of the present invention is only used as an example for ease of understanding the present invention, and a representation format of the MCS table in the present invention is not meant to be limited to the format described herein, that is to say, the MCS table may have various combinations, provided that it is able to present a mapping relationship between MCS indexes and entries. All of the combinations shall fall within the protection scope of the present invention.

The first CQI table may include:

an entry in which a modulation scheme is higher than 64QAM; and at least one entry that is in a second CQI table and in which a modulation scheme is QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in the second CQI table merely include QPSK, 16QAM, and 64QAM.

That is to say, the first CQI table includes an entry in which a modulation scheme is higher than 64QAM; and the first CQI table further includes at least one entry that is in the second CQI table and in which a modulation scheme is QPSK, where entries that are in the first CQI table and in which a modulation scheme is QPSK cannot merely be N entries that are in the second CQI table and in which a modulation scheme is QPSK and corresponding CQI indexes are continuous and greatest ones, and N is equal to 3, or N is a positive integer less than 4, or N is a positive integer; and/or the first CQI table further includes at least one entry that is in the second CQI table and in which a modulation scheme is 16QAM, where modulation schemes in the entries in the second CQI table merely include QPSK, 16QAM, and 64QAM; an entry in the first CQI table refers to one modulation scheme, one code rate, and one spectral efficiency that are corresponding to a CQI index in the first CQI table; an entry in the second CQI table refers to one modulation scheme, one code rate, and one spectral efficiency that are corresponding to a CQI index in the second CQI table.

It should be noted that, for details about the first CQI table in this embodiment, refer to the descriptions of the first CQI table in the embodiment corresponding to FIG. 1, and further elaboration is not provided in this embodiment.

The first MCS table may include:

an entry in which a modulation scheme is higher than 64QAM; and at least one entry that is in the second MCS table and in which a modulation scheme is QPSK, where the at least one entry in which a modulation scheme is QPSK includes a combination, other than a second combination, formed by the at least one entry that is in the second MCS table and in which a modulation scheme is QPSK, the second combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

That is to say, the first MCS table further includes at least one entry that is in the second MCS table and in which a modulation scheme is QPSK, where entries that are in the second MCS table and in which a modulation scheme is QPSK cannot merely be K entries that are in the second MCS table and in which corresponding MCS indexes are continuous and greatest ones, and K is equal to 4, or K is a positive integer less than 5, or K is a positive integer; and/or the first MCS table further includes at least one entry that is in the second MCS table and in which a modulation scheme is 16QAM, where modulation schemes in the entries in the second CQI table merely include QPSK, 16QAM, and 64QAM. An entry in the first MCS table refers to one modulation scheme and one TBS index that are corresponding to an MCS index in the first MCS table; an entry in the second MCS table refers to one modulation scheme and one TBS index that are corresponding to an MCS index in the second MCS table.

The combination is a combination formed by the at least one entry that is in the second MCS table and in which a modulation scheme is QPSK. In an example of the second MCS table shown in Table 6-2, there are $2^9-1=1023$ combinations formed by the at least one entry that is in the second MCS table and in which a modulation scheme is QPSK. For example, the combination may be a combination formed by an entry, in the second MCS table, that is corresponding to MCS index 6, may be a combination formed by entries, in the second MCS table, that are respectively corresponding to MCS indexes 6, 7, 8, and 9, may be a combination formed by entries, in the second MCS table, that are respectively corresponding to the second MCS indexes 3, 6, 7, 8, and 9, or the like.

Specifically, there may exist three types of first MCS tables:

a first type of first MCS table: merely includes an entry in which a modulation scheme is QPSK and an entry in which a modulation scheme is higher than 64QAM;

a second type of first MCS table: merely includes an entry in which a modulation scheme is 16QAM and an entry in which a modulation scheme is higher than 64QAM; and a third type of first MCS table: merely includes an entry in which a modulation scheme is QPSK, an entry in which a modulation scheme is 16QAM, and an entry in which a modulation scheme is higher than 64QAM.

There may be various types of first MCS tables in the present invention, the foregoing three types of first MCS tables are only examples for ease of understanding the present invention, and are not meant to limit the present invention.

Specifically, the first MCS index is determined according to the received first CQI index, the first CQI table, the first MCS table, or the determining the first MCS index according to the acquired first CQI table, the acquired first MCS table, and the received first CQI index includes:

determining a first TBS index and the first MCS index according to the first CQI table, the first MCS table, and the received first CQI index, which specifically includes: determining the first TBS index and the first MCS index according to a first PRB quantity, the first CQI table, and the first MCS table that are acquired, and the received first CQI index; and further includes: determining the first TBS index and the first MCS index according to the first PRB quantity, the first CQI table, the first MCS table, and a first TBS table that are acquired, and the received first CQI index.

The first PRB quantity is a PRB quantity allocated to the terminal device by the base station; or the first PRB quantity is a greatest integer less than or equal to a product of the PRB quantity allocated to the terminal device and a specific coefficient, where the specific coefficient is a prestored numerical value or a numerical value notified by the base station to the terminal device.

Specifically, if a first modulation scheme is 256QAM and the PRB quantity allocated to the terminal device is less than or equal to a specific threshold Q, the first PRB quantity is a greatest integer not greater than a product of the PRB quantity allocated to the terminal device and a specific coefficient P, where a product of P and Q is not greater than a maximum PRB quantity, and in an LTE system, a maximum PRB quantity is 110. Preferably, when Q=82, P=1.33, where P*Q=109.06<110, if the PRB quantity allocated to the terminal device by the base station is 50, the first PRB quantity is a greatest integer less than or equal to 50*1.33=66.5, that is to say, the first PRB quantity is 66.

The first TBS table includes at least one PRB quantity corresponding to each TBS index and a transmission block size corresponding to each PRB quantity; and the first TBS table is a TBS table corresponding to the first MCS table.

Further optionally, a value range of a TBS index in the first TBS table is 0-A, where A is a positive integer less than or equal to 26.

Or optionally, a value range of a TBS index in the first TBS table is 0-B, where B is a positive integer greater than or equal to 26, and transmission block sizes corresponding to TBS indexes 0-26 in the first TBS table are the same as transmission block sizes corresponding to TBS indexes 0-26 in a second TBS table; a value range of a TBS index in the second TBS table is 0-26, and the second TBS table includes at least one PRB quantity corresponding to each TBS index and a transmission block size corresponding to each PRB quantity.

Or optionally, a value range of a TBS index in the first TBS table is 0-B, where B is a positive integer greater than or equal to 26, and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

Further, specifically, the determining the first TBS index according to the first CQI table, the first PRB quantity, the first TBS table, and the received first CQI index includes that:

First, a first modulation scheme and a first spectral efficiency that are corresponding to the received first CQI index are determined according to the received first CQI index and the first CQI table.

Then, a first transmission block size transmitted to the terminal device is learned according to the first PRB quantity and the first spectral efficiency.

After which, the first TBS index that is corresponding to the first transmission block size and the first PRB quantity and in the first TBS table is obtained according to the first TBS table.

It should be pointed out that, the first CQI table, the first MCS table, and the first TBS table may be prestored by the base station.

For ease of understanding, the following presents a TBS table (namely, a second TBS table) in an existing protocol:

TABLE 7

| Second TBS index | PRB quantity | | | | | | | | |
|---|---|---|---|---|---|---|---|---|---|
| | 1 | 2 | 3 | 4 | ... | 106 | 107 | 108 | 109 | 110 |
| 0 | 16 | 32 | 56 | 88 | ... | 2984 | 2984 | 2984 | 2984 | 3112 |
| 1 | 24 | 56 | 88 | 144 | ... | 3880 | 3880 | 4008 | 4008 | 4008 |
| 2 | 32 | 72 | 144 | 176 | ... | 4776 | 4776 | 4776 | 4968 | 4968 |
| 3 | 40 | 104 | 176 | 208 | ... | 6200 | 6200 | 6200 | 6456 | 6456 |
| 4 | 56 | 120 | 208 | 256 | ... | 7480 | 7736 | 7736 | 7736 | 7992 |
| 5 | 72 | 144 | 224 | 328 | ... | 9528 | 9528 | 9528 | 9528 | 9528 |
| 6 | 328 | 176 | 256 | 392 | ... | 11064 | 11064 | 11448 | 11448 | 11448 |
| 7 | 104 | 224 | 328 | 472 | ... | 12960 | 12960 | 12960 | 13536 | 13536 |
| 8 | 120 | 256 | 392 | 536 | ... | 14688 | 15264 | 15264 | 15264 | 15264 |
| 9 | 136 | 296 | 456 | 616 | ... | 16992 | 16992 | 16992 | 16992 | 17568 |
| 10 | 144 | 328 | 504 | 680 | ... | 18336 | 19080 | 19080 | 19080 | 19080 |
| 11 | 176 | 376 | 584 | 776 | ... | 21384 | 21384 | 22152 | 22152 | 22152 |
| 12 | 208 | 440 | 680 | 904 | ... | 24496 | 24496 | 24496 | 24496 | 25456 |
| 13 | 224 | 488 | 744 | 1000 | ... | 27376 | 27376 | 27376 | 28336 | 28336 |
| 14 | 256 | 552 | 840 | 1128 | ... | 30576 | 30576 | 30576 | 31704 | 31704 |
| 15 | 280 | 600 | 904 | 1224 | ... | 32856 | 32856 | 32856 | 34008 | 34008 |
| 16 | 328 | 632 | 968 | 1288 | ... | 34008 | 35160 | 35160 | 35160 | 35160 |
| 17 | 336 | 696 | 1064 | 1416 | ... | 37888 | 39232 | 39232 | 39232 | 39232 |
| 18 | 376 | 776 | 1160 | 1544 | ... | 42368 | 42368 | 42368 | 43816 | 43816 |
| 19 | 408 | 840 | 1288 | 1736 | ... | 45352 | 46888 | 46888 | 46888 | 46888 |
| 20 | 440 | 904 | 1384 | 1864 | ... | 48936 | 48936 | 51024 | 51024 | 51024 |
| 21 | 488 | 1000 | 1480 | 1992 | ... | 52752 | 52752 | 55056 | 55056 | 55056 |
| 22 | 520 | 1064 | 1608 | 2152 | ... | 57336 | 57336 | 59256 | 59256 | 59256 |
| 23 | 552 | 1128 | 1736 | 2280 | ... | 61664 | 61664 | 61664 | 61664 | 63776 |
| 24 | 584 | 1192 | 1800 | 2408 | ... | 63776 | 66592 | 66592 | 66592 | 66592 |
| 25 | 616 | 1256 | 1864 | 2536 | ... | 66592 | 68808 | 68808 | 68808 | 71112 |
| 26 | 712 | 1480 | 2216 | 2984 | ... | 75376 | 75376 | 75376 | 75376 | 75376 |

Exemplarily, when B=32, in the first TBS table, a value range of the first TBS index is 0-32 (as shown in Table 8). xxx shown in the table represents a transmission block size, and a specific value may be set according to a simulation result.

TABLE 8

| First TBS index | PRB quantity | | | | | | | | | |
|---|---|---|---|---|---|---|---|---|---|---|
| | 1 | 2 | 3 | 4 | ... | 106 | 107 | 108 | 109 | 110 |
| 0 | 16 | 32 | 56 | 88 | ... | 2984 | 2984 | 2984 | 2984 | 3112 |
| 1 | 24 | 56 | 88 | 144 | ... | 3880 | 3880 | 4008 | 4008 | 4008 |
| 2 | 32 | 72 | 144 | 176 | ... | 4776 | 4776 | 4776 | 4968 | 4968 |
| 3 | 40 | 104 | 176 | 208 | ... | 6200 | 6200 | 6200 | 6456 | 6456 |
| 4 | 56 | 120 | 208 | 256 | ... | 7480 | 7736 | 7736 | 7736 | 7992 |
| 5 | 72 | 144 | 224 | 328 | ... | 9528 | 9528 | 9528 | 9528 | 9528 |
| 6 | 328 | 176 | 256 | 392 | ... | 11064 | 11064 | 11448 | 11448 | 11448 |
| 7 | 104 | 224 | 328 | 472 | ... | 12960 | 12960 | 12960 | 13536 | 13536 |
| 8 | 120 | 256 | 392 | 536 | ... | 14688 | 15264 | 15264 | 15264 | 15264 |
| 9 | 136 | 296 | 456 | 616 | ... | 16992 | 16992 | 16992 | 16992 | 17568 |
| 10 | 144 | 328 | 504 | 680 | ... | 18336 | 19080 | 19080 | 19080 | 19080 |
| 11 | 176 | 376 | 584 | 776 | ... | 21384 | 21384 | 22152 | 22152 | 22152 |
| 12 | 208 | 440 | 680 | 904 | ... | 24496 | 24496 | 24496 | 24496 | 25456 |
| 13 | 224 | 488 | 744 | 1000 | ... | 27376 | 27376 | 27376 | 28336 | 28336 |
| 14 | 256 | 552 | 840 | 1128 | ... | 30576 | 30576 | 30576 | 31704 | 31704 |
| 15 | 280 | 600 | 904 | 1224 | ... | 32856 | 32856 | 32856 | 34008 | 34008 |
| 16 | 328 | 632 | 968 | 1288 | ... | 34008 | 35160 | 35160 | 35160 | 35160 |
| 17 | 336 | 696 | 1064 | 1416 | ... | 37888 | 39232 | 39232 | 39232 | 39232 |
| 18 | 376 | 776 | 1160 | 1544 | ... | 42368 | 42368 | 42368 | 43816 | 43816 |
| 19 | 408 | 840 | 1288 | 1736 | ... | 45352 | 46888 | 46888 | 46888 | 46888 |
| 20 | 440 | 904 | 1384 | 1864 | ... | 48936 | 48936 | 51024 | 51024 | 51024 |
| 21 | 488 | 1000 | 1480 | 1992 | ... | 52752 | 52752 | 55056 | 55056 | 55056 |
| 22 | 520 | 1064 | 1608 | 2152 | ... | 57336 | 57336 | 59256 | 59256 | 59256 |
| 23 | 552 | 1128 | 1736 | 2280 | ... | 61664 | 61664 | 61664 | 61664 | 63776 |
| 24 | 584 | 1192 | 1800 | 2408 | ... | 63776 | 66592 | 66592 | 66592 | 66592 |
| 25 | 616 | 1256 | 1864 | 2536 | ... | 66592 | 68808 | 68808 | 68808 | 71112 |
| 26 | 712 | 1480 | 2216 | 2984 | ... | 75376 | 75376 | 75376 | 75376 | 75376 |
| 27 | xxx | xxx | xxx | xxx | xxx | xxx | xxx | xxx | xxx | xxx |
| 28 | xxx | xxx | xxx | xxx | xxx | xxx | xxx | xxx | xxx | xxx |
| 29 | xxx | xxx | xxx | xxx | xxx | xxx | xxx | xxx | xxx | xxx |
| 30 | xxx | xxx | xxx | xxx | xxx | xxx | xxx | xxx | xxx | xxx |
| 31 | xxx | xxx | xxx | xxx | xxx | xxx | xxx | xxx | xxx | xxx |
| 32 | xxx | xxx | xxx | xxx | xxx | xxx | xxx | xxx | xxx | xxx |

The following further describes the first TBS table.

Optionally, the first TBS table includes a TBS index Y1, where for each PRB quantity, a transmission block size corresponding to the TBS index Y1 is greater than a transmission block size corresponding to a TBS index 25 in the second TBS table and smaller than a transmission block size corresponding to a TBS index 26 in the second TBS table; a value range of a TBS index in the second TBS table is 0-26, and the second TBS table includes at least one PRB quantity corresponding to each TBS index and one transmission block size corresponding to each PRB quantity.

The TBS index Y1 may be greater than 26. For example, Y1 may be 27 or 28.

For example, for each PRB quantity, a transmission block size corresponding to a TBS index 27 in the first TBS table is greater than a transmission block size corresponding to a TBS index 25 in the second TBS table and smaller than a transmission block size corresponding to a TBS index 26 in the second TBS table. More specifically, if a PRB quantity is 1, a transmission block size corresponding to the TBS index 27 in the first TBS table is greater than 616 and less than 712. For another example, if a PRB quantity is 2, a transmission block size corresponding to the TBS index 27 in the first TBS table is greater than 1256 and less than 1480.

Optionally, the first TBS table includes a TBS index Y2 and at least one entry corresponding to the TBS index Y2 in the following Table A, where any one entry includes one PRB quantity and one transmission block size corresponding to the PRB quantity:

the TBS index Y2 in the first TBS table may be greater than 26, for example, Y2=27.

TABLE A

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y2 | 648 | 1320 | 1992 | 2664 | 3368 | 4008 | 4584 | 5352 | 5992 | 6712 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y2 | 7224 | 7992 | 8504 | 9144 | 9912 | 10680 | 11448 | 11832 | 12576 | 12960 |

TABLE A-continued

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y2 | 14112 | 14688 | 15264 | 15840 | 16416 | 16992 | 17568 | 18336 | 19080 | 19848 |
| TBS index | 31 | 32 | 33 | 34 | 35 | 36 | 37 | 38 | 39 | 40 |
| Y2 | 20616 | 21384 | 22152 | 22920 | 22920 | 23688 | 24496 | 25456 | 25456 | 26416 |
| TBS index | 41 | 42 | 43 | 44 | 45 | 46 | 47 | 48 | 49 | 50 |
| Y2 | 27376 | 27376 | 28336 | 29296 | 29296 | 30576 | 31704 | 31704 | 32856 | 32856 |
| TBS index | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| TBS index | 61 | 62 | 63 | 64 | 65 | 66 | 67 | 68 | 69 | 70 |
| Y2 | 40576 | 40576 | 42368 | 42368 | 43816 | 43816 | 43816 | 45352 | 45352 | 46888 |
| TBS index | 71 | 72 | 73 | 74 | 75 | 76 | 77 | 78 | 79 | 80 |
| Y2 | 46888 | 46888 | 48936 | 48936 | 48936 | 51024 | 51024 | 51024 | 52752 | 52752 |
| TBS index | 81 | 82 | 83 | 84 | 85 | 86 | 87 | 88 | 89 | 90 |
| Y2 | 52752 | 55056 | 55056 | 55056 | 57336 | 57336 | 57336 | 59256 | 59256 | 59256 |
| TBS index | 91 | 92 | 93 | 94 | 95 | 96 | 97 | 98 | 99 | 100 |
| Y2 | 59256 | 61664 | 61664 | 61664 | 63776 | 63776 | 63776 | 63776 | 66592 | 66592 |
| TBS index | 101 | 102 | 103 | 104 | 105 | 106 | 107 | 108 | 109 | 110 |
| Y2 | 66592 | 66592 | 68808 | 68808 | 68808 | 71112 | 71112 | 71112 | 71112 | 73712 | and/or, the first TBS table includes a TBS index Y3 and at least one entry corresponding to the TBS index Y3 in the following Table B1, B2, B3, or B4, where any one entry includes one PRB quantity and one transmission block size corresponding to the PRB quantity:

the TBS index Y3 in the first TBS table may be greater than 26, for example, Y3=33.

TABLE B1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 936 | 1928 | 2856 | 3880 | 4776 | 5736 | 6712 | 7736 | 8504 | 9528 |
| TBS index | 11 | 12 | 13 | 14 | 15 | 16 | 17 | 18 | 19 | 20 |
| Y3 | 10680 | 11448 | 12576 | 13536 | 14112 | 15264 | 16416 | 16992 | 18336 | 19080 |

TABLE B1-continued

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y3 | 19848 | 21384 | 22152 | 22920 | 23688 | 24496 | 25456 | 26416 | 27376 | 28336 |
| TBS index | PRB quantity | | | | | | | | | |
| | 31 | 32 | 33 | 34 | 35 | 36 | 37 | 38 | 39 | 40 |
| Y3 | 29296 | 30576 | 31704 | 32856 | 34008 | 34008 | 35160 | 36696 | 37888 | 37888 |
| TBS index | PRB quantity | | | | | | | | | |
| | 41 | 42 | 43 | 44 | 45 | 46 | 47 | 48 | 49 | 50 |
| Y3 | 39232 | 40576 | 40576 | 42368 | 43816 | 43816 | 45352 | 45352 | 46888 | 46888 |
| TBS index | PRB quantity | | | | | | | | | |
| | 51 | 52 | 53 | 54 | 55 | 56 | 57 | 58 | 59 | 60 |
| Y3 | 48936 | 48936 | 51024 | 51024 | 52752 | 52752 | 55056 | 55056 | 57336 | 57336 |
| TBS index | PRB quantity | | | | | | | | | |
| | 61 | 62 | 63 | 64 | 65 | 66 | 67 | 68 | 69 | 70 |
| Y3 | 59256 | 59256 | 59256 | 61664 | 61664 | 63776 | 63776 | 63776 | 66592 | 66592 |
| TBS index | PRB quantity | | | | | | | | | |
| | 71 | 72 | 73 | 74 | 75 | 76 | 77 | 78 | 79 | 80 |
| Y3 | 68808 | 68808 | 71112 | 71112 | 71112 | 73712 | 73712 | 75376 | 76208 | 76208 |
| TBS index | PRB quantity | | | | | | | | | |
| | 81 | 82 | 83 | 84 | 85 | 86 | 87 | 88 | 89 | 90 |
| Y3 | 78704 | 78704 | 78704 | 81176 | 81176 | 81176 | 84760 | 84760 | 84760 | 84760 |
| TBS index | PRB quantity | | | | | | | | | |
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 101840 |
| TBS index | PRB quantity | | | | | | | | | |
| | 101 | 102 | 103 | 104 | 105 | 106 | 107 | 108 | 109 | 110 |
| Y3 | 101840 | 101840 | 101840 | 101840 | 101840 | 101840 | 101840 | 101840 | 101840 | 101840 |

TABLE B2

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y3 | 87936 | 87936 | 90816 | 90816 | 90816 | 90816 | 93800 | 93800 | 93800 | 93800 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 101840 | 101840 | 101840 | 101840 | 105528 | 105528 |

TABLE B3

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y3 | 968 | 1992 | 2984 | 4008 | 4968 | 5992 | 6968 | 7992 | 8760 | 9912 |
| TBS index | PRB quantity | | | | | | | | | |
| | 11 | 12 | 13 | 14 | 15 | 16 | 17 | 18 | 19 | 20 |
| Y3 | 10680 | 11832 | 12960 | 13536 | 14688 | 15840 | 16992 | 17568 | 19080 | 19848 |
| TBS index | PRB quantity | | | | | | | | | |
| | 21 | 22 | 23 | 24 | 25 | 26 | 27 | 28 | 29 | 30 |
| Y3 | 20616 | 21384 | 22920 | 23688 | 24496 | 25456 | 26416 | 27376 | 28336 | 29296 |
| TBS index | PRB quantity | | | | | | | | | |
| | 31 | 32 | 33 | 34 | 35 | 36 | 37 | 38 | 39 | 40 |
| Y3 | 30576 | 31704 | 32856 | 34008 | 35160 | 35160 | 36696 | 37888 | 37888 | 39232 |
| TBS index | PRB quantity | | | | | | | | | |
| | 41 | 42 | 43 | 44 | 45 | 46 | 47 | 48 | 49 | 50 |
| Y3 | 40576 | 40576 | 42368 | 43816 | 43816 | 45352 | 46888 | 46888 | 48936 | 48936 |
| TBS index | PRB quantity | | | | | | | | | |
| | 51 | 52 | 53 | 54 | 55 | 56 | 57 | 58 | 59 | 60 |
| Y3 | 51024 | 51024 | 52752 | 52752 | 55056 | 55056 | 55056 | 57336 | 57336 | 59256 |
| TBS index | PRB quantity | | | | | | | | | |
| | 61 | 62 | 63 | 64 | 65 | 66 | 67 | 68 | 69 | 70 |
| Y3 | 59256 | 61664 | 61664 | 63776 | 63776 | 63776 | 66592 | 66592 | 68808 | 68808 |
| TBS index | PRB quantity | | | | | | | | | |
| | 71 | 72 | 73 | 74 | 75 | 76 | 77 | 78 | 79 | 80 |
| Y3 | 71112 | 71112 | 71112 | 73712 | 75376 | 76208 | 76208 | 76208 | 78704 | 78704 |
| TBS index | PRB quantity | | | | | | | | | |
| | 81 | 82 | 83 | 84 | 85 | 86 | 87 | 88 | 89 | 90 |
| Y3 | 81176 | 81176 | 81176 | 81176 | 84760 | 84760 | 84760 | 87936 | 87936 | 87936 |
| TBS index | PRB quantity | | | | | | | | | |
| | 91 | 92 | 93 | 94 | 95 | 96 | 97 | 98 | 99 | 100 |
| Y3 | 90816 | 90816 | 90816 | 93800 | 93800 | 93800 | 93800 | 97896 | 97896 | 97896 |
| TBS index | PRB quantity | | | | | | | | | |
| | 101 | 102 | 103 | 104 | 105 | 106 | 107 | 108 | 109 | 110 |
| Y3 | 97896 | 97896 | 97896 | 97896 | 97896 | 97896 | 97896 | 97896 | 97896 | 97896 |

TABLE B4

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y3 | 97896 | 101840 | 101840 | 101840 | 105528 | 105528 | 105528 | 105528 | 105528 | 110136 | and/or, the first TBS table includes TBS indexes Y4_1 to Y4_5 and at least one entry corresponding to the TBS indexes Y4_1 to Y4_5 in the following Table C1 or C2, where any one entry includes one PRB quantity and five transmission block sizes corresponding to the PRB quantity, where Y4_1 to Y4_5 in the first TBS table may be greater than 26, for example, Y4_1=28, Y4_2=29, Y4_3=30, Y4_4=31, and Y4_5=32.

TABLE C1

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4136 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2280 | 3112 | 3880 | 4584 | 5352 | 6200 | 6968 | 7736 |
| Y4_4 | 776 | 1608 | 2408 | 3240 | 4008 | 4776 | 5736 | 6456 | 7224 | 7992 |
| Y4_5 | 840 | 1672 | 2536 | 3368 | 4264 | 5160 | 5992 | 6712 | 7480 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8248 | 9144 | 9912 | 10296 | 11064 | 11832 | 12576 | 13536 | 14112 |
| Y4_2 | 7992 | 8760 | 9528 | 10296 | 11064 | 11832 | 12576 | 12960 | 14112 | 14688 |
| Y4_3 | 8504 | 9144 | 9912 | 10680 | 11448 | 12216 | 12960 | 14112 | 14688 | 15264 |
| Y4_4 | 8760 | 9528 | 10680 | 11448 | 12216 | 12960 | 13536 | 14688 | 15264 | 16416 |
| Y4_5 | 9144 | 10296 | 11064 | 11832 | 12576 | 13536 | 14112 | 15264 | 15840 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 20616 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19080 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 27376 | 28336 | 29296 | 30576 | 30576 |
| Y4_4 | 25456 | 25456 | 26416 | 27376 | 28336 | 29296 | 30576 | 30576 | 31704 | 32856 |
| Y4_5 | 26416 | 27376 | 28336 | 28336 | 29296 | 30576 | 31704 | 31704 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 39232 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 46888 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 51024 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

TABLE C1-continued

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 57336 | 59256 |
| Y4_3 | 55056 | 55056 | 57336 | 57336 | 57336 | 59256 | 59256 | 59256 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 59256 | 61664 | 61664 | 61664 | 63776 | 63776 | 63776 | 66592 | 66592 |
| Y4_3 | 61664 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 63776 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 76208 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 73712 | 75376 | 76208 | 76208 | 76208 | 78704 | 78704 | 78704 | 81176 | 81176 |
| Y4_3 | 78704 | 78704 | 78704 | 81176 | 81176 | 81176 | 81176 | 84760 | 84760 | 84760 |
| Y4_4 | 81176 | 81176 | 84760 | 84760 | 84760 | 84760 | 87936 | 87936 | 87936 | 87936 |
| Y4_5 | 84760 | 87936 | 87936 | 87936 | 87936 | 90816 | 90816 | 90816 | 93800 | 93800 |

TABLE C2

| TBS index | PRB quantity | | | | | | | | | |
|---|---|---|---|---|---|---|---|---|---|---|
| | 1 | 2 | 3 | 4 | 5 | 6 | 7 | 8 | 9 | 10 |
| Y4_1 | 680 | 1384 | 2088 | 2792 | 3496 | 4264 | 4968 | 5544 | 6200 | 6968 |
| Y4_2 | 712 | 1480 | 2216 | 2984 | 3624 | 4392 | 5160 | 5992 | 6712 | 7224 |
| Y4_3 | 744 | 1544 | 2344 | 3112 | 3880 | 4584 | 5352 | 6200 | 6968 | 7736 |
| Y4_4 | 808 | 1608 | 2408 | 3240 | 4008 | 4968 | 5736 | 6456 | 7224 | 7992 |
| Y4_5 | 840 | 1672 | 2536 | 3368 | 4264 | 5160 | 5992 | 6712 | 7736 | 8504 |

| TBS index | PRB quantity | | | | | | | | | |
|---|---|---|---|---|---|---|---|---|---|---|
| | 11 | 12 | 13 | 14 | 15 | 16 | 17 | 18 | 19 | 20 |
| Y4_1 | 7736 | 8504 | 9144 | 9912 | 10680 | 11064 | 11832 | 12576 | 13536 | 14112 |
| Y4_2 | 7992 | 8760 | 9528 | 10296 | 11064 | 11832 | 12576 | 13536 | 14112 | 14688 |
| Y4_3 | 8504 | 9144 | 9912 | 10680 | 11448 | 12216 | 12960 | 14112 | 14688 | 15264 |
| Y4_4 | 8760 | 9912 | 10680 | 11448 | 12216 | 12960 | 13536 | 14688 | 15264 | 16416 |
| Y4_5 | 9144 | 10296 | 11064 | 11832 | 12576 | 13536 | 14688 | 15264 | 16416 | 16992 |

| TBS index | PRB quantity | | | | | | | | | |
|---|---|---|---|---|---|---|---|---|---|---|
| | 21 | 22 | 23 | 24 | 25 | 26 | 27 | 28 | 29 | 30 |
| Y4_1 | 14688 | 15264 | 15840 | 16992 | 17568 | 18336 | 19080 | 19848 | 20616 | 21384 |
| Y4_2 | 15264 | 16416 | 16992 | 17568 | 18336 | 19080 | 19848 | 20616 | 21384 | 22152 |
| Y4_3 | 16416 | 16992 | 17568 | 18336 | 19080 | 19848 | 20616 | 21384 | 22152 | 22920 |
| Y4_4 | 16992 | 17568 | 18336 | 19848 | 20616 | 21384 | 22152 | 22920 | 23688 | 24496 |
| Y4_5 | 17568 | 18336 | 19848 | 20616 | 21384 | 22152 | 22920 | 23688 | 24496 | 25456 |

TABLE C2-continued

| TBS index | PRB quantity | | | | | | | | | |
|---|---|---|---|---|---|---|---|---|---|---|
| | 31 | 32 | 33 | 34 | 35 | 36 | 37 | 38 | 39 | 40 |
| Y4_1 | 21384 | 22152 | 22920 | 23688 | 24496 | 25456 | 25456 | 26416 | 27376 | 28336 |
| Y4_2 | 22920 | 23688 | 24496 | 25456 | 25456 | 26416 | 27376 | 28336 | 28336 | 29296 |
| Y4_3 | 23688 | 24496 | 25456 | 26416 | 27376 | 28336 | 28336 | 29296 | 30576 | 30576 |
| Y4_4 | 25456 | 26416 | 26416 | 27376 | 28336 | 29296 | 30576 | 30576 | 31704 | 32856 |
| Y4_5 | 26416 | 27376 | 28336 | 29296 | 29296 | 30576 | 31704 | 32856 | 32856 | 34008 |

| TBS index | PRB quantity | | | | | | | | | |
|---|---|---|---|---|---|---|---|---|---|---|
| | 41 | 42 | 43 | 44 | 45 | 46 | 47 | 48 | 49 | 50 |
| Y4_1 | 28336 | 29296 | 30576 | 30576 | 31704 | 31704 | 32856 | 34008 | 34008 | 35160 |
| Y4_2 | 30576 | 30576 | 31704 | 32856 | 32856 | 34008 | 35160 | 35160 | 36696 | 36696 |
| Y4_3 | 31704 | 32856 | 32856 | 34008 | 35160 | 35160 | 36696 | 36696 | 37888 | 39232 |
| Y4_4 | 32856 | 34008 | 35160 | 35160 | 36696 | 37888 | 37888 | 39232 | 39232 | 40576 |
| Y4_5 | 35160 | 35160 | 36696 | 37888 | 37888 | 39232 | 40576 | 40576 | 42368 | 42368 |

| TBS index | PRB quantity | | | | | | | | | |
|---|---|---|---|---|---|---|---|---|---|---|
| | 51 | 52 | 53 | 54 | 55 | 56 | 57 | 58 | 59 | 60 |
| Y4_1 | 35160 | 36696 | 36696 | 37888 | 37888 | 39232 | 40576 | 40576 | 40576 | 42368 |
| Y4_2 | 37888 | 37888 | 39232 | 39232 | 40576 | 40576 | 42368 | 42368 | 43816 | 43816 |
| Y4_3 | 39232 | 40576 | 40576 | 42368 | 42368 | 43816 | 43816 | 45352 | 45352 | 46888 |
| Y4_4 | 40576 | 42368 | 42368 | 43816 | 45352 | 45352 | 46888 | 46888 | 48936 | 48936 |
| Y4_5 | 43816 | 43816 | 45352 | 45352 | 46888 | 46888 | 48936 | 48936 | 51024 | 51024 |

| TBS index | PRB quantity | | | | | | | | | |
|---|---|---|---|---|---|---|---|---|---|---|
| | 61 | 62 | 63 | 64 | 65 | 66 | 67 | 68 | 69 | 70 |
| Y4_1 | 42368 | 43816 | 43816 | 45352 | 45352 | 46888 | 46888 | 46888 | 48936 | 48936 |
| Y4_2 | 45352 | 45352 | 46888 | 46888 | 48936 | 48936 | 48936 | 51024 | 51024 | 51024 |
| Y4_3 | 46888 | 48936 | 48936 | 48936 | 51024 | 51024 | 52752 | 52752 | 52752 | 55056 |
| Y4_4 | 48936 | 51024 | 51024 | 52752 | 52752 | 52752 | 55056 | 55056 | 55056 | 57336 |
| Y4_5 | 51024 | 52752 | 52752 | 55056 | 55056 | 55056 | 57336 | 57336 | 59256 | 59256 |

| TBS index | PRB quantity | | | | | | | | | |
|---|---|---|---|---|---|---|---|---|---|---|
| | 71 | 72 | 73 | 74 | 75 | 76 | 77 | 78 | 79 | 80 |
| Y4_1 | 48936 | 51024 | 51024 | 51024 | 52752 | 52752 | 55056 | 55056 | 55056 | 55056 |
| Y4_2 | 52752 | 52752 | 52752 | 55056 | 55056 | 55056 | 57336 | 57336 | 59256 | 59256 |
| Y4_3 | 55056 | 55056 | 57336 | 57336 | 57336 | 59256 | 59256 | 61664 | 61664 | 61664 |
| Y4_4 | 57336 | 59256 | 59256 | 59256 | 61664 | 61664 | 61664 | 63776 | 63776 | 63776 |
| Y4_5 | 59256 | 61664 | 61664 | 63776 | 63776 | 63776 | 66592 | 66592 | 66592 | 68808 |

| TBS index | PRB quantity | | | | | | | | | |
|---|---|---|---|---|---|---|---|---|---|---|
| | 81 | 82 | 83 | 84 | 85 | 86 | 87 | 88 | 89 | 90 |
| Y4_1 | 57336 | 57336 | 57336 | 59256 | 59256 | 59256 | 61664 | 61664 | 61664 | 63776 |
| Y4_2 | 59256 | 61664 | 61664 | 61664 | 63776 | 63776 | 63776 | 63776 | 66592 | 66592 |
| Y4_3 | 63776 | 63776 | 63776 | 63776 | 66592 | 66592 | 66592 | 68808 | 68808 | 68808 |
| Y4_4 | 66592 | 66592 | 66592 | 68808 | 68808 | 68808 | 71112 | 71112 | 71112 | 73712 |
| Y4_5 | 68808 | 68808 | 71112 | 71112 | 71112 | 73712 | 73712 | 75376 | 75376 | 76208 |

| TBS index | PRB quantity | | | | | | | | | |
|---|---|---|---|---|---|---|---|---|---|---|
| | 91 | 92 | 93 | 94 | 95 | 96 | 97 | 98 | 99 | 100 |
| Y4_1 | 63776 | 63776 | 66592 | 66592 | 66592 | 66592 | 68808 | 68808 | 68808 | 71112 |
| Y4_2 | 66592 | 68808 | 68808 | 68808 | 71112 | 71112 | 71112 | 71112 | 73712 | 73712 |
| Y4_3 | 71112 | 71112 | 71112 | 73712 | 73712 | 73712 | 75376 | 76208 | 76208 | 78704 |
| Y4_4 | 73712 | 75376 | 75376 | 76208 | 76208 | 78704 | 78704 | 78704 | 81176 | 81176 |
| Y4_5 | 76208 | 78704 | 78704 | 78704 | 81176 | 81176 | 81176 | 84760 | 84760 | 84760 |

| TBS index | PRB quantity | | | | | | | | | |
|---|---|---|---|---|---|---|---|---|---|---|
| | 101 | 102 | 103 | 104 | 105 | 106 | 107 | 108 | 109 | 110 |
| Y4_1 | 71112 | 71112 | 71112 | 73712 | 73712 | 73712 | 75376 | 75376 | 76208 | 76208 |
| Y4_2 | 75376 | 75376 | 76208 | 76208 | 78704 | 78704 | 78704 | 78704 | 81176 | 81176 |
| Y4_3 | 78704 | 78704 | 78704 | 81176 | 81176 | 81176 | 84760 | 84760 | 84760 | 84760 |
| Y4_4 | 81176 | 81176 | 84760 | 84760 | 84760 | 84760 | 87936 | 87936 | 87936 | 90816 |
| Y4_5 | 84760 | 87936 | 87936 | 87936 | 87936 | 90816 | 90816 | 90816 | 93800 | 93800 |

Finally, the first MCS index corresponding to the first TBS index is learned according to the first MCS table, the first modulation scheme, and the first TBS index.

The first CQI table in this embodiment is the same as the first CQI table in the foregoing embodiment, and details are not described herein again. The following describes in detail the first MCS table in this embodiment.

For ease of understanding, the following MCS table (namely, the second MCS table) is used as an example for description:

TABLE 9

| MCS index in the second MCS table | Modulation order | TBS index in the second MCS table |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

In Table 9, a modulation order is corresponding to a modulation scheme. For example, if a modulation scheme is QPSK, a modulation order is 2; if a modulation scheme is 16QAM, a modulation order is 4; if a modulation scheme is 64QAM, a modulation order is 6; and if a modulation scheme is 256QAM, a modulation order is 8.

In Table 9, entries in which MCS indexes are 29, 30, and 31 are reserved entries.

It should be noted that, to minimize, changes to the prior art during a specific implementation process, preferably, a value range of an MCS index in the first MCS table and a value range of an MCS index in the second MCS table may be the same, for example, 0 to 31. Apparently, a value range of an MCS index in the first MCS table may also be greater than a value range of an MCS index in the second MCS table, for example, a value range of an MCS index in the first MCS table is 0 to 40.

First type of first MCS table: the first type of first MCS table merely includes an entry in which a modulation scheme is QPSK and an entry in which a modulation scheme is higher than 64QAM.

The first MCS table may include one entry or a plurality of entries in which a modulation scheme is higher than 64QAM, where each entry in which a modulation scheme is higher than 64QAM includes a modulation order and a first TBS index, and has a corresponding MCS index.

TABLE 10

| MCS index in the second MCS table | Modulation order | TBS index in the second MCS table |
|---|---|---|
| 21 | 8 | 26 |
| 22 | 8 | 27 |
| 23 | 8 | 28 |

The first MCS table further includes at least one entry that is in the second MCS table and in which a modulation scheme is QPSK, where the at least one entry in which a modulation scheme is QPSK includes a combination, other than a second combination, formed by the at least one entry that is in the second MCS table and in which a modulation scheme is QPSK. That is to say, the first MCS table further includes at least one entry that is in the second MCS table and in which a modulation scheme is QPSK, and the entries in which a modulation scheme is QPSK are not K entries that are in the second MCS table and in which corresponding MCS indexes are continuous and greatest ones, where K is 6. Specifically, part of nine entries, in the second MCS table (namely, Table 9), that are corresponding to indexes 0-9 and in which a modulation scheme is QPSK are included in the first MCS table, where entries that are in the first MCS table and in which a modulation scheme is QPSK are not the six entries that are in the second MCS table and in which a modulation scheme is QPSK and MCS indexes are continuous and greatest ones.

That is to say, entries that are in the first MCS table and in which a modulation scheme is QPSK cannot merely be entries, in the second MCS table, that are respectively corresponding to MCS indexes 4, 5, 6, 7, 8, and 9.

Alternatively, the first MCS table further includes at least one entry that is in the second MCS table and in which a modulation scheme is QPSK, and the entries in which a modulation scheme is QPSK are not K entries that are in the second MCS table and in which corresponding MCS indexes are continuous and greatest ones, where K is a positive integer. Specifically, part of nine entries, in the second MCS table, that are respectively corresponding to indexes 0-9 and in which a modulation scheme is QPSK are included in the first MCS table, where entries that are in the first MCS table and in which a modulation scheme is QPSK are not K entries that are in the second MCS table and in which a modulation scheme is QPSK and MCS indexes are continuous and greatest ones, and specifically, a value range of K may be 1 to 8. That is to say:

an entry that is in the first MCS table and in which a modulation scheme is QPSK cannot merely be an entry, in the second MCS table, that is corresponding to MCS index 9; or entries that are in the first MCS table and in which a modulation scheme is QPSK cannot merely be entries, in the second MCS table, that are respectively corresponding to MCS indexes 8 and 9; or entries that are in the first MCS table and in which a modulation scheme is QPSK cannot merely be entries, in the second MCS table, that are respectively corresponding to MCS indexes 7, 8, and 9; or entries that are in the first MCS table and in which a modulation scheme is QPSK cannot merely be entries, in the second MCS table, that are respectively corresponding to MCS indexes 6, 7, 8, and 9; or, entries that are in the first MCS table and in which a modulation scheme is QPSK cannot merely be entries, in the second MCS table, that are respectively corresponding to MCS indexes 5, 6, 7, 8, and 9; or entries that are in the first MCS table and in which a modulation scheme is QPSK cannot merely be entries, in the second MCS table, that are respectively corresponding to MCS indexes 4, 5, 6, 7, 8, and 9; or entries that are in the first MCS table and in which a modulation scheme is QPSK cannot merely be entries, in the second MCS table, that are respectively corresponding to MCS indexes 3, 4, 5, 6, 7, 8, and 9; or, entries that are in the first MCS table and in which a modulation scheme is QPSK cannot merely be entries, in the second MCS table, that are respectively corresponding to MCS indexes 2, 3, 4, 5, 6, 7, 8, and 9.

Alternatively, the first MCS table includes part of entries that are in the second MCS table and in which a modulation scheme is QPSK, where a difference between successive MCS indexes corresponding to the part of entries are the same.

Exemplarily, if entries that are in the first MCS table and in which a modulation scheme is QPSK include three of entries that are in the second MCS table and in which a modulation scheme is QPSK, the entries that are in the first MCS table and in which a modulation scheme is QPSK may include entries, in the second MCS table, that are respectively corresponding to MCS indexes 0, 3, and 6, or the entries that are in the first MCS table and in which a modulation scheme is QPSK may include entries, in the second MCS table, that are respectively corresponding to MCS indexes 2, 5, and 8; or the entries that are in the first MCS table and in which a modulation scheme is QPSK may include entries, in the second MCS table, that are respectively corresponding to MCS indexes 3, 6, and 9; or the entries that are in the first MCS table and in which a modulation scheme is QPSK may include entries, in the second MCS table, that are respectively corresponding to MCS indexes 0, 4, and 8; or the entries that are in the first MCS table and in which a modulation scheme is QPSK may include entries, in the second MCS table, that are respectively corresponding to MCS indexes 1, 5, and 9;

if entries that are in the first MCS table and in which a modulation scheme is QPSK include four of entries that are in the second MCS table and in which a modulation scheme is QPSK, the entries that are in the first MCS table and in which a modulation scheme is QPSK may include entries, in the second MCS table, that are respectively corresponding to MCS indexes 0, 3, 6, and 9;

if entries that are in the first MCS table and in which a modulation scheme is QPSK include five of entries that are in the second MCS table in which a modulation scheme is QPSK, the entries that are in the first MCS table and in which a modulation scheme is QPSK may include entries, in the second MCS table, that are respectively corresponding to MCS indexes 1, 3, 5, 7, and 9; or the entries that are in the first MCS table and in which a modulation scheme is QPSK may include entries, in the second MCS table, that are respectively corresponding to MCS indexes 0, 2, 4, 6, and 8.

Alternatively, the first MCS table includes part of entries that are in the second MCS table and in which a modulation scheme is QPSK, where a difference between successive MCS indexes corresponding to the part of entries are not the same.

Exemplarily, entries that are in the first MCS table and in which a modulation scheme is QPSK include M of entries that are in the second MCS table and in which a modulation scheme is QPSK, where a value of M may be 3, 4, 5, 6, 7, 8, or 9. If M=5, entries that are in the first MCS table and in which a modulation scheme is QPSK include five of entries that are in the second MCS table and in which a modulation scheme is QPSK, and the entries that are in the first MCS table and in which a modulation scheme is QPSK may include entries, in the second MCS table, that are respectively corresponding to MCS indexes 1, 4, 7, 8, and 9.

Alternatively, the first MCS table includes part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK. That is to say, the first MCS table includes part of entries that are in the second MCS table and in which a modulation scheme is QPSK, but does not include an entry in which an MCS index is greatest among all entries that are in the second MCS table and in which a modulation scheme is QPSK.

Exemplarily, entries that are in the first MCS table and in which a modulation scheme is QPSK includes M of entries that are in the second MCS table and in which a modulation scheme is QPSK, where a value of M may be 1, 2, 3, 4, 5, 6, 7, 8, or 9. If M=8, entries that are in the first MCS table and in which a modulation scheme is QPSK include eight of entries that are in the second MCS table and in which a modulation scheme is QPSK, and the entries that are in the first MCS table and in which a modulation scheme is QPSK may include entries, in the second MCS table, that are respectively corresponding to MCS indexes 0, 1, 2, 3, 4, 5, 6, 7, and 8.

Still alternatively, the first MCS table includes part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK. That is to say, the first MCS table includes part of entries that are in the second MCS table and in which a modulation scheme is QPSK, but does not include an entry in which an MCS index is greatest among all entries that are in the second MCS table and in which a modulation scheme is QPSK.

Exemplarily, entries that are in the first MCS table and in which a modulation scheme is QPSK include M of entries that are in the second MCS table and in which a modulation scheme is QPSK, where a value of M may be 1, 2, 3, 4, 5, 6, 7, 8, or 9. If M=8, entries that are in the first MCS table and in which a modulation scheme is QPSK include eight of entries that are in the second MCS table and in which a modulation scheme is QPSK, and the entries that are in the first MCS table and in which a modulation scheme is QPSK may include entries, in the second MCS table, that are respectively corresponding to MCS indexes 0, 1, 2, 3, 4, 5, 6, and 7.

Second type of first MCS table: the second type of first MCS table merely includes an entry in which a modulation scheme is 16QAM and an entry in which a modulation scheme is higher than 64QAM.

The first MCS table may include one entry or a plurality of entries in which a modulation scheme is higher than 64QAM, where each entry in which a modulation scheme is higher than 64QAM includes a modulation order and a first TBS index, and has a corresponding MCS index.

The first MCS table further includes at least one entry that is in the second MCS table and in which a modulation scheme is 16QAM.

Specifically, the first MCS table further includes all entries that are in the second MCS table and in which a modulation scheme is 16QAM.

Exemplarily, the first MCS table further includes six entries that are in the second MCS table and in which a corresponding modulation scheme is 16QAM and corresponding MCS indexes are 10-16.

Alternatively, the first MCS table further includes part of entries that are in the second MCS table and in which a modulation scheme is 16QAM, where a difference between successive MCS indexes corresponding to the part of entries are the same.

Exemplarily, if entries that are in the first MCS table and in which a modulation scheme is 16QAM include three of entries that are in the second MCS table and in which a modulation scheme is 16QAM, the entries that are in the first MCS table and in which a modulation scheme is 16QAM may include entries, in the second MCS table, that are respectively corresponding to MCS indexes 10, 13, and 16; or the entries that are in the first MCS table and in which a modulation scheme is 16QAM may include entries, in the second MCS table, that are respectively corresponding to MCS indexes 10, 12, and 14; or the entries that are in the first MCS table and in which a modulation scheme is 16QAM may include entries, in the second MCS table, that are respectively corresponding to MCS indexes 11, 13, and 15; or the entries that are in the first MCS table and in which a modulation scheme is 16QAM may include entries, in the second MCS table, that are respectively corresponding to MCS indexes 12, 14, and 16;

if entries that are in the first MCS table and in which a modulation scheme is 16QAM include four of entries that are in the second MCS table and in which a modulation scheme is 16QAM, the entries that are in the first MCS table and in which a modulation scheme is 16QAM may include entries, in the second MCS table, that are respectively corresponding to MCS indexes 10, 12, 14, and 16.

Alternatively, the first MCS table further includes entries that are in the second MCS table and in which a modulation scheme is 16QAM, where a difference between successive MCS indexes corresponding to the part of entries are not the same.

Exemplarily, entries that are in the first MCS table and in which a modulation scheme is QPSK include M of entries that are in the second MCS table and in which a modulation scheme is 16QAM, where a value of M may be 3, 4, 5, or 6. If M=5, entries that are in the first MCS table and in which a modulation scheme is 16QAM may include entries, in the second MCS table, that are respectively corresponding to MCS indexes 10, 12, 14, 15, and 16.

Alternatively, the first MCS table further includes part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM. That is to say, the first MCS table further includes part of entries that are in the second MCS table and in which a modulation scheme is 16QAM, where MCS indexes corresponding to the part of entries are discontinuous, and the part of entries do not include an entry in which an MCS index is greatest among all entries that are in the second MCS table and in which a modulation scheme is 16QAM.

Exemplarily, entries that are in the first MCS table and in which a modulation scheme is 16QAM include M of entries in which a modulation scheme is 16QAM, where a value of M may be 1, 2, 3, 4, 5, or 6. If M=5, entries that are in the first MCS table and in which a modulation scheme is 16QAM may include entries, in the second MCS table, that are respectively corresponding to MCS indexes 10, 11, 12, 13, and 15.

Alternatively, the first MCS table further includes part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM. That is to say, the first MCS table further includes part of entries that are in the second MCS table and in which a modulation scheme is 16QAM, and the part of entries do not include an entry in which an MCS index is greatest among all entries that are in the second MCS table and in which a modulation scheme is 16QAM.

Exemplarily, entries that are in the first MCS table and in which a modulation scheme is 16QAM include M of entries that are in the second MCS table and in which a modulation scheme is 16QAM, where a value of M may be 1, 2, 3, 4, 5, or 6. If M=6, entries that are in the first MCS table and in which a modulation scheme is 16QAM may include entries, in the second MCS table, that are respectively corresponding to MCS indexes 10, 11, 12, 13, 14, and 15.

Still alternatively, the first MCS table further includes part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM. That is to say, the first MCS table further includes part of entries that are in the second MCS table and in which a modulation scheme is 16QAM, where the part of entries do not include entries in which a respective MCS index is greatest or smallest among all entries that are in the second MCS table and in which a modulation scheme is 16QAM.

Exemplarily, entries that are in the first MCS table and in which a modulation scheme is 16QAM include M of entries that are in the second MCS table and in which a modulation scheme is 16QAM, where a value of M may be 1, 2, 3, 4, or 5. If M=5, entries that are in the first MCS table and in which a modulation scheme is 16QAM may include entries, in the second MCS table, that are respectively corresponding to MCS indexes 11, 12, 13, 14, and 15;

alternatively, if M=4, entries that are in the first MCS table and in which a modulation scheme is 16QAM may include entries, in the second MCS table, that are respectively corresponding to MCS indexes 11, 12, 13, and 14; or entries that are in the first MCS table and in which a modulation scheme is 16QAM may include entries, in the second MCS table, that are respectively corresponding to MCS indexes 11, 13, 14, and 15.

Third type of first MCS table: an entry in which a modulation scheme is 16QAM is added to the first type of first MCS table to obtain the third type of first CQI table. The third type of first MCS table merely includes an entry in which a modulation scheme QPSK, an entry in which a modulation scheme is 16QAM, and an entry in which a modulation scheme is higher than 64QAM. Specifically, an entry that is included in the third type of first MCS table and in which a modulation scheme is 16QAM may be the same as an entry that is included in the second type of first MCS table and in which a modulation scheme is 16QAM. For details, refer to the descriptions about the entry that is in the second type of first MCS table and in which a modulation scheme is 16QAM.

Further, the first MCS table further includes at least one entry that is in the second MCS table and in which a modulation scheme is 64QAM.

That is to say, an entry in which a modulation scheme is 64QAM is added to the first type of first MCS table to obtain a fourth type of first MCS table; in this case, the fourth type of first MCS table includes an entry in which a modulation scheme is QPSK, an entry in which a modulation scheme is higher than 64QAM, and an entry in which a modulation scheme is 16QAM;

alternatively, an entry in which a modulation scheme is 64QAM is added to the second type of first MCS table to obtain a fifth type of first MCS table; in this case, the fifth type of first MCS table includes an entry in which a modulation scheme is 16QAM, an entry in which a modulation scheme is higher than 64QAM, and an entry in which a modulation scheme is 64QAM;

still alternatively, an entry in which a modulation scheme is 64QAM is added to the third type of first MCS table to obtain a sixth type of first MCS table; in this case, the sixth type of first MCS table includes an entry in which a modulation scheme is QPSK, an entry in which a modulation scheme is 16QAM, an entry in which a modulation scheme is higher than 64QAM, and an entry in which a modulation scheme is 64QAM.

In the fourth, fifth or sixth type of first MCS table, an entry in which a modulation scheme is 64QAM is as follows:

specifically, the first MCS table further includes all entries that are in the second MCS table and in which a modulation scheme is 64QAM.

Exemplarily, the first MCS table further includes twelve entries that are in the second MCS table and in which a corresponding modulation scheme is 64QAM and corresponding MCS indexes are 17-28.

Alternatively, the first MCS table further includes part of entries that are in the second MCS table and in which a modulation scheme is 64QAM, where the part of entries is at least one entry other than an entry in which an MCS index is smallest among all entries that are in the second MCS table and in which a modulation scheme is 64QAM; that is to say, part of entries that are in the second MCS table and in which a modulation scheme is 64QAM are included in the first MCS table, where the part of entries do not include an entry in which an MCS index is smallest among all entries that are in the second MCS table and in which a modulation scheme is 64QAM.

Alternatively, the first MCS table further includes part of entries that are in the second MCS table and in which a modulation scheme is 64QAM, where the part of entries is at least one entry other than an entry in which an MCS index is greatest among all entries that are in the second MCS table and in which a modulation scheme is 64QAM, that is to say, part of entries that are in the second MCS table and in which a modulation scheme is 64QAM are included in the first MCS table, where the part of entries do not include an entry in which an MCS index is greatest among all entries that are in the second MCS table and in which a modulation scheme is 64QAM.

Exemplarily, the first MCS table further includes M of entries that are in the second MCS table and in which a modulation scheme is 64QAM, where a value range of M is 1-11, and M is an integer. If M=5, entries that are in the first MCS table and in which a modulation scheme is 64QAM may include entries, in the second MCS table, that are respectively corresponding to MCS indexes 18, 19, 20, 21, and 23; or entries that are in the first MCS table and in which a modulation scheme is 64QAM may include entries, in the second MCS table, that are respectively corresponding to MCS indexes 18, 20, 21, 24, and 25; or alternatively, if M=7, entries that are in the first MCS table and in which a modulation scheme is 64QAM may include entries, in the second MCS table, that are respectively corresponding to MCS indexes 18, 19, 20, 21, 23, 25, and 26; or entries that are in the first MCS table and in which a modulation scheme is 64QAM may include entries, in the second MCS table, that are respectively corresponding to MCS indexes 19, 20, 21, 24, 25, 27, and 28; or alternatively, if M=11, entries that are in the first MCS table and in which a modulation scheme is 64QAM may include entries, in the second MCS table, that are respectively corresponding to MCS indexes 17, 18, 19, 20, 21, 22, 23, 24, 25, 26, and 27.

Further, in the foregoing six types of first MCS tables, a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM.

Further, in the foregoing six types of first MCS tables, TBS indexes in R entries in which corresponding MCS indexes are smallest ones among entries that are in the first MCS table and in which a modulation scheme is higher than 64QAM may be equal to TBS indexes in R entries in which MCS indexes are greatest ones among all entries that are in the second MCS table and in which a modulation scheme is 64QAM and a respective MCS index is not greater than 27, where R is a natural number.

Exemplarily, TBS indexes in R entries in which corresponding MCS indexes are smallest ones among entries that are in the first MCS table and in which a modulation scheme is higher than 64QAM include any one or more (more than two) of the following numerical values: {15, 16, 17, 18, 19, 20, 21, 22, 23, 24, 25}.

In an example of R=2, R entries in which corresponding MCS indexes are smallest ones among entries that are in the first MCS table and in which a modulation scheme is higher than 64QAM are shown in the following Table 11-1.

TABLE 11-1

| MCS index in a first MCS table | MCS index in a second MCS table | Modulation order | TBS index in a first MCS table |
|---|---|---|---|
| 18 | 26 | 8 | 24 |
| 19 | 27 | 8 | 25 |

Exemplarily, it is assumed that: in the first MCS table, there are five entries in which a modulation scheme is QPSK, and corresponding MCS indexes are 0-4; there are five entries in which a modulation scheme is 16QAM, and corresponding MCS indexes are 5-9; there are eleven entries in which a modulation scheme is 64QAM, and corresponding MCS indexes are 10-20; and a value range of an MCS index in the first MCS table is 0-31, where in the first MCS table, there are seven entries (four reserved entries are included, and MCS indexes corresponding to the reserved entries are 28, 29, 30, and 31 respectively) in which a modulation scheme is higher than 64QAM, corresponding MCS indexes are 21-28, and a smallest index among the entries is 21. Specifically, as shown in the following Table 11-2, a TBS index in the entry that is in the first MCS table and in which an MCS index is 21 is 26, and is equal to a TBS index in the entry that is in the second MCS table and corresponding to the MCS index 28.

TABLE 11-2

| MCS index in the first MCS table | MCS index in the second MCS table | Modulation order | TBS index in the first MCS table |
|---|---|---|---|
| 0 | 0 | 2 | 0 |
| 1 | 2 | 2 | 2 |
| 2 | 4 | 2 | 4 |
| 3 | 6 | 2 | 6 |
| 4 | 8 | 2 | 8 |
| 5 | 10 | 4 | 9 |
| 6 | 12 | 4 | 11 |
| 7 | 14 | 4 | 13 |
| 8 | 15 | 4 | 14 |
| 9 | 16 | 4 | 15 |
| 10 | 18 | 6 | 16 |
| 11 | 19 | 6 | 17 |
| 12 | 20 | 6 | 18 |
| 13 | 21 | 6 | 19 |
| 14 | 22 | 6 | 20 |
| 15 | 23 | 6 | 21 |
| 16 | 24 | 6 | 22 |
| 17 | 25 | 6 | 23 |
| 18 | 26 | 6 | 24 |
| 19 | 27 | 6 | 25 |
| 20 | 28 | 6 | 26 |
| 21 | — | 8 | 26 |
| 22 | — | 8 | 27 |
| 23 | — | 8 | 28 |
| 24 | — | 8 | 29 |
| 25 | — | 8 | 30 |
| 26 | — | 8 | 31 |
| 27 | — | 8 | 32 |
| 28 | 29 | 2 | Reserved |
| 29 | 30 | 4 | (reserved) |
| 30 | 31 | 6 | |
| 31 | | 8 | |

It should be noted that the first MCS table may actually not include the column "MCS index in the second MCS table", and this column is shown in Table 11_1 or Table 11_2, merely for clearly describing a relationship between the first MCS table and the second MCS table.

Alternatively, the first MCS table further includes at least one entry in the following Table D1, D2, D3, D4, or D5, and any one entry includes an MCS index, and a modulation order and a TBS index that are corresponding to the MCS index:

TABLE D1

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |

TABLE D1-continued

| MCS index $I_{MCS}$ | Modulation order $Q_m$ | TBS index $I_{TBS}$ |
|---|---|---|
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D2

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 6 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D3

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |

TABLE D3-continued

| MCS index $I_{MCS}$ | Modulation order $Q_m$ | TBS index $I_{TBS}$ |
|---|---|---|
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D4

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 13 |
| 8 | 4 | 14 |
| 9 | 4 | 15 |
| 10 | 6 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

TABLE D5

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 12 |
| 7 | 4 | 14 |
| 8 | 4 | 15 |
| 9 | 6 | 15 |
| 10 | 6 | 16 |
| 11 | 6 | 17 |
| 12 | 6 | 18 |
| 13 | 6 | 19 |

TABLE D5-continued

| MCS index $I_{MCS}$ | Modulation order $Q_m$ | TBS index $I_{TBS}$ |
|---|---|---|
| 14 | 6 | 20 |
| 15 | 6 | 21 |
| 16 | 6 | 22 |
| 17 | 6 | 23 |
| 18 | 6 | 24 |
| 19 | 6 | 25 |
| 20 | 8 | 25 |
| 21 | 8 | Y2 |
| 22 | 8 | Y4_1 |
| 23 | 8 | Y4_2 |
| 24 | 8 | Y4_3 |
| 25 | 8 | Y4_4 |
| 26 | 8 | Y4_5 |
| 27 | 8 | Y3 |
| 28 | 2 | Reserved |
| 29 | 4 | |
| 30 | 6 | |
| 31 | 8 | |

Specifically, in this embodiment, for example, Y2=27, Y3=33, Y4_1=28, Y4_2=29, Y4_3=30, Y4_4=31, and Y4_5=32.

It may be seen that, each of the foregoing six types of first MCS tables includes an entry in which a modulation scheme is higher than 64QAM, so that a base station is able to select a modulation scheme higher than 64QAM, and to notify a terminal device by using a method for sending an MCS index, thereby improving system performance. In addition, the sixth type of first MCS table is a preferable first MCS table, and includes an entry in which a modulation scheme is QPSK, an entry in which a modulation scheme is 16QAM, an entry in which a modulation scheme is 64QAM, and an entry in which a modulation scheme is higher than 64QAM.

S203: The base station sends the determined first MCS index to the terminal device.

Figure 3:
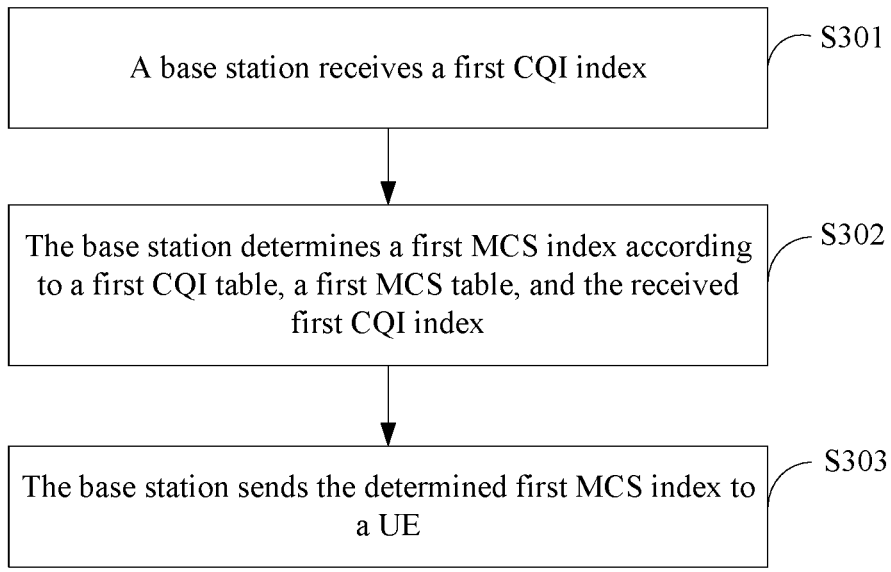
FIG. 3 is a schematic diagram of another MCS notifying method according to an embodiment of the present invention.

As shown in FIG. 3, the present invention further provides another MCS notifying method.

A first CQI table in this embodiment may be the same as any type of first CQI table in the foregoing embodiments; or may be different from any type of first CQI table in the foregoing embodiments, but the two CQI tables have one thing in common: both includes an entry in which a modulation scheme is higher than 64QAM. A first MCS table in this embodiment may be any type of MCS table in the foregoing embodiments.

The first CQI table may be predefined in a protocol, preset by a terminal device in compliance with a protocol, or prestored by a terminal device; or is selected by a terminal device from at least two predefined tables according to a downlink channel state; or may be notified by a base station to a terminal device. Specifically, a method for notifying the terminal device by the base station may be: selecting, by the base station, one table from at least two predefined tables according to an uplink channel state or a downlink channel state, and notifying the terminal device of the selected table. A CQI table is used for describing a mapping relationship between CQI indexes and entries. The mapping relationship in the CQI table in this embodiment of the present invention is only used as an example for ease of understanding the present invention, and a representation format of the CQI table in the present invention is not meant to be limited to the format described herein, that is to say, the CQI table may have various combinations, provided that it is able to present a mapping relationship between CQI indexes and entries. All of the combinations shall fall within the protection scope of the present invention.

The first MCS table may be predefined in a protocol, preset by a terminal device in compliance with a protocol, or prestored by the terminal device; or is selected by the terminal device from at least two predefined tables according to a downlink channel state; or may be notified by a base station to the terminal device, and specifically, a method for notifying the terminal device by the base station may be: selecting, by the base station, one table from at least two predefined tables according to an uplink channel state or a downlink channel state, and notifying the terminal device of the selected table. The MCS table is used for describing a mapping relationship between MCS indexes and entries. The mapping relationship in the MCS table in this embodiment of the present invention is only used as an example for ease of understanding the present invention, and a representation format of the MCS table in the present invention includes is not meant to be limited to the format described herein, to be specific, the MCS table may have various combinations, provided that it is able to present a mapping relationship between MCS indexes and entries. All of the combinations shall fall within the protection scope of the present invention.

The method includes the following steps:

S301: A base station receives a first CQI index.

The first CQI index is determined by a terminal device according to an acquired first CQI table. The first MCS index is determined by the base station according to an acquired first MCS table.

S302: The base station determines a first MCS index according to a first CQI table, a first MCS table, and the received first CQI index.

The first CQI table includes: an entry in which a modulation scheme is higher than 64QAM, where an entry in the first CQI table refers to one modulation scheme, one code rate, and one spectral efficiency that are corresponding to a CQI index in the first CQI table.

The first MCS table includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination (the term first in the first combination is only used to distinguish one combination from another, and do not necessarily require or imply any relationship or sequence exists between these combinations; the first combination is in essence the same as the second combination in the embodiment corresponding to FIG. 2), formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

That is to say, the first MCS table includes an entry in which a modulation scheme is higher than 64QAM; and the first MCS table further includes at least one entry that is in the second MCS table and in which a modulation scheme is QPSK, where entries that is in the first MCS table and in which a modulation scheme is QPSK cannot merely be K entries that are in the second MCS table and in which corresponding MCS indexes are continuous and greatest ones, and K is equal to 4, or K is a positive integer less than 5, or K is a positive integer; and/or the first MCS table further includes at least one entry that is in the second MCS table and in which a modulation scheme is 16QAM, where modulation schemes in the entries in the second MCS table merely include QPSK, 16QAM, and 64QAM. An entry in the first MCS table refers to one modulation order and one TBS index that are corresponding to an MCS index in the first MCS table, and an entry in the second MCS table refers to one modulation order and one TBS index that are corresponding to an MCS index in the second MCS table.

The combination is a combination formed by the at least one entry that is in the second MCS table and in which a modulation scheme is QPSK. In an example of the second MCS table shown in Table 6, there are $2^9-1=1023$ combinations formed by the at least one entry that is in the second MCS table and in which a modulation scheme is QPSK. For example, the combination may be a combination formed by an entry, in the second MCS table, that is corresponding to CQI index 6, may be a combination formed by entries, in the second MCS table, that are respectively corresponding to MCS indexes 6, 7, 8, and 9, may be a combination formed by entries to which CQI indexes 3, 6, 7, 8, and 9 are corresponding and which are in the second CQI table, or the like. It should be noted that, a method for determining a first MCS index according to an acquired first CQI index, a first CQI table, and a first MCS table is the same as the method in the foregoing embodiment, and details are not described herein again. For a method for determining a first TBS index and descriptions about a first TBS table and a second TBS table, refer to the previous embodiment, and details are not described herein again.

In addition, the first MCS table in this embodiment may be any one of the 6 types of first MCS tables in the foregoing embodiment, and details are not described herein again.

S303: The base station sends the determined first MCS index to the terminal device.

Figure 4:
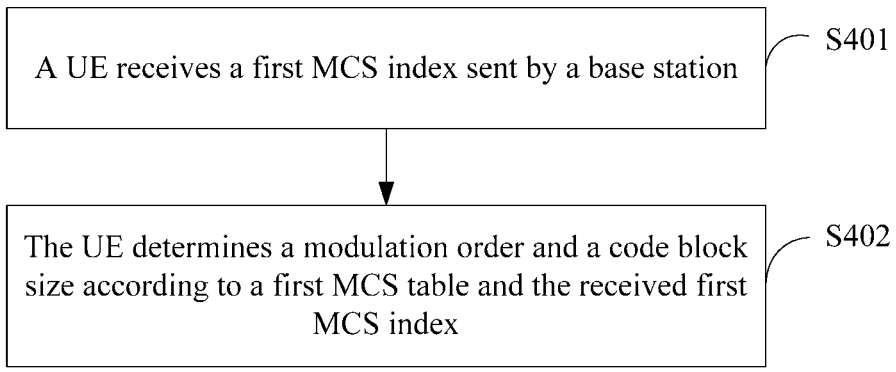
FIG. 4 is a schematic diagram of another MCS notifying method according to an embodiment of the present invention.

As shown in FIG. 4, the present invention further provides another MCS notifying method. A first MCS table in this embodiment may be any type of first MCS table in the foregoing embodiments.

In this embodiment, the first MCS table may be predefined in a protocol, preset by a terminal device in compliance with a protocol, or prestored by a terminal device; or is selected by a terminal device from at least two predefined tables according to a downlink channel state; or may be notified by a base station to a terminal device. Specifically, a method for notifying the terminal device by the base station may be: selecting, by the base station, one table from at least two predefined tables according to an uplink channel state or a downlink channel state, and notifying the terminal device of the selected table. An MCS table is used for describing a mapping relationship between MCS indexes and entries. The mapping relationship in the MCS table in this embodiment of the present invention is only used as an example for ease of understanding the present invention, and a representation format of the MCS table in the present invention is not meant to be limited to the format described herein, that is to say, the MCS table may have various combinations, provided that it is able to present a mapping relationship between MCS indexes and entries. All of the combinations shall fall within the protection scope of the present invention.

The method includes the following steps:

S401: A terminal device receives a first MCS index sent by a base station.

The first MCS index is determined by the base station according to an acquired first MCS table.

S402: The terminal device determines a modulation order and a code block size according to the first MCS table and the received first MCS index.

The first MCS table includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination, formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

The first MCS table includes an entry in which a modulation scheme is higher than 64QAM; and the first MCS table further includes at least one entry that is in the second MCS table and in which a modulation scheme is QPSK, where the entries that is in the first MCS table and in which a modulation scheme is QPSK cannot merely be K entries that are in the second MCS table and in which corresponding MCS indexes that are continuous and greatest ones, and K is equal to 4, or K is a positive integer less than 5, or K is a positive integer; and/or the first MCS table further includes at least one entry that is in the second MCS table and in which a modulation scheme is 16QAM. Modulation schemes in the entries in the second MCS table merely include QPSK, 16QAM, and 64QAM. An entry in the first MCS table refers to one modulation order and one TBS index that are corresponding to an MCS index in the first MCS table, and an entry in the second MCS table refers to one modulation order and one TBS index that are corresponding to an MCS index in the second MCS table.

The combination is a combination formed by at least one entry that is in the second MCS table and in which a modulation scheme is QPSK. In an example of the second MCS table shown in Table 6, there are $2^9-1=1023$ combinations formed by at least one entry that is in the second MCS table and in which a modulation scheme is QPSK. For example, the combination may be a combination formed by an entry that is in the second MCS table and is corresponding to CQI index 6, may be a combination formed by entries, in the second MCS table, that are respectively corresponding to MCS indexes 6, 7, 8, and 9, may be a combination formed by entries, in the second CQI table, that are respectively corresponding to CQI indexes 3, 6, 7, 8, and 9, or the like.

It should be noted that, the first MCS table in this embodiment may be any type of the six types of first MCS tables in the foregoing embodiments, and details are not described herein again.

Specifically, the determining a modulation order and a code block size according to the first MCS table and the received first MCS index includes:

determining a first TBS index and the modulation order according to the first MCS table and the received first MCS index; and determining the code block size according to the first TBS index, a first PRB quantity, and a first TBS table.

The first PRB quantity is a PRB quantity allocated to the terminal device by the base station; or the first PRB quantity is a greatest integer less than or equal to a product of the PRB quantity allocated to the terminal device and a specific coefficient.

The first TBS table includes at least one PRB quantity corresponding to each TBS index and a transmission block size corresponding to each PRB quantity; and the first TBS table is a TBS table corresponding to the first MCS table.

A value range of a TBS index in the first TBS table is 0-A, where A is a positive integer less than or equal to 26.

Or optionally, a value range of a TBS index in the first TBS table is 0-B, where B is a positive integer greater than or equal to 26, and transmission block sizes corresponding to TBS indexes 0-26 in the first TBS table are the same as transmission block sizes corresponding to TBS indexes 0-26, in a second TBS table; a value range of a TBS index in the second TBS table is 0-26, and the second TBS table includes at least one PRB quantity corresponding to each TBS index and a transmission block size corresponding to each PRB quantity.

Or optionally, a value range of a TBS index in the first TBS table is 0-B, where B is a positive integer greater than or equal to 26, and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

For descriptions of the first TBS table and the second TBS table in this embodiment, refer to the foregoing embodiments, and details are not described herein again.

Further, the terminal device receives a PDSCH according to the modulation order and the code block size.

Figure 5:
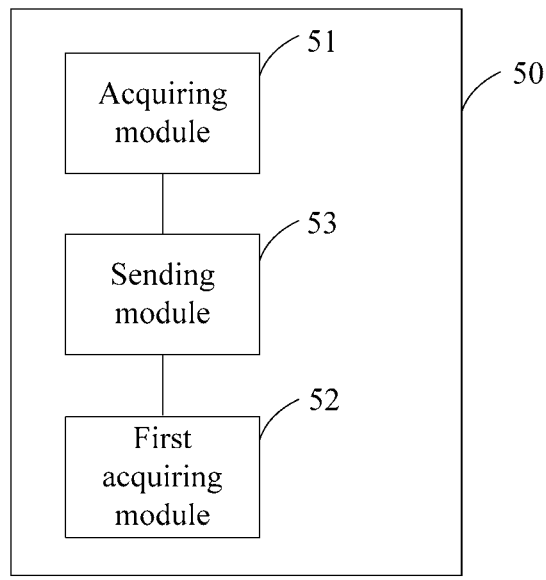
FIG. 5 is a schematic diagram of a CQI notifying apparatus according to an embodiment of the present invention.

As shown in FIG. 5, an embodiment of the present invention further provides a CQI notifying apparatus 50. The apparatus 50 includes:

an acquiring module 51, configured to acquire a first CQI table, where the first CQI table may be predefined by a terminal device, may be notified by a base station to a terminal device, or may be selected by a terminal device from at least two predefined tables according to a downlink channel state. Specifically, a method for notifying the terminal device by the base station may be: selecting, by the base station, one table from the at least two predefined tables according to a uplink channel state or a downlink channel state and reporting the selected table to the base station. A CQI table is used for describing a mapping relationship between CQI indexes and entries, and the mapping relationship is not limited to be represented in tabular form, it may be represented by descriptive expression;

a first acquiring module 52, configured to learn a first CQI index according to the first CQI table acquired by the acquiring module 51; and a sending module 53, configured to send the first CQI index learned by the first acquiring module 52 to a base station, so that the base station determines a first modulation and coding scheme MCS index according to the first CQI index.

The first CQI table acquired by the acquiring module 51 includes:

an entry in which a modulation scheme is higher than 64 quadrature amplitude modulation QAM; and at least one entry that is in a second CQI table and in which a modulation scheme is quadrature phase shift keying QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in entries in the second CQI table merely include QPSK, 16QAM, and 64QAM.

In the first CQI table acquired by the acquiring module, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the CQI table and in which a modulation scheme is QPSK.

In the first CQI table acquired by the acquiring module, the at least one entry that is in the second CQI table and in which a modulation scheme is 16QAM includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

Further, the first CQI table acquired by the acquiring module 51 further includes: at least one entry that is in the second CQI table and in which a modulation scheme is 64QAM.

Specifically, in the first CQI table acquired by the acquiring module, the at least one entry in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

Further, a spectral efficiency in an entry in which a corresponding CQI index is smallest among entries that are in the first CQI table acquired by the acquiring module 51 and in which a modulation scheme is higher than 64QAM is equal to a spectral efficiency in an entry in which a corresponding CQI index is greatest among all entries that are in the second CQI table and in which a modulation scheme is 64QAM; or spectral efficiencies in T entries in which corresponding CQI indexes are smallest ones among entries that are in the first CQI table and in which a modulation scheme is higher than 64QAM are equal to or approximately equal to spectral efficiencies in T entries in which corresponding CQI indexes are greatest ones among all entries that are in the second CQI table and in which a modulation scheme is 64QAM, where T is equal to any one natural number of 1-5.

Optionally, a spectral efficiency in an entry in which a corresponding CQI index is greatest among entries that are in the first CQI table and in which a modulation scheme is higher than 64QAM is:

4/3 times a spectral efficiency in an entry in which a corresponding CQI index is greatest among all entries that are in the second CQI table and in which a modulation scheme is 64QAM; or 8 times a maximum code rate of a terminal, where the maximum code rate is a positive real number less than 1; or 7.4063; or 7.432.

Optionally, spectral efficiencies in X entries that are in the first CQI table and in which CQI indexes are greatest ones are an arithmetic progression or an approximately arithmetic progression of spectral efficiencies arranged in ascending order; when it is mentioned that spectral efficiencies in X entries that are in the first CQI table and in which CQI indexes are greatest ones are an arithmetic progression of spectral efficiencies arranged in ascending order, it means that starting from the second entry in the X entries arranged in ascending order of the spectral efficiencies, a difference between a spectral efficiency in each entry and a spectral efficiency in a respective preceding entry is equal to a same constant; when it is mentioned that spectral efficiencies in X entries that are in the first CQI table and in which CQI indexes are greatest ones are an approximately arithmetic progression of spectral efficiencies arranged in ascending order, it means that starting from the second entry in the X entries arranged in ascending order of the spectral efficiencies, a difference between a spectral efficiency in each entry and a spectral efficiency in a respective preceding entry is within a range from a constant minus a preset value to the constant plus the preset value; and X is an integer greater than 2;

a spectral efficiency in an entry in which a corresponding CQI index is smallest among the X entries that are in the first CQI table and in which CQI indexes are greatest ones is equal to a spectral efficiency in an entry in which a corresponding CQI index is greatest among all entries that are in the second CQI table and in which a modulation scheme is 64QAM; and a spectral efficiency in an entry in which a corresponding CQI index is greatest among the X entries that are in the first CQI table and in which CQI indexes are greatest ones is:

4/3 times the spectral efficiency in the entry in which the corresponding CQI index is greatest among all the entries that are in the second CQI table and in which a modulation scheme is 64QAM; or 8 times a maximum code rate of a terminal, where the maximum code rate is a positive real number less than 1; or 7.4063; or 7.432.

Optionally, spectral efficiencies in the entries that are in the first CQI table and in which a modulation scheme is higher than 64QAM include at least one of the following groups of numerical values:

{5.5547 6.1805 6.8062 7.432},
{6.1805 6.8062 7.432},
{5.5547 6.1797 6.8047 7.4297},
{6.1797 6.8047 7.4297},
{5.5547 6.1719 6.7891 7.4063},
{6.1719 6.7891 7.4063},
{5.5547 6.4934 7.432},
{6.4934 7.432},
{5.5547 6.4922 7.4297},
{6.4922 7.4297},
{5.5547 6.4805 7.4063},
{6.4805 7.4063},
{5.5547 6.4844 7.4063},
{6.4844 7.4063},
{5.5547 6.0240 6.4934 6.9627 7.432},
{6.0234 6.4922 6.9609 7.4297},
{5.5547 6.0234 6.4922 6.9609 7.4297},
{6.0176 6.4805 6.9434 7.4063},
{5.5547 6.0176 6.4805 6.9434 7.4063},
{6.0176 6.4805 6.9434 7.4063},
{5.5547 6.0156 6.4844 6.9453 7.4063},
{6.0156 6.4844 6.9453 7.4063},
{5.5547 5.9302 6.3056 6.6811 7.0565 7.432},
{5.9302 6.3056 6.6811 7.0565 7.432},
{5.5547 5.9297 6.3047 6.6797 7.0547 7.4297},
{5.9297 6.3047 6.6797 7.0547 7.4297},
{5.5547 5.9250 6.2953 6.6656 7.0360 7.4063},
{5.9250 6.2953 6.6656 7.0360 7.4063},
{5.5547 5.9219 6.2969 6.6641 7.0391 7.4063}, and
{5.9219 6.2969 6.6641 7.0391 7.4063}.

Further, a value range of a CQI index in the first CQI table acquired by the acquiring module 51 is the same as a value range of a CQI index in the second CQI table.

The MCS notifying apparatus shown in FIG. 5 can execute corresponding steps in the foregoing method embodiment. For details, refer to the descriptions in the foregoing method embodiment; and for effects achieved by the MCS notifying apparatus, reference may also be made to the descriptions in the foregoing method embodiment.

Figure 6:
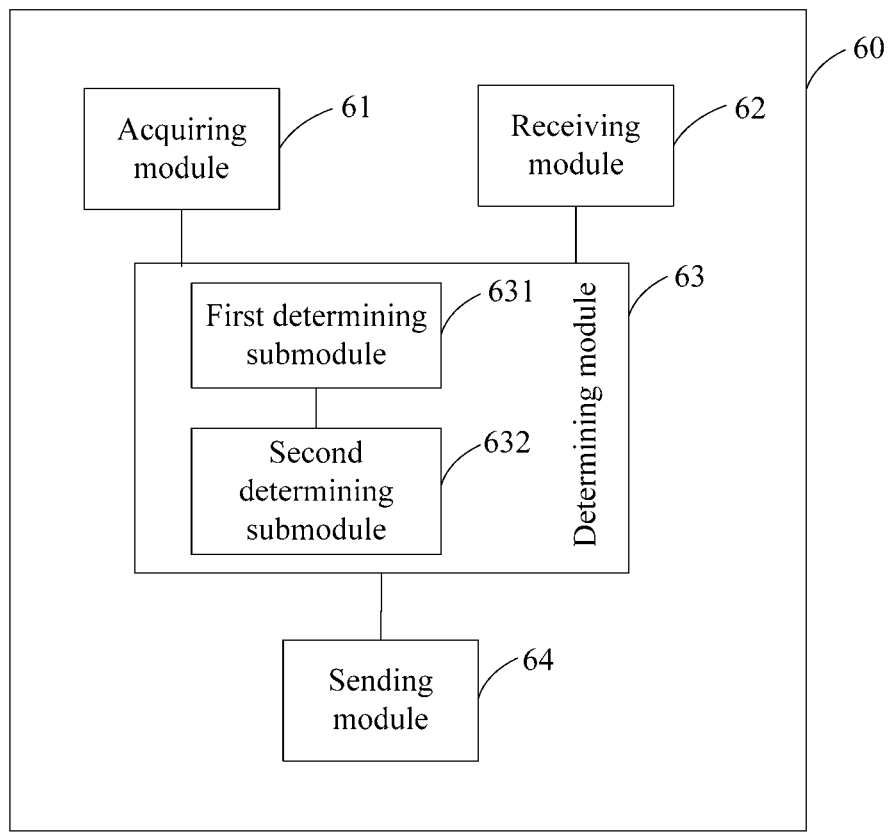
FIG. 6 is a schematic diagram of an MCS notifying apparatus according to an embodiment of the present invention.

As shown in FIG. 6, an embodiment of the present invention further provides an MCS notifying apparatus 60. The apparatus 60 includes:

an acquiring module 61, configured to acquire a first CQI table and a first MCS table, where the first CQI table may be predefined in a protocol, preset by a terminal device in compliance with a protocol, or prestored by a terminal device; or is selected by a terminal device from at least two predefined tables according to a downlink channel state; or may be notified by a base station to the terminal device. Specifically, a method for notifying the terminal device by the base station may be: selecting, by the base station, one table from at least two predefined tables according to an uplink channel state or a downlink channel state, and notifying the terminal device of the selected table. A CQI table is used for describing a mapping relationship between CQI indexes and entries. The mapping relationship in the CQI table in this embodiment of the present invention is only used as an example for ease of understanding the present invention, and a representation format of the CQI table in the present invention is not meant to be limited to the format described herein, that is to say, the CQI table may have various combinations, provided that it is able to present a mapping relationship between CQI indexes and entries. All of the combinations shall fall within the protection scope of the present invention; and the first MCS table may be predefined in a protocol, preset by the terminal device in compliance with a protocol, or prestored by the terminal device; or is selected by the terminal device from at least two predefined tables according to a downlink channel state; or may be notified by the base station to the terminal device. Specifically, a method for notifying the terminal device by the base station may be: selecting, by the base station, one table from at least two predefined tables according to an uplink channel state or a downlink channel state, and notifying the terminal device of the selected table. An MCS table is used for describing a mapping relationship between MCS indexes and entries. The mapping relationship in the MCS table in this embodiment of the present invention is only used as an example for ease of understanding the present invention, and a representation format of the MCS table in the present invention is not meant to be limited to the format described herein, that is to say, the MCS table may have various combinations, provided that it is able to present a mapping relationship between MCS indexes and entries. All of the combinations shall fall within the protection scope of the present invention;

a receiving module 62, configured to receive a first CQI index sent by a device, where the first CQI index is determined by the terminal device according to the first CQI table;

a determining module 63, configured to determine a first MCS index according to the first CQI table acquired by the acquiring module, the first MCS table acquired by the acquiring module, and the first CQI index received by the receiving module 62; and a sending module 64, configured to send the determined first MCS index to the terminal device.

The first CQI table acquired by the acquiring module 61 includes:

an entry in which a modulation scheme is higher than 64QAM; and at least one entry that is in a second CQI table and in which a modulation scheme is QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in the second CQI table merely include QPSK, 16QAM, and 64QAM.

The first MCS table acquired by the acquiring module includes:

an entry in which a modulation scheme is higher than 64QAM; and at least one entry that is in a second MCS table and in which a modulation scheme is QPSK, where the at least one entry in which a modulation scheme is QPSK includes a combination, other than a second combination, formed by the at least one entry that is in the second MCS table and in which a modulation scheme is QPSK, the second combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

The determining module 63 is specifically configured to:

determine a first TBS index and the first MCS index according to an acquired first PRB quantity, the first CQI table acquired by the acquiring module, the first MCS table acquired by the acquiring module, a first TBS table, and the received first CQI index, where the first PRB quantity is a PRB quantity allocated to the terminal device by the base station; or the first PRB quantity is a greatest integer less than or equal to a product of the PRB quantity allocated to the terminal device and a specific coefficient;

the first TBS table includes at least one PRB quantity corresponding to each TBS index and a transmission block size corresponding to each PRB quantity; and the first TBS table is a TBS table corresponding to the first MCS table.

Optionally, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-26 in the first TBS table are the same as transmission block sizes corresponding to TBS indexes 0-26 in a second TBS table; a value range of a TBS index in the second TBS table is 0-26, where the second TBS table includes at least one PRB quantity corresponding to each TBS index and a transmission block size corresponding to each PRB quantity.

Or optionally, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

The determining module 63 includes:

a first determining submodule 631, configured to determine, according to the first CQI table acquired by the acquiring module and the first CQI index received by the receiving module, a first modulation scheme and a first spectral efficiency that are corresponding to the received first CQI index; and a second determining submodule 632, configured to learn, according to the acquired first PRB quantity and the first spectral efficiency determined by the first determining submodule, a first transmission block size transmitted to the terminal device; and obtain, according to the first TBS table, the first TBS index that is in the first TBS table and corresponding to the first transmission block size and the first PRB quantity, where the first transmission block size is determined by the second determining submodule.

Optionally, the first TBS table includes at least one of a TBS index Y1, a TBS index Y2, a TBS index Y3, and TBS indexes Y4_1 to Y4_5. For descriptions of entries corresponding to these TBS indexes in the first TBS table, refer to the foregoing method embodiments, and details are not described herein again.

In the first CQI table acquired by the acquiring module, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the CQI table and in which a modulation scheme is QPSK.

In the first CQI table acquired by the acquiring module, the at least one entry that is in the second CQI table and in which a modulation scheme is 16QAM includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

Further, the first CQI table acquired by the acquiring module may further include:

at least one entry that is in the second CQI table and in which a modulation scheme is 64QAM.

Specifically, in the first CQI table acquired by the acquiring module, the at least one entry that is in the second CQI table and in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

Further, a spectral efficiency in an entry in which a corresponding CQI index is smallest among entries that are in the first CQI table acquired by the acquiring module and in which a modulation scheme is higher than 64QAM is equal to a spectral efficiency in an entry in which a corresponding CQI index is greatest among all entries that are in the second CQI table and in which a modulation scheme is 64QAM; or spectral efficiencies in T entries in which corresponding CQI indexes are smallest ones among entries that are in the first CQI table and in which a modulation scheme is higher than 64QAM are equal to or approximately equal to spectral efficiencies in T entries in which corresponding CQI indexes are greatest ones among all entries that are in the second CQI table and in which a modulation scheme is 64QAM, where T is equal to any one natural number of 1-5.

Further, a value range of a CQI index in the first CQI table acquired by the acquiring module is the same as a value range of a CQI index in the second CQI table.

In the first MCS table acquired by the acquiring module, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

In the first CQI table acquired by the acquiring module, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

Further, the first MCS table acquired by the acquiring module may further include: at least one entry that is in the second MCS table and in which a modulation scheme is 64QAM.

Specifically, in the first CQI table acquired by the acquiring module, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM; or part of entries that are in the second MCS table and in which a modulation scheme is 64QAM, where the part of entries is at least one entry other than an entry in which an MCS index is greatest among all entries that are in the second MCS table and in which a modulation scheme is 64QAM.

Further, the at least one entry that is in the second MCS table and in which a modulation scheme is 64QAM includes that: a TBS index in an entry in which a corresponding MCS index is smallest among all entries that are in the first MCS table acquired by the acquiring module and in which a modulation scheme is higher than 64QAM is the same as a TBS index in an entry in which an MCS index is greatest among all entries that are in the second MCS table and in which a modulation scheme is 64QAM; or TBS indexes in R entries in which corresponding MCS indexes are smallest ones among entries that are in the first MCS table and in which a modulation scheme is higher than 64QAM and which may be equal to TBS indexes in R entries in which MCS indexes are greatest ones among all entries in which a modulation scheme is 64QAM and MCS indexes are not greater than 27, where R is a natural number.

Further, a value range of an MCS index in the first MCS table acquired by the acquiring module is the same as a value range of an MCS index in the second MCS table.

Optionally, the first MCS table may further include at least one entry in the Table D1, D2, D3, D4, or D5, where any one entry includes an MCS index, and a modulation order and a TBS index that are corresponding to the MCS index. For Table D1, Table D2, Table D3, Table D4, and Table D5, refer to the foregoing method embodiment, and details are not described herein again.

The MCS notifying apparatus shown in FIG. 6 can execute corresponding steps in the foregoing method embodiment. For details, refer to the descriptions in the foregoing method embodiment; and for effects achieved by the MCS notifying apparatus, reference may also be made to the descriptions in the foregoing method embodiment.

Figure 7:
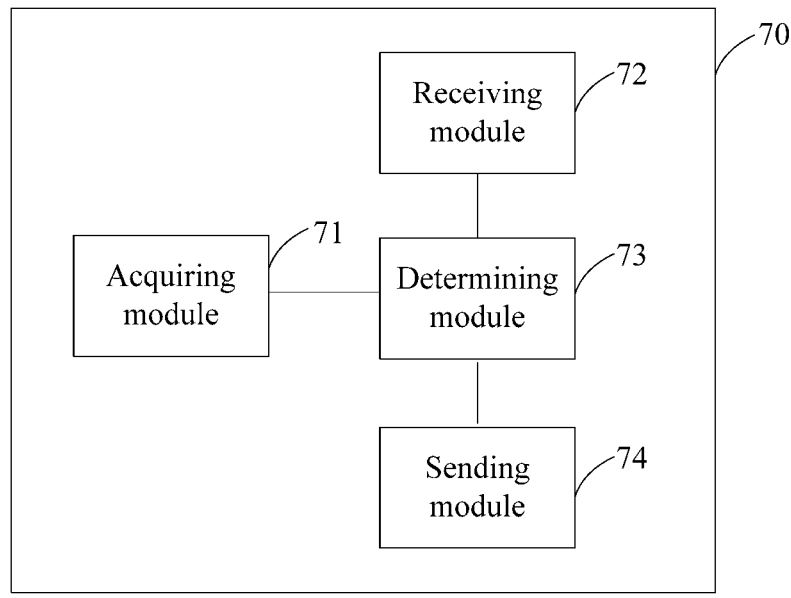
FIG. 7 is a schematic diagram of another MCS notifying apparatus according to an embodiment of the present invention.

As shown in FIG. 7, an embodiment of the present invention further provides an MCS notifying apparatus 70. The apparatus 70 provides:

an acquiring module 71, configured to acquire a first CQI table and a first MCS table, where the first CQI table may be predefined in a protocol, preset by a terminal device in compliance with a protocol, or prestored by a terminal device; or is selected by a terminal device from at least two predefined tables according to a downlink channel state; or may be notified by a base station to a terminal device. Specifically, a method for notifying the terminal device by the base station may be: selecting, by the base station, one table from at least two predefined tables according to an uplink channel state or a downlink channel state, and notifying the terminal device of the selected table. A CQI table is used for describing a mapping relationship between CQI indexes and entries. The mapping relationship in the CQI table in this embodiment of the present invention is only used as an example for ease of understanding the present invention, and a representation format of the CQI table in the present invention is not meant to be limited to the format described herein, that is to say, the CQI table may have various combinations, provided that it is able to present a mapping relationship between CQI indexes and entries. All of the combinations shall fall within the protection scope of the present invention; and the first MCS table may be predefined in a protocol, preset by a terminal device in compliance with a protocol, or prestored by a terminal device; or is selected by a terminal device from at least two predefined tables according to a downlink channel state; or may be notified by a base station to a terminal device. Specifically, a method for notifying the terminal device by the base station may be: selecting, by the base station, one table from at least two predefined tables according to an uplink channel state or a downlink channel state, and notifying the terminal device of the selected table. An MCS table is used for describing a mapping relationship between MCS indexes and entries. The mapping relationship in the MCS table in this embodiment of the present invention is only used as an example for ease of understanding the present invention, and a representation format of the MCS table in the present invention is not meant to be limited to the format described herein, that is to say, the MCS table may have various combinations, provided that it is able to present a mapping relationship between MCS indexes and entries. All of the combinations shall fall within the protection scope of the present invention;

a receiving module 72, configured to receive a first CQI index, where the first CQI index is determined by a terminal device according to the first CQI table;

a determining module 73, configured to determine a first MCS index according to the first CQI table acquired by the acquiring module, the first MCS table acquired by the acquiring module, and the first CQI index received by the receiving module 72; and a sending module 74, configured to send the first MCS index determined by the determining module to the terminal device.

The first CQI table acquired by the acquiring module includes: an entry in which a modulation scheme is higher than 64QAM, where an entry in the first CQI table refers to one modulation scheme, one code rate, and one spectral efficiency that are corresponding to a CQI index in the first CQI table.

The first MCS table acquired by the acquiring module includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination (the term first in the first combination is only used to distinguish one combination from another, and do not necessarily require or imply any relationship or sequence exists between these combinations; the first combination is in essence the same as the second combination in the embodiment corresponding to FIG. 2), formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

It should be noted that, the first MCS table used by the MCS notifying apparatus 70 may be the same as the first MCS table used by the MCS notifying apparatus 60. A difference between the two apparatuses is that the first CQI table used by the MCS notifying apparatus 70 may be different from the first CQI table used by the MCS notifying apparatus 60. However, the first CQI tables used by the two apparatuses both include an entry in which a modulation scheme is higher than 64QAM.

In the first MCS table acquired by the acquiring module, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

In the first MCS table acquired by the acquiring module, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

Further, the first MCS table acquired by the acquiring module further includes: at least one entry that is in the second MCS table and in which a modulation scheme is 64QAM.

Specifically, in the first MCS table acquired by the acquiring module, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM.

Further, in the first MCS table acquired by the acquiring module, the at least one entry that is in the second MCS table and in which a modulation scheme is 64QAM includes that:

a TBS index in an entry in which a corresponding MCS index is smallest among all entries that are in the first MCS table acquired by the acquiring module and in which a modulation scheme is higher than 64QAM is the same as a TBS index in an entry in which an MCS index is greatest among all entries that are in the second MCS table in which a modulation scheme is 64QAM.

Further, a value range of an MCS index in the first MCS table acquired by the acquiring module is the same as a value range of an MCS index in the second MCS table.

The MCS notifying apparatus shown in FIG. 7 can execute corresponding steps in the foregoing method embodiment. For details, refer to the descriptions in the foregoing method embodiment; and for effects achieved by the MCS notifying apparatus, reference may also be made to the descriptions in the foregoing method embodiment.

Figure 8:
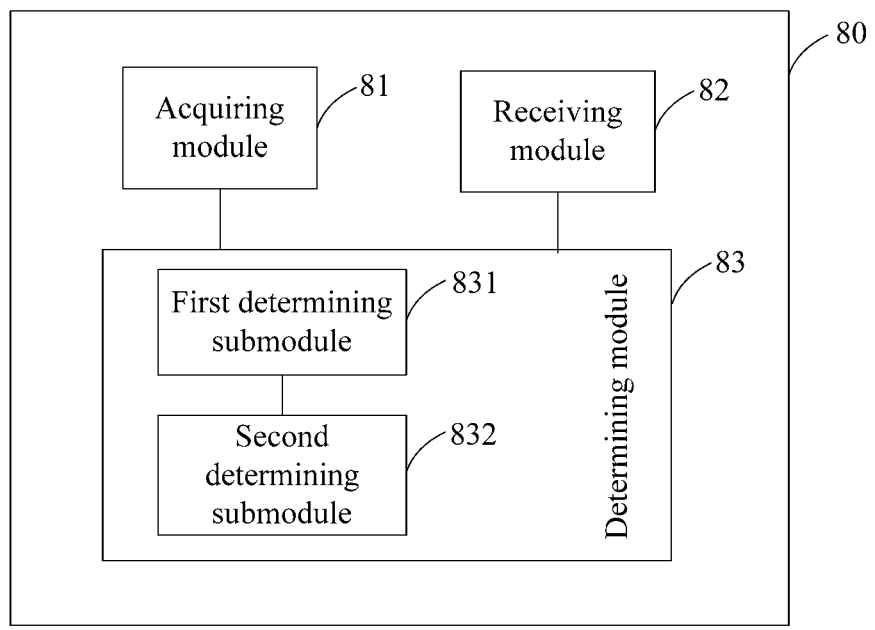
FIG. 8 is a schematic diagram of another MCS notifying apparatus according to an embodiment of the present invention.

As shown in FIG. 8, an embodiment of the present invention further provides an MCS notifying apparatus 80. The apparatus 80 provides:

an acquiring module 81, configured to acquire a first MCS table, where the first MCS table may be predefined in a protocol, preset by a terminal device in compliance with a protocol, or prestored by a terminal device; or is selected by a terminal device from at least two predefined tables according to a downlink channel state; or may be notified by a base station to a terminal device. Specifically, a method for notifying the terminal device by the base station may be: selecting, by the base station, one table from at least two predefined tables according to an uplink channel state or a downlink channel state, and notifying the terminal device of the selected table. An MCS table is used for describing a mapping relationship between MCS indexes and entries. The mapping relationship in the MCS table in this embodiment of the present invention is only used as an example for ease of understanding the present invention, and a representation format of the MCS table in the present invention is not meant to be limited to the format described herein, that is to say, the MCS table may have various combinations, provided that it is able to present a mapping relationship between MCS indexes and entries. All of the combinations shall fall within the protection scope of the present invention;

a receiving module 82, configured to receive a first MCS index sent by a base station, where the first MCS index is determined by the base station according to the first MCS table; and a determining module 83, configured to determine a modulation order and a code block size according to the first MCS table and the first MCS index received by the receiving module 82.

The first MCS table acquired by the acquiring module includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination, formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

The determining module 83 includes:

a first determining submodule 831, configured to determine a first TBS index and the modulation order according to the first MCS table acquired by the acquiring module and the received first MCS index; and a second determining submodule 832, configured to determine the code block size according to the first TBS index, a first PRB quantity, and a first TBS table, where the first PRB quantity is a PRB quantity allocated to the terminal device by the base station; or the first PRB quantity is a greatest integer less than or equal to a product of the PRB quantity allocated to the terminal device and a specific coefficient; and the first TBS table includes at least one PRB quantity corresponding to each TBS index and a transmission block size corresponding to each PRB quantity; and the first TBS table is a TBS table corresponding to the first MCS table.

Optionally, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-26 in the first TBS table are the same as transmission block sizes corresponding to TBS indexes 0-26 in a second TBS table; a value range of a TBS index in the second TBS table is 0-26, and the second TBS table includes at least one PRB quantity corresponding to each TBS index and a transmission block size corresponding to each PRB quantity.

Or optionally, a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-C in the first TBS table are the same as transmission block sizes corresponding to TBS indexes 0-C in a second TBS table, where C is a non-negative integer less than or equal to 26; a value range of a TBS index in the second TBS table is 0-26, and the second TBS table includes at least one PRB quantity corresponding to each TBS index and a transmission block size corresponding to each PRB quantity.

Optionally, the first TBS table includes at least one of a TBS index Y1, a TBS index Y2, a TBS index Y3, and TBS indexes Y4_1 to Y4_5. For descriptions of entries corresponding to these TBS indexes in the first TBS table, refer to the foregoing method embodiment, and details are not described herein again.

In the first MCS table acquired by the acquiring module, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

In the first MCS table acquired by the acquiring module, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

Further, the first MCS table acquired by the acquiring module further includes: at least one entry that is in the second MCS table and in which a modulation scheme is 64QAM.

Specifically, in the first MCS table acquired by the acquiring module, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM; or part of entries that are in the second MCS table and in which a modulation scheme is 64QAM, where the part of entries is at least one entry other than an entry in which an MCS index is greatest among all entries that are in the second MCS table and in which a modulation scheme is 64QAM.

Further, in the first MCS table acquired by the acquiring module, the at least one entry that is in the second MCS table and in which a modulation scheme is 64QAM includes that:

a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM; or TBS indexes in R entries in which corresponding MCS indexes are smallest ones among entries that are in the first MCS table and in which a modulation scheme is higher than 64QAM may be equal to TBS indexes in R entries in which MCS indexes are greatest ones among all entries that are in the second MCS table and in which a modulation scheme is 64QAM and MCS indexes are not greater than 27, where R is a natural number.

Optionally, the first MCS table further includes at least one entry in the Table D1, D2, D3, D4, or D5, where any one entry includes an MCS index, and a modulation order and a TBS index that are corresponding to the MCS index. For Tables D1, D2, D3, D4, and D5, refer to the foregoing method embodiment.

Further, a value range of an MCS index in the first MCS table acquired by the acquiring module is the same as a value range of an MCS index in the second MCS table.

The MCS notifying apparatus shown in FIG. 8 can execute corresponding steps in the foregoing method embodiment. For details, refer to the descriptions in the foregoing method embodiment; and for effects achieved by the MCS notifying apparatus, reference may also be made to the descriptions in the foregoing method embodiment.

Figure 9:
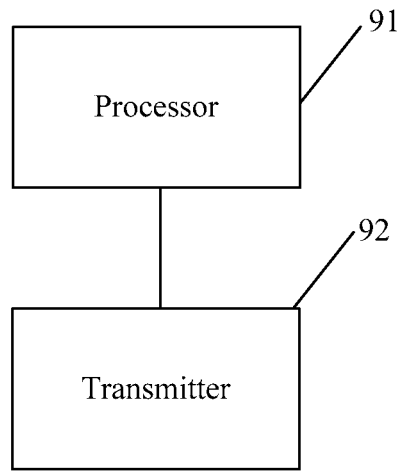
FIG. 9 is a schematic diagram of another CQI notifying apparatus according to an embodiment of the present invention.

As shown in FIG. 9, an embodiment of the present invention further provides a channel quality indicator CQI notifying apparatus 90, including: a processor 91 and a transmitter 92;

the processor is configured to acquire a first CQI table; and configured to learn a first CQI index according to the first CQI table; and the transmitter is configured to send the first CQI index acquired by the processor to a base station, so that the base station determines a first modulation and coding scheme MCS index according to the first CQI index.

The first CQI table acquired by the processor includes:
an entry in which a modulation scheme is higher than 64 quadrature amplitude modulation QAM; and at least one entry that is in a second CQI table and in which a modulation scheme is quadrature phase shift keying QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that is in the second CQI table and in which a modulation scheme is 16QAM, where modulation schemes in entries in the second CQI table merely include QPSK, 16QAM, and 64QAM.

In the first CQI table acquired by the processor, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the second CQI table and in which a modulation scheme is QPSK.

In the first CQI table acquired by the processor, the at least one entry that is in the second CQI table and in which a modulation scheme is 16QAM includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

The first CQI table acquired by the processor further includes:

at least one entry that is in the second CQI table and in which a modulation scheme is 64QAM.

In the first CQI table acquired by the processor, the at least one entry in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

A spectral efficiency in an entry in which a corresponding CQI index is smallest among entries that are in the first CQI table acquired by the processor and in which a modulation scheme is higher than 64QAMr is equal to a spectral efficiency in an entry in which a corresponding CQI index is greatest among all entries that are in the second CQI table and in which a modulation scheme is 64QAM.

A value range of a CQI index in the first CQI table acquired by the processor is the same as a value range of a CQI index in the second CQI table.

For specific implementation of functions of various components of the CQI notifying apparatus 90 in this embodiment, refer to the descriptions in the foregoing embodiment of the CQI notifying method, and details are not described herein again.

Figure 10:
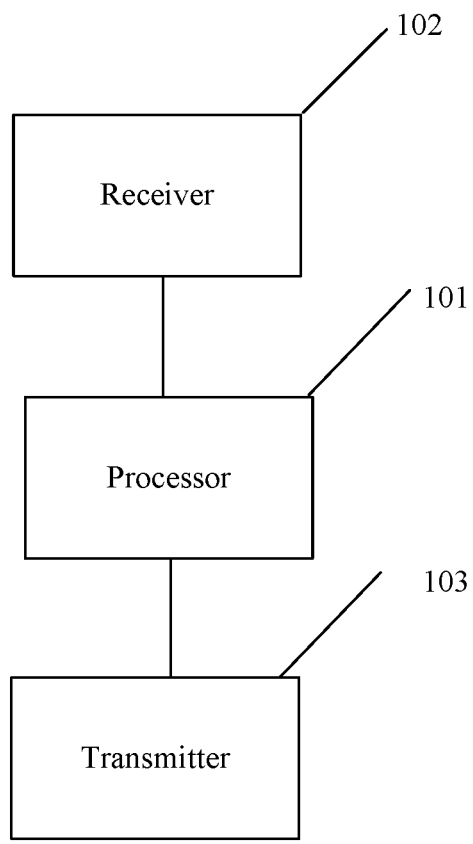
FIG. 10 is a schematic diagram of another MCS notifying apparatus according to an embodiment of the present invention.

As shown in FIG. 10, an embodiment of the present invention further provides a modulation and coding scheme MCS notifying apparatus 10, including:

a processor 101, configured to acquire a first CQI table and a first MCS table;

a receiver 102, configured to receive a first channel quality indicator CQI index sent by a terminal device, where the first CQI index is determined by the terminal device according to the first CQI table, and the processor is configured to determine a first MCS index according to the first CQI table acquired by the processor, the acquired first MCS table, and the first CQI index received by the receiver; and a transmitter 103, configured to send the first MCS index determined by the processor to the terminal device.

The first CQI table acquired by the processor includes:

an entry in which a modulation scheme is higher than 64QAM; and at least one entry that is in a second CQI table and in which a modulation scheme is QPSK, where the at least one entry in which a modulation scheme is QPSK includes a combination, other than a first combination, formed by the at least one entry that is in the second CQI table and in which a modulation scheme is QPSK, the first combination is N entries that are in the second CQI table and in which CQI indexes corresponding to QPSK are continuous and greatest ones, and N is equal to 3, or N is a positive integer less than 4, or N is a positive integer; and/or at least one entry that I in the second CQI table and in which a modulation scheme is 16QAM, where modulation schemes in the second CQI table merely include QPSK, 16QAM, and 64QAM.

The first MCS table acquired by the processor includes:

an entry in which a modulation scheme is higher than 64QAM; and at least one entry that is in a second MCS table and in which a modulation scheme is QPSK, where the at least one entry in which a modulation scheme is QPSK includes a combination, other than a second combination, formed by the at least one entry that is in the second MCS table and in which a modulation scheme is QPSK, the second combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

The processor is specifically configured to:

determine a first TBS index and the first MCS index according to an acquired first PRB quantity, the first CQI table acquired by the processor, and the first MCS table acquired by the processor, and the received first CQI index, where the first PRB quantity is a PRB quantity allocated to the terminal device by the base station; or the first PRB quantity is a greatest integer less than or equal to a product of the PRB quantity allocated to the terminal device and a specific coefficient;

the first TBS table includes at least one PRB quantity corresponding to each TBS index and a transmission block size corresponding to each PRB quantity; and the first TBS table is a TBS table corresponding to the first MCS table;

a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-26 in the first TBS table are the same as transmission block sizes corresponding to TBS indexes 0-26 in a second TBS table; a value range of a TBS index in the second TBS table is 0-26, and the second TBS table includes at least one PRB quantity corresponding to each TBS index and a transmission block size corresponding to each PRB quantity.

The processor is specifically configured to:

determine, according to the first CQI table acquired by the processor and the first CQI index received by the receiver, a first modulation scheme and a first spectral efficiency that are corresponding to the received first CQI index;

learn, according to the first PRB quantity and the determined first spectral efficiency, a first transmission block size transmitted to the terminal device; and obtain, according to the first TBS table, the first TBS index that is in the first TBS table and corresponding to the determined first transmission block size and the first PRB quantity.

In the first CQI table acquired by the processor, the at least one entry that is in the second CQI table and in which a modulation scheme is QPSK includes:

part of entries that are in the second CQI table and in which a modulation scheme is QPSK, where a difference between successive CQI indexes corresponding to the part of entries are the same; or part of entries that are in the second CQI table and in which a modulation scheme is QPSK, where a difference between successive CQI indexes corresponding to the part of entries are not the same; or part of entries that are in the second CQI table and in which a modulation scheme is QPSK, where CQI indexes corresponding to the part of entries are discontinuous, and the part of entries is at least one entry other than an entry in which a corresponding CQI index is greatest among all entries that are in the second CQI table and in which a modulation scheme is QPSK; or part of entries that are in the second CQI table and in which a modulation scheme is QPSK, where CQI indexes corresponding to the part of entries are continuous, and the part of entries is at least one entry other than an entry in which a corresponding CQI index is greatest among all entries that are in the second CQI table and in which a modulation scheme is QPSK.

In the first CQI table acquired by the processor, the at least one entry that is in the second CQI table and in which a modulation scheme is 16QAM includes:

all entries that are in the second CQI table and in which a modulation scheme is 16QAM; or at least one entry other than an entry in which a corresponding CQI index is smallest among all entries that are in the second CQI table and in which a modulation scheme is 16QAM.

The first CQI table acquired by the processor further includes:

at least one entry that is in the second CQI table and in which a modulation scheme is 64QAM.

In the first CQI table acquired by the processor, the at least one entry that is in the second CQI table and in which a modulation scheme is 64QAM includes:

all entries that are in the second CQI table and in which a modulation scheme is 64QAM; or part of entries that are in the second CQI table and in which a modulation scheme is 64QAM, where the part of entries is at least one entry other than an entry in which a corresponding CQI index is greatest among all entries that are in the second CQI table and in which a modulation scheme is 64QAM.

A spectral efficiency in an entry in which a corresponding CQI index is smallest among entries that are in the first CQI table acquired by the processor and in which a modulation scheme is higher than 64QAM is equal to a spectral efficiency in an entry in which a corresponding CQI index is greatest among all entries that are in the second CQI table and in which a modulation scheme is 64QAM.

A value range of a CQI index in the first CQI table acquired by the processor is the same as a value range of a CQI index in the second CQI table.

In the first MCS table acquired by the processor, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

In the first CQI table acquired by the processor, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

The first MCS table acquired by the processor further includes:

at least one entry that is in the second MCS table and in which a modulation scheme is 64QAM.

In the first CQI table acquired by the processor, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM.

In the first MCS table acquired by the processor, the at least one entry that is in the second MCS table and in which a modulation scheme is 64QAM includes that:

a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM.

A value range of an MCS index in the first MCS table acquired by the processor is the same as a value range of an MCS index in the second MCS table.

For specific implementation of functions of various components of the MCS notifying apparatus 10 in this embodiment, refer to the descriptions in the foregoing embodiment of the MCS notifying method corresponding to FIG. 2, and details are not described herein again.

Figure 11:
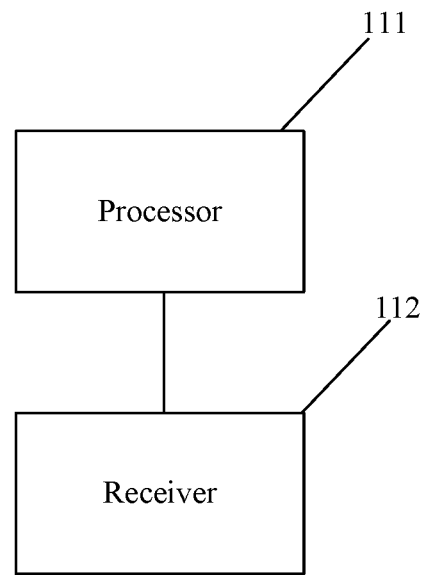
FIG. 11 is a schematic diagram of another MCS notifying apparatus according to an embodiment of the present invention.

As shown in FIG. 11, an embodiment of the present invention further provides a modulation and coding scheme MCS notifying apparatus 11, including:

a processor 111, configured to acquire a first MCS table; and a receiver 112, configured to receive a first MCS index sent by a base station, where the first MCS index is determined by the base station according to the first MCS table acquired by the processor; and the processor 111 is configured to determine a modulation order and a code block size according to the first MCS table acquired by the processor and the first MCS index received by the receiver.

The first MCS table acquired by the processor includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination (the term first in the first combination is only used to distinguish one combination from another, and do not necessarily require or imply any relationship or sequence exists between these combinations; the first combination is in essence the same as the second combination in the embodiment corresponding to FIG. 2), formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

The processor is specifically configured to:

determine a first TBS index and the modulation order according to the first MCS table acquired by the processor and the received first MCS index; and determine the code block size according to the first TBS index, a first PRB quantity, and a first TBS table, where the first PRB quantity is a PRB quantity allocated to the terminal device by the base station; or the first PRB quantity is a greatest integer less than or equal to a product of the PRB quantity allocated to the terminal device and a specific coefficient; and the first TBS table includes at least one PRB quantity corresponding to each TBS index and a transmission block size corresponding to each PRB quantity; and the first TBS table is a TBS table corresponding to the first MCS table;

a value range of a TBS index in the first TBS table is 0-A, where A is a positive integer less than or equal to 26; or a value range of a TBS index in the first TBS table is 0-B, where B is a positive integer greater than or equal to 26; and transmission block sizes corresponding to TBS indexes 0-26 in the first TBS table are the same as transmission block sizes corresponding to TBS indexes 0-26 in a second TBS table; a value range of a TBS index in the second TBS table is 0-26, and the second TBS table includes at least one PRB quantity corresponding to each TBS index and a transmission block size corresponding to each PRB quantity.

In the first MCS table acquired by the processor, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

In the first MCS table acquired by the processor, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest or smallest among all entries that are in the second MCS table and in which a modulation scheme is 16QAM.

The first MCS table acquired by the processor further includes:

at least one entry that is in the second MCS table and in which a modulation scheme is 64QAM.

In the first MCS table acquired by the processor, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM.

In the first MCS table acquired by the processor, the at least one entry that is in the second MCS table and in which a modulation scheme is 64QAM includes that:

a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM.

A value range of an MCS index in the first MCS table acquired by the processor is the same as a value range of an MCS index in the second MCS table.

For specific implementation of functions of various components of the MCS notifying apparatus 11 in this embodiment, refer to the descriptions in the foregoing embodiment of the MCS notifying method corresponding to FIG. 3, and details are not described herein again.

Figure 12:
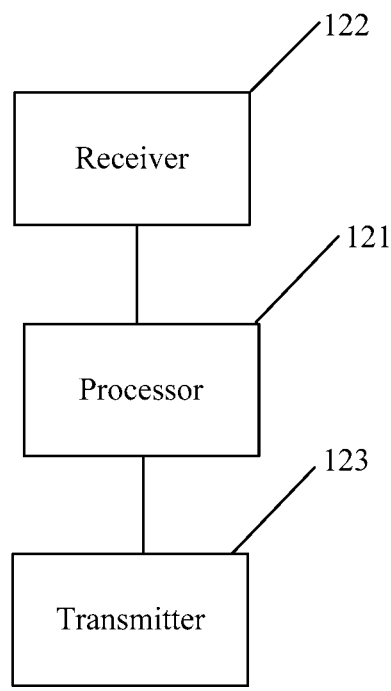
FIG. 12 is a schematic diagram of another MCS notifying apparatus according to an embodiment of the present invention.

As shown in FIG. 12, the present invention provides a modulation and coding scheme MCS notifying apparatus, including:

a processor 121, configured to acquire a first CQI table and a first MCS table;

a receiver 122, configured to receive a first CQI index, where the first CQI index is determined by a terminal device according to the first CQI table, and the processor 121 is configured to determine a first MCS index according to the acquired first CQI table, the acquired first MCS table, and the first CQI index received by the receiver; and a transmitter 123, configured to send the first MCS index determined by the processor 121 to the terminal device, where the first CQI table acquired by the processor includes: an entry in which a modulation scheme is higher than 64QAM, where an entry in the first CQI table acquired by the processor refers to one modulation scheme, one code rate, and one spectral efficiency that are corresponding to a CQI index in the first CQI table;

the first MCS table acquired by the processor includes:

an entry in which a modulation scheme is higher than 64QAM; and at least one entry that is in a second MCS table and in which a modulation scheme is QPSK, where the at least one entry in which a modulation scheme is QPSK includes a combination, other than a first combination, formed by the at least one entry that is in the second MCS table and in which a modulation scheme is QPSK, the first combination is K entries that are in the second MCS table and in which MCS indexes corresponding to QPSK are continuous and greatest ones, and K is equal to 4, or K is a positive integer less than 5, or K is a positive integer; and/or at least one entry that is in the second MCS table and in which a modulation scheme is 16QAM, where modulation schemes in the second MCS table merely include QPSK, 16QAM, and 64QAM.

In the first MCS table acquired by the processor, the at least one entry that is in the second MCS table and in which a modulation scheme is QPSK includes:

part of entries that are in the second MCS table and in which a modulation scheme is QPSK, where a difference between successive MCS indexes corresponding to the part of entries are the same; or part of entries that are in the second MCS table and in which a modulation scheme is QPSK, where a difference between successive MCS indexes corresponding to the part of entries are not the same; or part of entries that are in the second MCS table and in which a modulation scheme is QPSK, where MCS indexes corresponding to the part of entries are discontinuous, and the part of entries is at least one entry other than an entry in which an MCS index is greatest among all entries that are in the second MCS table and in which a modulation scheme is QPSK; or part of entries that are in the second MCS table and in which a modulation scheme is QPSK, where MCS indexes corresponding to the part of entries are continuous, and the part of entries is at least one entry other than an entry in which an MCS index is greatest among all entries that are in the second MCS table and in which a modulation scheme is QPSK.

In the first MCS table acquired by the processor, the at least one entry that is in the second MCS table and in which a modulation scheme is 16QAM includes:

all entries that are in the second MCS table and in which a modulation scheme is 16QAM; or part of entries that are in the second MCS table and in which a modulation scheme is 16QAM, where a difference between successive MCS indexes corresponding to the part of entries are the same; or part of entries that are in the second MCS table and in which a modulation scheme is 16QAM, where a difference between successive MCS indexes corresponding to the part of entries are not the same; or part of entries that are in the second MCS table and in which a modulation scheme is 16QAM, where MCS indexes corresponding to the part of entries are discontinuous, and the part of entries is at least one entry other than an entry in which a second MCS index is greatest among all entries that are in the second MCS table and in which a modulation scheme is 16QAM; or part of entries that are in the second MCS table and in which a modulation scheme is 16QAM, where MCS indexes corresponding to the part of entries are continuous, and the part of entries is at least one entry other than an entry in which an MCS index is greatest among all entries that are in the second MCS table and in which a modulation scheme is 16QAM; or part of entries that are in the second MCS table and in which a modulation scheme is 16QAM, where the part of entries is at least one entry other than entries in which a respective MCS index is greatest pr smallest among all entries that are in the second MCS table and in which a modulation scheme is 16QAM.

The first MCS table acquired by the processor further includes:

at least one entry that is in the second MCS table and in which a modulation scheme is 64QAM.

In the first MCS table acquired by the processor, the at least one entry that is in the second MCS table and in which a modulation scheme is 64QAM includes:

all entries that are in the second MCS table and in which a modulation scheme is 64QAM; or part of entries that are in the second MCS table and in which a modulation scheme is 64QAM, where the part of entries is at least one entry other than an entry in which an MCS index is smallest among all entries that are in the second MCS table and in which a modulation scheme is 64QAM.

In the first MCS table acquired by the processor, the at least one entry that is in the second MCS table and in which a modulation scheme is 64QAM includes that:

a TBS index in an entry in which a corresponding MCS index is smallest among all entries that are in the first MCS table and in which a modulation scheme is higher than 64QAM is the same as a TBS index in an entry in which an MCS index is greatest among all entries that are in the second MCS table and in which a modulation scheme is 64QAM.

A value range of an MCS index in the first MCS table acquired by the processor is the same as a value range of an MCS index in the second MCS table.

It should be noted that, the apparatuses shown in FIG. 9 to FIG. 12 may respectively implement methods provided in the foregoing method embodiments; and for details, refer to the descriptions in the foregoing embodiments. For effects achieved by the apparatuses, reference may also be made to the descriptions in the foregoing embodiments.

For specific implementation of functions of various components of the MCS notifying apparatus 11 in this embodiment, refer to the descriptions in the foregoing embodiment of the MCS notifying method corresponding to FIG. 4, and details are not described herein again.

It may be clearly understood by a person skilled in the art that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A channel quality indicator (CQI) notifying method comprising:
acquiring a first CQI index according to an acquired first CQI table; and
sending the first CQI index to a base station for determining a first modulation and coding scheme (MCS) index according to the first CQI index, wherein the first CQI table comprises:
an entry in which a modulation scheme is higher than 64 quadrature amplitude modulation (QAM), and
at least one entry, in a second CQI table, with a quadrature phase shift keying (QPSK) modulation scheme, and
at least one entry that is in the second CQI table and in which a modulation scheme is 16QAM;
wherein the at least one entry with a QPSK modulation scheme comprises a combination, other than a first combination, formed by the at least one entry in the second CQI table with a QPSK modulation scheme, wherein the first combination is N entries in the second CQI table where CQI indexes corresponding to QPSK are continuous and have the highest CQI index values, and wherein N is a positive integer; and
wherein modulation schemes in entries in the second CQI table comprise at least one selected from the group consisting of: QPSK, 16QAM, and 64QAM.

2. The method according to claim 1, wherein a spectral efficiency in an entry in which a corresponding CQI index is greatest among entries that are in the first CQI table and in which a modulation scheme is higher than 64QAM is:
4/3 times a spectral efficiency in an entry in which a corresponding CQI index is greatest among all entries that are in the second CQI table and in which a modulation scheme is 64QAM.

3. The method according to claim 1, wherein a spectral efficiency in an entry in which a corresponding CQI index is greatest among entries that are in the first CQI table and in which a modulation scheme is higher than 64QAM is 7.4063.

4. A modulation and coding scheme (MCS) notifying method comprising:
receiving a first channel quality indicator (CQI) index sent by a terminal device, wherein the first CQI index is determined by the terminal device according to an acquired first CQI table;
determining a first MCS index according to the acquired first CQI table, an acquired first MCS table, and the received first CQI index; and
sending the determined first MCS index to the terminal device, wherein the first CQI table comprises an entry with a modulation scheme higher than 64 quadrature amplitude modulation (QAM), and the first MCS table comprises:
an entry with a modulation scheme higher than 64QAM, and
at least one entry that is in a second MCS table with a quadrature phase shift keying (QPSK) modulation scheme, and
at least one entry that is in the second MCS table with a 16QAM modulation scheme;
wherein the at least one entry with a QPSK modulation scheme comprises a combination, other than a second combination, formed by the at least one entry that is in the second MCS table with a QPSK modulation scheme, wherein the second combination is K entries that are in the second MCS table and where MCS indexes corresponding to QPSK are continuous and have the highest MCS index values, and K is a positive integer; and
wherein modulation schemes in the second MCS table comprise at least one selected from the group consisting of: QPSK, 16QAM, and 64QAM.

5. The method according to claim 4, wherein the determining a first MCS index according to the acquired first CQI table, an acquired first MCS table, and the received first CQI index comprises:
determining a first transmission block size (TBS) index and the first MCS index according to a first physical resource block (PRB) quantity, the first CQI table, the first MCS table, and a first TBS table that are acquired, and the received first CQI index, wherein
the first PRB quantity is a PRB quantity allocated to the terminal device by a base station; or the first PRB quantity is a greatest integer less than or equal to a product of the PRB quantity allocated to the terminal device and a specific coefficient; and
the first TBS table comprises at least one PRB quantity corresponding to each TBS index and a transmission block size corresponding to each PRB quantity; and the first TBS table is a TBS table corresponding to the first MCS table.

6. A channel quality indicator (CQI) notifying apparatus comprising:
a processor configured to acquire a first CQI table and acquire a first CQI index according to the first CQI table; and
a transmitter configured to send the first CQI index acquired by the processor to a base station for determining a first modulation and coding scheme (MCS) index according to the first CQI index, wherein
the first CQI table acquired by the processor comprises:
an entry with a modulation scheme higher than 64 quadrature amplitude modulation (QAM), and
at least one entry that is in a second CQI table with (a) a quadrature phase shift keying (QPSK) modulation scheme, and (b) a 16QAM modulation scheme;
wherein the at least one entry with a QPSK modulation scheme comprises a combination, other than a first combination, formed by the at least one entry that is in the second CQI table with a QPSK modulation scheme, wherein the first combination is N entries that are in the second CQI table and where CQI indexes corresponding to QPSK are continuous and have the highest CQI index values, and N is a positive integer; and
wherein modulation schemes in entries in the second CQI table comprise at least one selected from the group consisting of: QPSK, 16QAM, and 64QAM.

7. The apparatus according to claim 6, wherein a spectral efficiency in an entry in which a corresponding CQI index is greatest among entries that are in the first CQI table and in which a modulation scheme is higher than 64QAM is:
4/3 times a spectral efficiency in an entry in which a corresponding CQI index is greatest among all entries that are in the second CQI table and in which a modulation scheme is 64QAM.

8. The apparatus according to claim 6, wherein a spectral efficiency in an entry in which a corresponding CQI index is greatest among entries that are in the first CQI table and in which a modulation scheme is higher than 64QAM is 7.4063.

9. A modulation and coding scheme (MCS) notifying apparatus comprising:
- a processor configured to acquire a first channel quality indicator (CQI) table and a first MCS table;
- a receiver configured to receive a first CQI index sent by a terminal device, wherein the first CQI index is determined by the terminal device according to the first CQI table;
- wherein the processor is further configured to determine a first MCS index according to the first CQI table, the acquired first MCS table and the first CQI index; and
- a transmitter configured to send the determined first MCS index to the terminal, wherein the first CQI table acquired by the processor comprises: an entry with a modulation scheme higher than 64 quadrature amplitude modulation (QAM), and the first MCS table acquired by the processor comprises:
  - an entry with a modulation scheme higher than 64QAM, and
  - at least one entry in a second MCS table with (a) a quadrature phase shift keying (QPSK) modulation scheme, and (b) a 16QAM modulation scheme;
- wherein the at least one entry with a QPSK modulation scheme comprises a combination, other than a second combination, formed by the at least one entry that is in the second MCS table with a QPSK modulation scheme, wherein the second combination is K entries that are in the second MCS table and where MCS indexes corresponding to QPSK are continuous and have the highest MCS index values, and K is a positive integer; and
- wherein modulation schemes in the second MCS table comprise at least one selected from the group consisting of: QPSK, 16QAM, and 64QAM.

10. The apparatus according to claim 9, wherein the processor is further configured to:
- determine a first TBS index and the first MCS index according to an acquired first physical resource block (PRB) quantity, the acquired first CQI table, the acquired first MCS table, a first transmission block size (TBS) table, and the received first CQI index, wherein
- the first PRB quantity is a PRB quantity allocated to the terminal by a base station; or the first PRB quantity is a greatest integer less than or equal to a product of the PRB quantity allocated to the terminal and a specific coefficient; and
- the first TBS table comprises at least one PRB quantity corresponding to each TBS index and a transmission block size corresponding to each PRB quantity; and the first TBS table is a TBS table corresponding to the first MCS table.

* * * * *